(12) United States Patent
Bakaraju et al.

(10) Patent No.: US 12,321,046 B2
(45) Date of Patent: Jun. 3, 2025

(54) SPECTACLE LENSES WITH AUXILIARY OPTICAL ELEMENTS

(71) Applicant: NTHALMIC HOLDING PTY LTD, Sydney (AU)

(72) Inventors: Ravi Chandra Bakaraju, Sydney (AU); Klaus Ehrmann, Sydney (AU)

(73) Assignees: NTHALMIC HOLDING PTY LTD, Sydney (AU); BRIGHTEN OPTIX CORP, LTD., Taipei (TW); SHANGHAI ISPARX MEDICAL CO., LTD, Shanghai (CN)

( * ) Notice: Subject to any disclaimer, the term of this patent is extended or adjusted under 35 U.S.C. 154(b) by 473 days.

(21) Appl. No.: 17/799,352

(22) PCT Filed: Feb. 8, 2021

(86) PCT No.: PCT/AU2021/050103
§ 371 (c)(1),
(2) Date: Aug. 12, 2022

(87) PCT Pub. No.: WO2021/159170
PCT Pub. Date: Aug. 19, 2021

(65) Prior Publication Data
US 2023/0101527 A1    Mar. 30, 2023

(30) Foreign Application Priority Data
Feb. 12, 2020  (AU) .............................. 2020900397

(51) Int. Cl.
*G02C 7/08*    (2006.01)
*G02B 5/00*    (2006.01)
*G02C 7/02*    (2006.01)

(52) U.S. Cl.
CPC ............. *G02C 7/086* (2013.01); *G02B 5/001* (2013.01); *G02C 7/022* (2013.01); *G02C 2202/24* (2013.01)

(58) Field of Classification Search
CPC .... G02C 7/086; G02C 7/022; G02C 2202/24; G02C 2202/04; G02C 2202/12; G02B 5/001; G02B 3/02
(Continued)

(56) References Cited

U.S. PATENT DOCUMENTS 8,444,267 B2 * 5/2013 Weeber ................ A61F 2/1654
351/159.35
9,931,200 B2 * 4/2018 Van Der Mooren ........................
A61F 2/1618
(Continued)

FOREIGN PATENT DOCUMENTS

AU    2021220750 B2   6/2023
CN    110226118 A    9/2019
(Continued)

OTHER PUBLICATIONS

Romero, Lenny A., and Maria S. Millán. "Programmable diffractive optical elements with applicability in ophthalmic optics." (2017).
(Continued)

*Primary Examiner* — William R Alexander
(74) *Attorney, Agent, or Firm* — FROST BROWN TODD LLP

(57) ABSTRACT

The present disclosure is directed to devices and/or systems of modifying the incoming light through spectacle lenses that utilise at least one auxiliary or regional optical element, to provide extension or elongation of the depth of focus for a myopic eye. The disclosure relates to methods of correcting myopia and controlling or reducing the rate of myopia progression utilising extension of the depth of focus pro-
(Continued)

vided by the at least one auxiliary or regional optical element configured within, or in conjunction, combination, or juxtaposition with spectacle lenses. This disclosure relates to the use of an axicon, a light sword element, or a peacock eye element within the regional optical element or a sub-lens. This disclosure also relates to the use of a plurality of axicons, light sword elements or peacock eye elements configured within, or in conjunction, combination, or juxtaposition with spectacle lenses.

20 Claims, 34 Drawing Sheets

(58) Field of Classification Search
USPC .................................................. 351/159.42
See application file for complete search history.

(56) References Cited

U.S. PATENT DOCUMENTS

| | | | |
|---|---|---|---|
| 10,268,050 | B2 | 4/2019 | To et al. |
| 11,156,853 | B2* | 10/2021 | Weeber ................ G02C 7/066 |
| 2006/0034003 | A1 | 2/2006 | Zalevsky |
| 2014/0118684 | A1* | 5/2014 | Piers ...................... G02C 7/041 |
| | | | 351/159.73 |
| 2016/0377884 | A1 | 12/2016 | Lau et al. |
| 2017/0196682 | A1 | 7/2017 | Lawu |
| 2018/0275427 | A1 | 9/2018 | Lau et al. |
| 2019/0302481 | A1 | 10/2019 | Zhou et al. |
| 2020/0012123 | A1 | 1/2020 | Newman |
| 2020/0073147 | A1 | 3/2020 | Bakaraju et al. |
| 2021/0018762 | A1 | 1/2021 | Zheleznyak |

FOREIGN PATENT DOCUMENTS

| | | |
|---|---|---|
| EP | 3553594 A1 | 10/2019 |
| JP | 2005-530128 A | 10/2005 |
| JP | 2019179136 A | 10/2019 |
| WO | WO 2016/035055 A1 | 3/2016 |
| WO | WO 2019/021184 A1 | 1/2019 |
| WO | WO 2019/166659 A1 | 9/2019 |
| WO | WO 2020/008804 A1 | 1/2020 |
| WO | WO 2020/069232 A1 | 4/2020 |
| WO | WO 2020/078691 A1 | 4/2020 |
| WO | WO 2020/078964 A1 | 4/2020 |
| WO | WO 2020/079105 A1 | 4/2020 |
| WO | WO 2020 261213 | 12/2020 |
| WO | WO 2021 015993 | 1/2021 |
| WO | WO 2020 067028 | 8/2021 |

OTHER PUBLICATIONS

Australian Office Action dated Oct. 20, 2022, for Application No. 2021220750, 6 pages.
Bakaraju, Ravi Chandra. *Optical performance of simultaneous vision multifocal contact lenses using schematic and physical eye models.* Diss. UNSW Sydney, 2010.
Benard, Yohann, Norberto Lopez-Gil, and Richard Legras. "Subjective depth of field in presence of 4th-order and 6th-order Zernike spherical aberration using adaptive optics technology." *Journal of Cataract & Refractive Surgery* 36.12 (2010): 2129-2138.
Gallego, Augusto Arias, et al. "Visual Strehl performance of IOL designs with extended depth of focus." *Optometry and Vision Science* 89.12 (2012): 1702-1707.
Kołodziejczyk, Andrzej, et al. "The light sword optical element—a new diffraction structure with extended depth of focus." *Journal of Modern Optics* 37.8 (1990): 1283-1286.
Forbes, G. W. "Shape specification for axially symmetric optical surfaces." *Optics express* 15.8 (2007): 5218-5226.
García, J. Ares, et al. "Imaging with extended focal depth by means of the refractive light sword optical element." *Optics Express* 16.22 (2008): 18371-18378.
Lam, Carly Siu Yin, et al. "Defocus Incorporated Multiple Segments (DIMS) spectacle lenses slow myopia progression: a 2-year randomised clinical trial." *British Journal of Ophthalmology* 104.3 (2020): 363-368.
Lin, Xiao-Feng, et al. "Mask-free production of integratable monolithic micro logarithmic axicon lenses." *Journal of Lightwave Technology* 28.8 (2010): 1256-1260.
Petelczyc, K., et al. "Imaging properties of the light sword optical element used as a contact lens in a presbyopic eye model." *Optics Express* 19.25 (2011): 25602-25616.
Petelczyc, K., et al. "Strehl ratios characterizing optical elements designed for presbyopia compensation." *Optics express* 19.9 (2011): 8693-8699.
Romero, Lenny, et al. "Double peacock eye optical element for extended focal depth imaging with ophthalmic applications." *Journal of biomedical optics* 17.4 (2012): 046013.
Yi, Fan, D. Robert Iskander, and Michael Collins. "Depth of focus and visual acuity with primary and secondary spherical aberration." *Vision research* 51.14 (2011): 1648-1658.
International Search Report dated Feb. 26, 2021, for International Application No. PCT/AU2021/050103, 5 pages.
Xiangwan, "High-Tech Overview Machine-Readable Format", 3 pages.
Davidson, Nir, A. A. Friesem, and E. Hasman. "Holographic axilens: high resolution and long focal depth." *Optics letters* 16.7 (1991): 523-525.
Onose, Ryoma, and Shinichi Komatsu. "Design and characterization of new azimuth-type lens for reading glasses with extended depth of focus." *2017 22nd Microoptics Conference (MOC)*. IEEE, 2017.
Romero, Lenny A., et al. "Extended focal depth imaging using single and double peacock eye phase diffractive elements." *Optical Modelling and Design II.* vol. 8429. SPIE, 2012.
Canadian Office Action dated Sep. 1, 2023, for Application No. 3,167,325, 6 pages.
Extended European Search Report dated Jun. 15, 2023, for Application No. 21753542.6, 15 pages.
Japanese Notification if Reasons for Refusal dated Aug. 4, 2023, for Application No. 2022-548682, 5 pages.
Malaysian Office Action dated Jul. 10, 2023, for Application No. PI2022004306, 2 pages.

* cited by examiner

SPECTACLE LENSES WITH AUXILIARY OPTICAL ELEMENTS

CROSS-REFERENCE

This application claims priority to Australian Provisional Application Serial No. 2020/900397 filed on Feb. 12, 2020, entitled "Corrective lenses", which is incorporated herein by reference in its entirety.

FIELD OF THE INVENTION

The present disclosure relates to spectacle lenses to deal with eye-length disorders, like myopia with or without astigmatism. The disclosure relates to devices of correcting myopia, and controlling, or reducing the rate of myopia progression by using at least one regional or auxiliary optical element configured within or, in conjunction, in combination, or in juxtaposition with an integral base spectacle lens to provide an extended depth of focus or elongation depth of focus to the wearer's eye.

BACKGROUND

The growth of the human eye is controlled by a feedback mechanism and regulated predominantly by the visual experience of the world referred to as emmetropisation. The signals that guide the emmetropisation process are initiated by the modulation of light energy received at the retina. The image characteristics are monitored by a biological process that modulates the signal to start, stop, accelerate, or slow the rate of eye growth. Derailing from the emmetropisation process potentially results in refractive disorders like myopia. Myopia is an optical disorder of the eye, wherein the images of distant objects are focused in front of the fovea or retina. The rate of incidence of myopia is increasing at alarming rates in many regions of the world, particularly in the East Asia region. Although a pair of negative lenses can optically correct myopia, they do not address the underlying cause of the excessive eye growth, which often leads to high myopia, which is further associated with significant vision-threatening conditions like cataract, glaucoma, myopic maculopathy, and retinal detachment. Thus, there remains a need for specific optical treatments for such individuals, that not only correct the underlying error but also prevent excessive eye lengthening.

Definitions

Terms are used herein as generally used by a person skilled in the art unless otherwise defined in the following:

The term "myopic eye" means an eye that is already experiencing myopia, is diagnosed to have a refractive condition that is progressing towards more myopia and has astigmatism of less than 1 DC.

The term "astigmatic myopic eye" means an eye that is already experiencing myopia, is diagnosed to have a refractive condition that is progressing towards more myopia and has astigmatism greater than 1 DC.

The term "progressing myopic eye" means an eye with established myopia that is diagnosed to be progressing, as gauged by either the change in refractive error of at least −0.25 D/year or the change in axial length of at least 0.10 mm/year.

The term "pre myopic eye" or "an eye at risk of becoming myopic" means an eye, which could be emmetropic or is low hyperopic at the time but has been identified to have an increased risk of becoming myopic based on genetic factors (e.g., both parents are myopic) and/or age (e.g., being low hyperopic at a young age) and/or environmental factors (e.g., time spent outdoors) and/or behavioural factors (e.g., time spent performing near tasks).

The term "optical stop signal" or "stop signal" means an optical signal or directional cue that may facilitate slowing, reversing, arresting, retarding, inhibiting, or controlling the growth of an eye and/or refractive condition of the eye.

The terms "standard single vision spectacle lens" or "single vision spectacle lens" or "integral base spectacle lens" or "standard single vision integral base spectacle lens" mean a finished, semi-finished, or a blank spectacle lens configured with base prescription used to correct the underlying refractive error of the eye; wherein the refractive error may be myopia, with or without astigmatism.

The term "base prescription for correcting the refractive error" means the standard spectacle prescription required to correct underlying myopia in an individual, with or without astigmatism.

The term "optical centre of the spectacle lens" means the geometric centre of an uncut spectacle lens, or a spectacle blank. For edge or cut spectacle lenses, the term "optical centre of the spectacle lens" means a substantially straight line joining the centre of curvatures of front and back surfaces of a spectacle lens.

The term "optical axis of the spectacle lens" means line passing through the optical centre and a plane drawn substantially perpendicular to the plane containing the edge of the spectacle lens blank.

The term "through-focus" means a region that is substantially anterior-posterior to the retina. In other words, a region approximately just in front of the retina and/or approximately just behind the retina.

The term "auxiliary optical element" or "regional optical element" means the region on the spectacle lens that has the prescribed optical effect that is different from the optical effect provided by the integral base prescription of the spectacle lens.

The term "optical centre of the auxiliary optical element" means the geometric centre of the individual auxiliary optical element on the spectacle lens.

The term "optical axis of the auxiliary optical element" means line passing through the optical centre of the auxiliary optical element and a plane drawn substantially tangential to the auxiliary optical element and passing through the point serving as the optical centre of the auxiliary optical element of the spectacle lens.

The term "model eye" means a schematic, ray-tracing, or a physical model eye.

The terms "Diopter", "Dioptre" or "D" as used herein is the unit measure of dioptric power, defined as the reciprocal of the focal distance of a lens or an optical system, in meters, along an optical axis.

The letter "D" signifies spherical dioptric power, and letters "DC" signifies cylindrical dioptric power.

The term "power map of the auxiliary optical element" means the two-dimensional power distribution across of the auxiliary optical element in cartesian or polar coordinates.

SUMMARY OF THE INVENTION

Certain disclosed embodiments include spectacle lenses, devices, systems and/or methods for altering the characteristics of incoming light entering a human eye. Certain disclosed embodiments are directed to the configuration of spectacle lenses, methods and/or systems for correcting and treating refractive errors.

Certain embodiments of the disclosure are aimed to both correct the myopic refractive error and concomitantly provide an optical stop signal to discourage further progression of myopia. The disclosure relates to methods of correcting myopia, and controlling, inhibiting, or reducing the rate of myopia progression by using at least one regional or auxiliary optical element configured within or, in conjunction, in combination, or in juxtaposition with integral base spectacle lenses to provide for the eye, an extended depth of focus or elongation of depth of focus.

The present disclosure relates to an optical intervention method that applies the effects of extended depth of focus, or elongation of depth of focus, achieved via at least one regional or auxiliary optical element utilised in combination with an integral base spectacle lens as an optical stop signal to reduce the rate of myopia progression. This disclosure relates to a purposeful configuration of at least one auxiliary optical element within or, in conjunction, in combination, or in juxtaposition with spectacle lenses, wherein the at least one auxiliary optical element configured in conjunction with a standard single vision integral base spectacle lens provides an extended depth of focus or elongation of depth of focus at the retinal level of the wearer's eye, which may serve as a stop signal to the progressing myopic eye.

This disclosure particularly relates to at least one regional or auxiliary optical element, wherein the at least one regional or auxiliary optical element utilises at least in part, an axicon, a light sword element, a modified light sword element, a single peacock eye element, or a double peacock eye element. In some embodiments, a plurality of axicons, a plurality of light sword elements, a plurality of modified light sword elements, a plurality of single peacock eye elements, and/or a plurality of double peacock eye elements may be configured in combination with a standard single vision spectacle lens.

In some embodiments, the axicon may be configured linearly as a function of an angular coordinate of the lens, while in some other embodiments the desirable configuration of the axicon may be logarithmic.

The present disclosure also relates to at least one regional or auxiliary optical element comprising an axicon or a light sword element that may be incorporated into an optical film that may be permanently configured in juxtaposition with standard single vision spectacle lens, aimed to alter the optical signal received by the retina. The disclosure of using permanent optical films that may be adhered onto the integral base spectacle lens may be desirable to minimise manufacturing related and user related costs.

The altered optical signal achieved or provided by the introduction of an extension of depth of focus, or elongation of depth of focus, may serve as a stop signal to a progressing myopic eye. The at least one auxiliary optical element incorporated into the permanent optical films may either comprise surface alterations and/or alterations to the matrix of the material to provide an eye with a desirable level of elongation of depth of focus when used in conjunction with the standard single vision integral base spectacle lens. In some other embodiments, the contemplated light sword optical element may be modified such that there is no distinct ledge forming about the circumference of the light sword.

The current disclosure describes a spectacle lens, configured in conjunction, in combination, or in juxtaposition, with at least one auxiliary or regional optical element, providing an elongation of depth of focus on the central and/or peripheral retinal portion or region of the spectacle wearer. The elongation of depth of focus on the central and/or peripheral retinal portion or region may serve as an optical stop signal to the progressing myopic eye.

In some embodiments, the central retinal portion of the spectacle wearer may include the central 1, 1.5, 2, 2.5, 3, 3.5, 4, 4.5 or 5-degree visual field. In some embodiments, the peripheral retinal portion of the spectacle wearer may include the retinal field within 5, 10, 15, 20, 25, or 30-degree visual field.

Certain embodiments are directed to devices, methods and/or systems that can impose an optical stop signal in one or more retinal locations of the wearers' eyes by using a plurality of regional or auxiliary optical elements within or, as part of, in conjunction, or in juxtaposition with an integral base spectacle lens. Certain embodiments are directed to a spectacle lens incorporating a plurality of regional or auxiliary optical elements, wherein the spectacle lens can provide an optical stop signal irrespective (or substantially irrespective) of the direction of gaze of the wearer's eye.

Certain embodiments are directed to devices, methods and/or systems that can modify incoming light through a spectacle lens to offer extension or elongation of the depth of focus to decelerate eye growth. This may be achieved via the use of a plurality of optical elements used in conjunction or combination with the standard single vision spectacle lenses. As per certain exemplary embodiments, a method for choosing a spectacle lens for an individual eye to control, inhibit and/or arrest the progression of myopia by the introduction of the extended or elongated depth of focus pattern at the retina is described herein. This disclosure relates at least in part to the introduction of an optical stop signal to a progressing myopic eye using a device whose performance is substantially independent of the wearer's gaze angle.

Certain embodiments of the current disclosure are directed to methods for reducing or slowing the eye growth. Certain embodiments of the present disclosure are directed to devices for reducing the rate of myopia progression. An exemplary method of the present disclosure comprises of a measurement of refraction of at least one of the eyes of a wearer; the method further identifying a distance prescription based at least in part on the refraction measurement of the eyes, the method further choosing a spectacle lens for each eye, wherein the spectacle lens is configured with an integral base spectacle lens with a base distance prescription power that is substantially close to the refraction measurement of the eye, and the integral base spectacle lens is further configured with at least one regional or auxiliary optical element used in conjunction, in combination, or in juxtaposition, with the integral base spectacle lens; wherein the at least one auxiliary or regional optical element is configured to provide an optical effect to the eye that is different to that provided by the integral base spectacle lens; and wherein the combination of the integral base spectacle lens and the at least one auxiliary or regional optical element is configured to provide an extension or elongation of depth of focus for at least one region or portion on the retina of the myopic eye; wherein the at least one regional or auxiliary optical element is at least in part a linear axicon, a logarithmic axicon, a light sword element, or a modified light sword element; and wherein the at least one regional or auxiliary optical element provides an introduction of extension or elongation of depth of focus at the retinal plane of the spectacle wearer, which may further provide an optical signal to slow the progression of the length of the eye.

In addition to the embodiments discussed in the summary section, other embodiments are disclosed in the detailed specification, figures, example claim sets and claims. The summary is not meant to cover every embodiment, combination or variations contemplated with the present disclosure. This summary is not intended to be limiting as to the embodiments disclosed herein. Besides, limitations of one embodiment may be combined with limitations of other embodiments to form additional embodiments.

The embodiments presented in this disclosure are directed to the ongoing need for enhanced optical designs and spectacle lenses that may inhibit the progression of myopia while providing reasonable and adequate vision performance to the wearer for a range of activities that the wearer may undertake as a daily routine. Various aspects of the embodiments of the present invention disclosure address such needs of a wearer.

DETAILED DESCRIPTION

Figure 1:
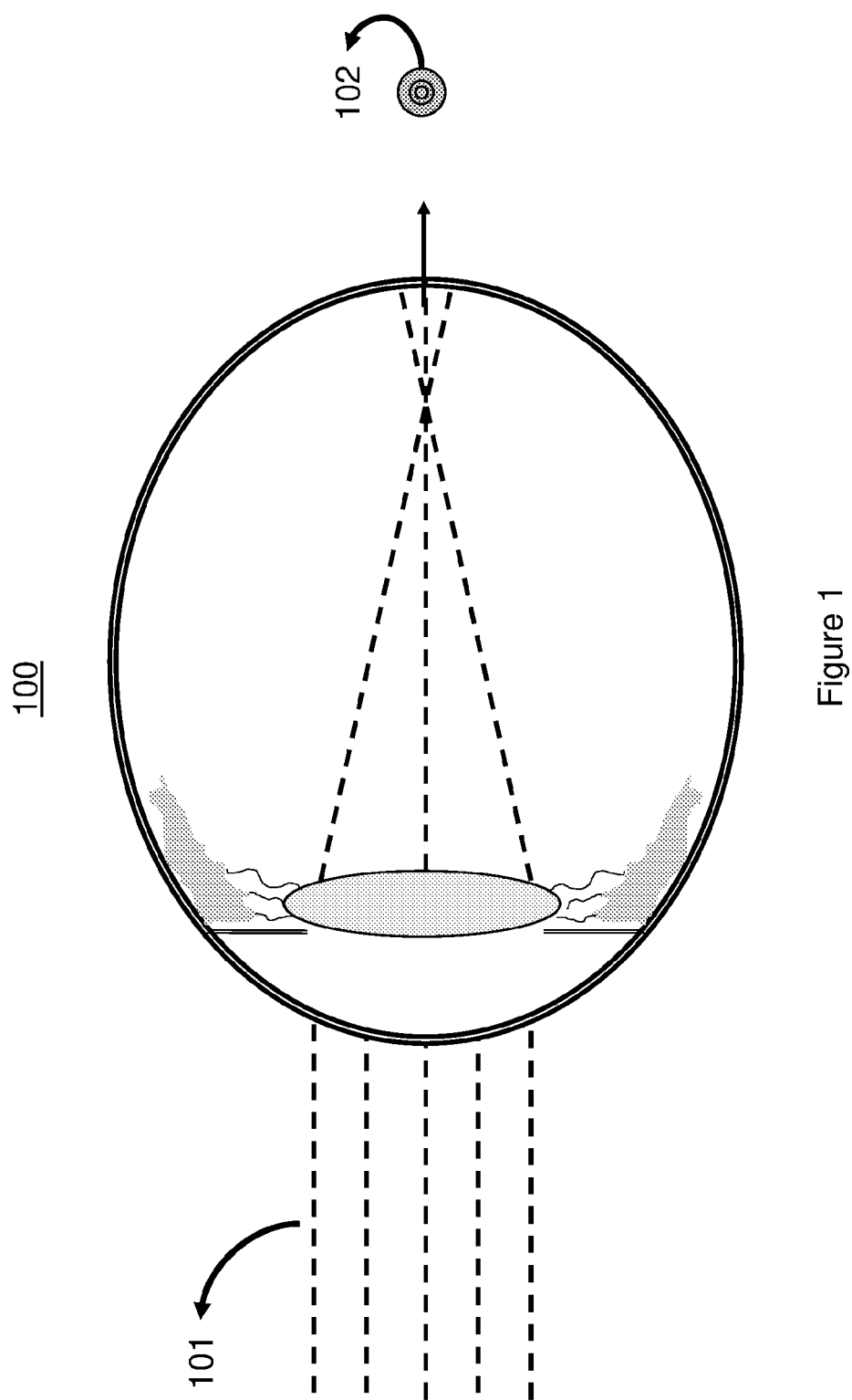
FIG. 1 illustrates a schematic diagram of an on-axis, geometric spot analysis at the retinal plane, when the incoming light, with a visible wavelength (for example, 555 nm) and vergence of 0 D, depicting optical infinity, is incident on an uncorrected—2 D myopic model eye resulting in a blurred and defocussed image on the retina.

The prior art spectacle designs for the management of myopia include use of executive bifocals, D-shaped bifocals, concentric bifocals, conventional progressive additional lenses, and special-type of progressive addition lenses, including symmetric and asymmetric versions, multifocals, incorporation of multi-segment defocus regions on the spectacle lenses, and spectacles with positive spherical aberration, which may be referred to as peripheral plus lenses. Each of these spectacle lens designs has its strengths and weaknesses. Some of the weaknesses are described herein. For example, some are based on various types of bifocal, multifocal and progressive lenses or peripheral plus power, compromise the quality of vision at peripheral viewing angles by introducing significant visual disturbances like swing-effects, image-jumps, residual aberrations, and peripheral distortions. The side effects are attributable to the significant levels of simultaneous and/or multiple defocus regions, zones, or segments, or use of significant amounts of positive spherical aberration in the lens, or a drastic change in the power within a given zone of the spectacle lens.

To avoid visual performance issues encountered by the use of standard bifocal, multifocals, and progressive addition spectacle lenses in young adults, some other prior art presbyopic contact lens designs, involving the purposeful manipulation of spherical aberrations to extend the depth of focus, were also considered as an option of myopia management. The following references are incorporated herein in its entirety: Bakaraju., Chapter 7, PhD Thesis, 2010, Optometry & Vision Science, Faculty of Science, UNSW; Benard et al., "Subjective depth of field in presence of 4th-order and 6th-order Zernike spherical aberration using adaptive optics technology," J. Cataract Refract. Surg., 36, 2129-2138 (2010); Yi et al., "Depth of focus and visual acuity with primary and secondary spherical aberration," Vision Research, 51, 1648-1658 (2011).

Most prior art contact lens designs proposed and effectively utilised for the management of presbyopia have naturally lent themselves to be also a fruitful and effective option for the treatment or management of myopia; i.e., for slowing the progression of myopia. However, this is generally not the case with spectacle lenses proposed and effectively utilised for the management of presbyopia. For example, progressive addition spectacle lenses, which are considered to be the gold standard for the management of presbyopia, have been tested for management of myopia with barely any notable effectiveness, as gauged by multiple randomised controlled clinical trials.

Further, the outcomes of several attempts to modify progressive addition lens designs, incorporating relevant optical features considering variations in younger eyes, have also been largely fruitless. The underlying reason for observed futility in relation to ineffective management of myopia with progressive and other conventional bifocal and multifocal spectacle lenses can be funneled down two reasons: (a) the optical correction being dependent on the gaze of the wearer, in other words, a choice for the wearer to either use or disregard the treatment optics within the spectacle lens, unlike the contact lens option, which is distinctly independent of the wearers' ocular gaze; and/or (b) the remoteness of the treatment zone to the pupillary region/visual axis of the wearer.

For example, the spectacle lens designs that have factored in the above limitations of the prior art into the design development have demonstrated greater success in reducing the progression of myopia compared to the designs incorporating traditional or conventional bifocal, multifocal or progressive addition 'like' optics within the spectacle lenses.

Following references are incorporated herein in its entirety to the support the above finding. To et al, U.S. Pat. No. 10,268,050B2 teaches the use of defocus incorporated multi-segment optical elements to control myopia progression. A peer-reviewed scientific paper by Lam et al, Br J Ophthalmol, 2019, 104, 363-368 titled "Defocus Incorporated Multiple Segments (DIMS) spectacle lenses slow myopia progression: a 2-year randomised clinical trial" demonstrates the clinical utility of U.S. Pat. No. 10,268, 050B2. Following the first successful approach to manage progressive myopia using defocus incorporated multi-segment lenses disclosed in the prior art U.S. Pat. No. 10,268, 050B2, there has been a rush by the ophthalmic industry into lenslets and microlenslets based technologies incorporated into spectacle lenses, aimed at improving upon the established prior art U.S. Pat. No. 10,268,050B2, for both spectacle and contact lens modes of applications. Following references are incorporated herein in its entirety that relates to contact lens-based applications. For example, Brennan et al, US patent 2016/0377884 A1 titled "Contact Lens comprising non-co-axial micro lenslets for preventing and/or slowing myopia progression" teaches the use of a plurality of non-coaxial lenslets or optical elements for myopia progression. This disclosure US patent 2016/0377884 A1 contemplates the use of high magnitudes of defocus incorporated into small regions within the contact lens optic zone to manage myopia. Further, in another patent application titled "Apparatus and methods for controlling axial growth with an ocular lens", Newman discloses the use of a plurality of optical elements or features aimed to redirect peripheral light into the eye away from the central region of the retina to prevent progression of myopia.

Following references are incorporated herein in its entirety that relates to spectacle lens-based applications claiming improvements over the prior art U.S. Pat. No. 10,268,050B2. For example, Matthieu al, patent application WO 2019/166659 A9 titled "Optical Lens Element" discloses the use of aspheric optics in regional optical elements and use of a plurality of at least two contiguous optical elements configured to effectively slow the progression of myopia. The utility of the aspheric optics instead of conventional spherical optics described in prior art 10268050B2 and the specific arrangement of the contemplated aspheric optics is claimed to have improvements over the prior art. Further, Matthieu al, patent application WO 2020/079105 A1 titled "Optical Lens" teaches additional means of determining an optical lens element used in conjunction with spectacle lenses for controlling the progression of myopia.

In the patent application WO 2020/078691 A1 titled "Optical Articles comprising encapsulated microlenses and methods of making the same", Matthieu al expands the utilization of a plurality of optical elements such as microlenses on the lens surface that can facilitate desired positive addition power to focus part of the incoming light in front of the retina and control progression of myopia. In a further set of improvements over the disclosure of defocus incorporated multi-segment based optical elements described in prior art U.S. Pat. No. 10,268,050B2, Saux et al, in patent application WO 2020/078964 A1 titled "Improved Optical Article Incorporating Optical Elements and Manufacturing Method thereof" further teaches the use of microlenses utilising Fresnel structures embedded into spectacle lenses to prevent progression of myopia.

In another mode of application, Bakaraju et al in US patent US20200073147A1 propose the use of microlenses incorporated within spectacle lenses to provide chromatic cues to the eye that facilitates deceleration in the rate of myopia progression. Briefly summarised, all lenslet based technologies proposed for myopic eyes involve the imposition of some level of defocus in the central and/or peripheral region of the retina using defocus or aspheric lenslets. Furthermore, various arrangements of the lenslet 'like' features to be incorporated within the spectacle lenses have been contemplated to improve on visual performance. See examples in U.S. Pat. No. 10,268,050B2, patent applications WO 2019/166659 A9, WO 2020/079105 A1, WO 2020/078691, WO 2020/078964 A1 and US 2020/0073147A1.

Given the influence of compliance of spectacle lens wear on the treatment efficacy of the progression of myopia, a significant reduction of visual performance may promote poor compliance, thus resulting in a poorer efficacy. Accordingly, what is needed are improved spectacle designs for the correction of myopia and retardation of progression, without causing at least one or more of the shortcomings discussed herein.

The next generation spectacle solutions for myopia management contemplated in the current disclosure are aimed at improving the necessary decrement in wide-angle visual performance with such technologies often traded for achieving the desired levels of myopia control efficacy.

To improve the visual performance over the conventional defocus or aspheric lenslets based technologies of the prior art, the current disclosure proposes the use of a plurality of sub-lenses incorporated with extended depth of focus optics features achieved via utilisation of the angular modulation of a light transmittance function and used in conjunction, combination, or juxtaposition with standard spectacle lenses.

The improved utility of diffractive light sword optical elements over the conventional refractive optical elements with radial modulation of the light transmittance is noted.

See the following reference incorporated herein in its entirety: Kolodziejczyk et al., "The light sword optical element, a new diffraction structure with extended depth of focus", J. Mod. Opt., 37, 1990. However, the use of diffractive light sword optical elements would invite significant levels of undesirable chromatic aberration causing further degradation of visual performance.

With the advent of technology, the deficiencies observed in the diffractive approach have been mitigated with high-precision lathing techniques that have paved a path for accurate and precise manufacturing of refractive light sword elements for the treatment of presbyopia in the recent past.

See the following references incorporated herein in its entirety: Garcia et al., "Imaging with the extended focal depth utilizing the refractive light sword optical element", Opt. Express, 16, 2008; Petelczyc et al., "Strehl ratio characterising elements designed for presbyopia compensation", Opt. Express, 19, 2011; Petelczyc et al., "Imaging the optical properties of a light sword optical element used as a contact lens in a presbyopic eye model", Opt. Express, 19, (2011); Gallego et al., "Visual Strehl performance of IOL designs with extended depth of focus," Optom. Vis. Set, 89, 2012 and Tjundewo Lawu., "Wide depth of focus vortex intraocular lenses and associated methods", WO 2016/035055 A1.

Improving upon the prior art, in some embodiments, this disclosure contemplates on providing a method of incorporating miniaturised refractive light sword elements into spectacle lenses for the management of myopia that minimises the trade-off in visual compromise observed in prior art designs, while maintaining desirable levels of myopia control efficacy.

The next generation spectacle solutions aimed at the improvement over prior art designs primarily centred on minimising the trade-off in visual performance are subject of this invention disclosure.

Further, some of the prior art may not be cosmetically appealing to children, teenagers, and young adults, for example, the demarcating lines of D-shaped bifocals, executive bifocals, etc. Other solutions will become apparent as discussed herein. There is a need for a spectacle lens that provides a stop signal to eye growth notwithstanding the direction of gaze of the wearer's eye.

There is a need in the art for a spectacle lens that provides a stop signal to the progressing eye irrespective of the portion of the spectacle lens in use. There is also need in the art for an optical element that may be combined with a spectacle lens, wherein the spectacle lens configured in conjunction, combination or in juxtaposition with the contemplated optical element provides a stop signal to a progressing myopic eye using an extension of depth of focus. Furthermore, the stop signal provided by the optical element and spectacle lens serves a portion or a substantial portion of the viewing angles of a wearer. The current disclosure is directed to overcome and/or improve on one or more disadvantages of the prior art, which will become apparent herein.

The detailed discussion on the prior art, and the subject matter of interest in general, is provided here as the background of the present disclosure, to illustrate the context of the disclosed embodiments, and to distinguish the advances contemplated by the present disclosure over the prior art. No material presented here should be taken as an acknowledgment that the material proposed in the current disclosure is previously disclosed, known, or part of common general knowledge, on the priority of the various embodiments and/or claims outlined in the present disclosure.

In this section, the present disclosure will be described in detail with reference to one or more embodiments, some are illustrated and supported by accompanying figures. The examples and embodiments are provided by way of explanation and are not to be construed as limiting to the scope of the disclosure.

The following description is provided in relation to several embodiments that may share common characteristics and features of the disclosure. It is to be understood that one or more features of one embodiment may be combined with one or more features of any other embodiments which may constitute additional embodiments.

The functional and structural information disclosed herein is not to be interpreted as limiting in any way and should be construed merely as a representative basis for teaching a person skilled in the art to employ the disclosed embodiments and variations of those embodiments in various ways.

The sub-titles and relevant subject headings used in the detailed description section have been included only for the ease of reference of the reader and in no way should be used to limit the subject matter found throughout the invention or the claims of the disclosure. The sub-titles and relevant subject headings should not be used in construing the scope of the claims or the claim limitations.

In this section, the present disclosure will be described in detail with reference to one or more embodiments, some are illustrated and supported by accompanying figures. The examples and embodiments are provided by way of explanation and are not to be construed as limiting to the scope of the disclosure.

The following description is provided in relation to several embodiments that may share common characteristics and features of the disclosure. It is to be understood that one or more features of one embodiment may be combined with one or more features of any other embodiments which may constitute additional embodiments.

Risk of developing myopia or progressive myopia may be based on one or more of the following factors: genetics, ethnicity, lifestyle, environmental, excessive near work, etc.

Certain embodiments of the present disclosure are directed towards a person at risk of developing myopia or progressive myopia. One or more of the following advantages are found in one or more of the disclosed optical devices, and/or methods of spectacle lens designs. A spectacle lens device or method providing a stop signal to retard the rate of eye growth or stop the eye growth of the wearer's eye based on extension or elongation of the depth of focus. The extension or elongation of the depth of focus allows for configuration of the retinal image quality above a certain threshold value over a specific through focus region for the spectacle wearer.

A spectacle lens device or method which is not based solely on either positive spherical aberration, or simultaneous defocus about the optical axis, that may suffer from the potential visual performance degradation of the prior art. The following exemplary embodiment is directed to methods of modifying the incoming light through a spectacle lens that provides extension or elongation of the depth of focus at the retinal plane of the corrected eye. This may be achieved by using at least one regional or auxiliary optical element within or, in conjunction, combination or juxtaposition with a spectacle lens used for the correction of myopia. In short, the use of at least one regional optical element in conjunction with the spectacle lens may be used to reduce the rate of myopia progression by introducing an extension of depth of focus at the retinal level. Monofocals, bifocals and multifocal lenses may be designed to have one or more focal regions conveniently configured to correct at one or more viewing distances. The extended, elongated, or a wide range of depth of focus at the retina offers a through-focus retinal region (i.e., in front and behind the retina), wherein the image quality does not fall below a certain image quality threshold. The extended or elongated or wide range of depth of focus optical elements are contemplated to provide a retarding, controlling or arresting signal to a progressing myopic eye.

Various ways to achieve an extended, elongated, or wide range of depth of focus via the use of contemplated optical elements in conjunction with spectacle lenses are disclosed herein. In a broader sense, the contemplated optical elements used within or, in conjunction, combination or in the juxtaposition of the spectacle lens can concentrate an incident beam of light into a line segment along the optical axis (i.e., in front and/or behind the retina) of desired length, orientation or inclination with the optical axis, and longitudinal intensity distribution.

Axicons are rotationally symmetric optical elements that may serve as suitable candidates, when combined with spectacle lenses, for inhibiting, retarding, or controlling the rate of myopia progression by providing an extended, elongated, or wide range of extended depth of focus (i.e., stop signal to the progressing eye).

Simply put, an axicon is an optical element that transforms an incident plane wave into a narrow focal segment with uniform intensity at the image plane. Depending upon the direction of the narrow focal segment with uniform intensity is projected, the axicons may be referred to as forward or backward axicons.

In an example embodiment, an axicon may serve as a regional or auxiliary optical element used within or, in combination, conjunction or in juxtaposition with the integral base single vision spectacle lens to provide an extension of depth of focus at the retina of the wearer's eye.

In one embodiment of the present disclosure, the axicon may be a linear axicon, defined by the following phase function, described in Equation 1:

$$OPD(\rho) = C\frac{\rho}{2F}$$

Wherein, $\rho$ is the radial coordinate of the phase function ($\rho=\sqrt{x^2+y^2}$), F is the focal length of the optical element in lens units (mm); C is an arbitrary coefficient.

In yet another embodiment of the present disclosure, the axicon may be a quartic axicon or a lensacon, the quartic axicon or the lensacon in combination with the spectacle lens may be defined by the following phase function or optical path difference, described in Equation 2:

$$OPD(\rho) = \frac{\rho^4}{4\Delta FR^2}$$

Wherein, $\rho$ is the radial coordinate of the phase function ($\rho=\sqrt{x^2+y^2}$), $\Delta F$ is the range of extended depth of focus of the optical element in lens units (mm); and R is the semi-diameter of the optical element.

In yet another embodiment of the present disclosure, the axicon may be a logarithmic axicon, the logarithmic axicon optical element in combination with the spectacle lens may be defined by the following phase function or optical path difference (OPD), described in Equation 3:

$$OPD(\rho) = \frac{1}{2A\ln\left(1 + A\frac{\rho^2}{F}\right)}$$

Wherein, $\rho$ is the radial coordinate of the phase function ($\rho=\sqrt{x^2+y^2}$), $A=\Delta F/R^2$, F and $\Delta F$ stand for the focal length of the lens and the range of extended depth of focus of the optical element, both in lens units (mm); and R is the semi-diameter of the optical element.

Rotational symmetry is not a prerequisite for designing and manufacturing optical elements that may be capable of providing extended, elongated, or wide range of depth of focus. In other embodiments, rotationally asymmetric elements like the light sword optical element may also be conveniently configured in conjunction with a spectacle lens.

In yet another embodiment of the present disclosure, the optical element may be a light sword element, the light sword optical element in combination with the spectacle lens may be defined by the following phase function or optical path difference (OPD), described in Equation 4:

$$OPD(\rho, \theta) = \frac{\rho^2}{2\left[F + \Delta F\left(\frac{\theta}{2\pi}\right)\right]}$$

Wherein, $\rho$, and $\theta$ is the radial ($\rho=\sqrt{x^2+y^2}$) and azimuthal $$\left(\theta = \tan^{-1}\left(\frac{y}{x}\right)\right)$$

coordinates respectively of the phase function; and parameters F and $\Delta F$ stand for the focal length of the lens and the range of extended depth of focus of the optical element, both in lens units (mm).

In yet another embodiment of the present disclosure, the optical element may be a light sword element, the light sword element in conjunction with the spectacle lens may be defined by the following phase function or optical path difference (OPD), described in Equation 5:

$$OPD(\rho, \theta) = A\rho^2 + B\theta\rho^2$$

Wherein, $\rho$, and $\theta$ is the radial ($\rho = \sqrt{x^2+y^2}$) and azimuthal $$\left(\theta = \tan^{-1}\left(\frac{y}{x}\right)\right)$$

coordinates respectively; and parameters A and B stand for:

$$A = \frac{1}{2F} \text{ and } B = \frac{1}{4\pi}\left[\frac{1}{F} - \frac{1}{F + \Delta F}\right]$$

Wherein, parameters F and $\Delta F$ stand for the focal length of the lens and the range of extended depth of focus of the optical element, both in lens units (mm).

In yet another embodiment of the present disclosure, the optical element may be an axilens, the axilens in conjunction or combination with the integral base single vision spectacle lens may be defined by the following phase function or optical path difference (OPD), described in Equation 6:

$$OPD(\rho, \theta) = \frac{\rho^2}{2\left[F + \Delta F\left(\frac{\rho}{R}\right)^b\right]}$$

Wherein, $\rho$ is the radial coordinate ($\rho = \sqrt{x^2+y^2}$) of the phase function; F and $\Delta F$ stand for the focal length of the lens and the range of extended depth of focus of the optical element, both in lens units (mm); R is the semi-diameter of the optical element, and b is a constant that determines the intensity distribution of the central peak.

In yet another embodiment of the present disclosure, the optical element may be an arbitrarily decentred optical path difference, referred to as a single peacock eye optical element, which is an arbitrarily decentred optical element configured within, in conjunction, in combination, or in juxtaposition to the integral base single vision spectacle lens which may be defined by the following phase function or optical path difference (OPD), described in Equation 7:

$$OPD(x, y) = \frac{[F - (\Delta F/2)]d^2}{\Delta F^2}\ln\left(\frac{\Delta F}{d}x + (F)\right) - \frac{d}{\Delta F}x - \frac{y^2}{2\left(\frac{\Delta F}{d}x + (F)\right)}$$

Wherein, x and y are cartesian coordinates of the phase function; parameters F and $\Delta F$ stand for the focal length of the lens and the range of extended depth of focus of the optical element, both in lens units (mm); and 'd' is the diameter of the optical element.

In some other embodiments of the present disclosure, two individual peacock eye optical elements may be spatially multiplexed or appropriately combined to result in a double peacock-eye optical element. Such double peacock-eye optical elements may be used in conjunction with the integral base spectacle single vision lens to provide desired levels of extension or elongation of depth of focus. In the case of double peacock-eye optical elements, the two optical elements are configured in such a way that one focal segment of the one peacock-eye element is located adjacent to the other along the optical axis with partial overlapping. The total length of the two focal segments of both the individual peacock-eye optical elements results in a much larger depth of focus or elongation of depth of focus to a corrected myopic eye, when combined with an integral base single vision lens. In case of the double peacock-eye optical element, the through focus energy distribution benefits from two separate segments of good performance yet maintaining an acceptable performance in the central part of the total focal segment, where both focal components overlap.

As disclosed herein, when using regional single or double peacock-eye optical elements, the extension or elongation of depth of focus obtained by the peacock eye-based elements is smoother and free of distinct valleys of performance degradation, than with the extension or elongation of depth of focus obtained using a conventional refractive or diffractive Fresnel lens.

In one or more of the spectacle lens embodiments combined with one or more of the contemplated optical elements such as axicon, axilens, lensacon, logarithmic axicon, inverse axicon, inverse logarithmic axicon, light sword element, arbitrarily decentred optical element axis, the transmission function (T) of the spectacle lens is obtained using the following expression, described in Equation 8:

$$T(\rho, \theta) = \exp\left[-i\frac{2\pi}{\lambda}OPD(\rho, \theta)\right]$$

Wherein, $\lambda$ is the wavelength of light; and the amplitude function of the spectacle lens is assumed to be constant across the optic zone of the optical elements.

FIG. 1 shows an uncorrected −2 D myopic model eye (100). When the incoming light (101) of a visible wavelength (for example, 555 nm) of a vergence 0 D, is incident on the uncorrected myopic eye, the resultant image on the retina has a symmetrical blur (102) caused by defocus. This schematic diagram represents an on-axis, geometric spot analysis at the retinal plane.

Figure 2:
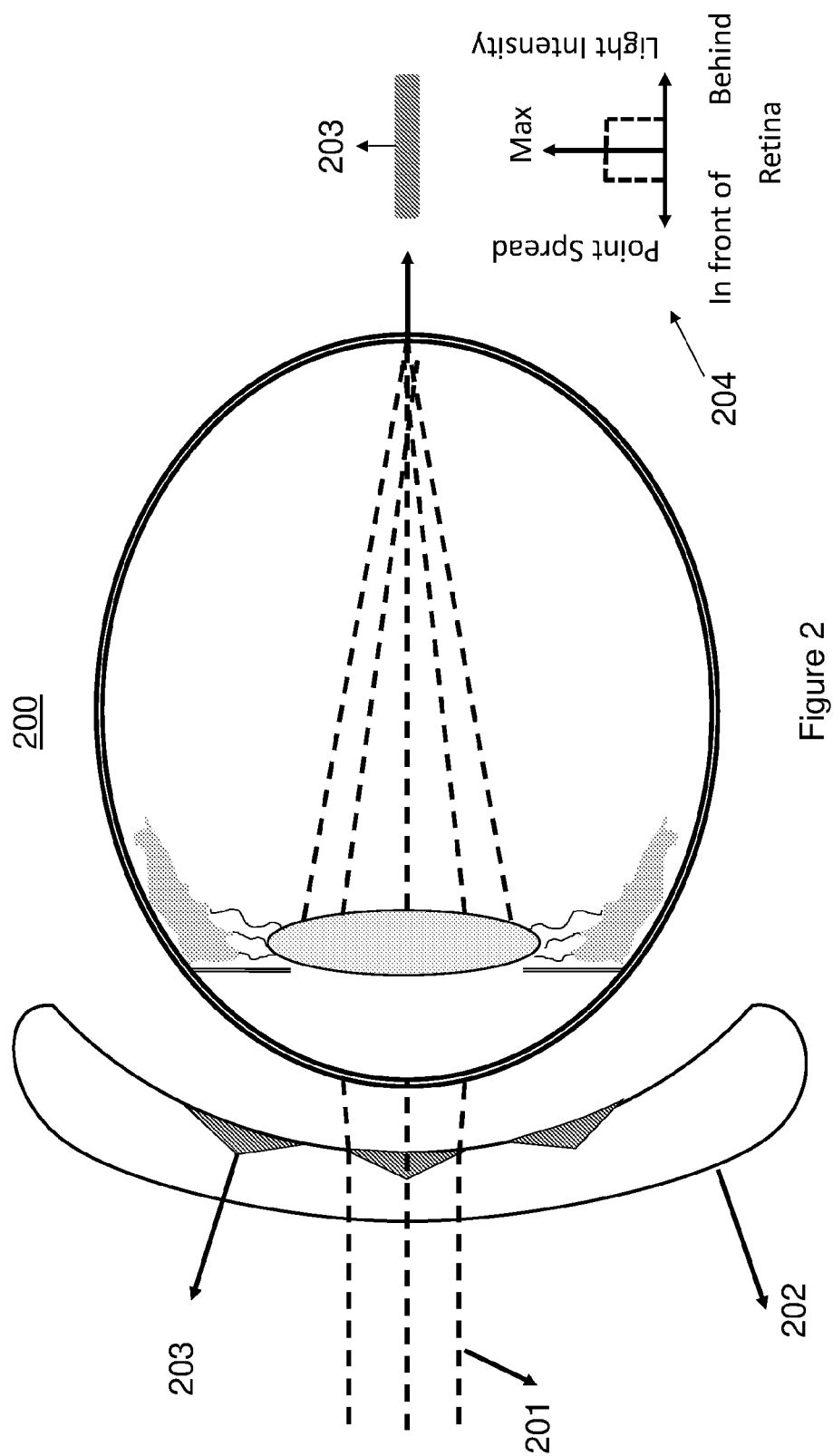
FIG. 2 illustrates a schematic diagram of an on-axis, through-focus retinal image spread, when the incoming light, with a visible wavelength (555 nm) and vergence of 0 D, depicting optical infinity, is incident on a −2 D myopic model eye corrected with one of the spectacle lens embodiments combined with an extended depth of focus regional or auxiliary optical element disclosed herein. The regional or auxiliary optical element disclosed in FIG. 2 is a linear axicon.

FIG. 2 shows the schematic diagram of an on-axis, through focus analysis at the retinal plane, when the uncorrected (Rx: −2 D) myopic model eye of FIG. 1 is corrected with a spectacle lens embodiment of the disclosure.

Here in this example, a linear axicon (203) in combination with the integral single vision base spectacle lens (202) with a power of −2 D is configured such that, when the incoming light (201) of a visible wavelength (for example, 555 nm) of a vergence 0 D, is incident on the corrected myopic eye, the resultant on-axis through focus point spread image on the retina (203) demonstrates an extension of depth of focus at the retina of the corrected myopic eye. The on-axis through focus point spread image offered by one of the spectacle lens embodiments is further described using the plot (204), wherein the on-axis through-focus intensity distribution remains substantially constant across a through-focus region on the retina, also referred to as extension, elongation, or wide-range of the depth of focus. In some other embodiments of the disclosure, a plurality of quartic axicons or a plurality of logarithmic axicons may be considered.

Figure 3:
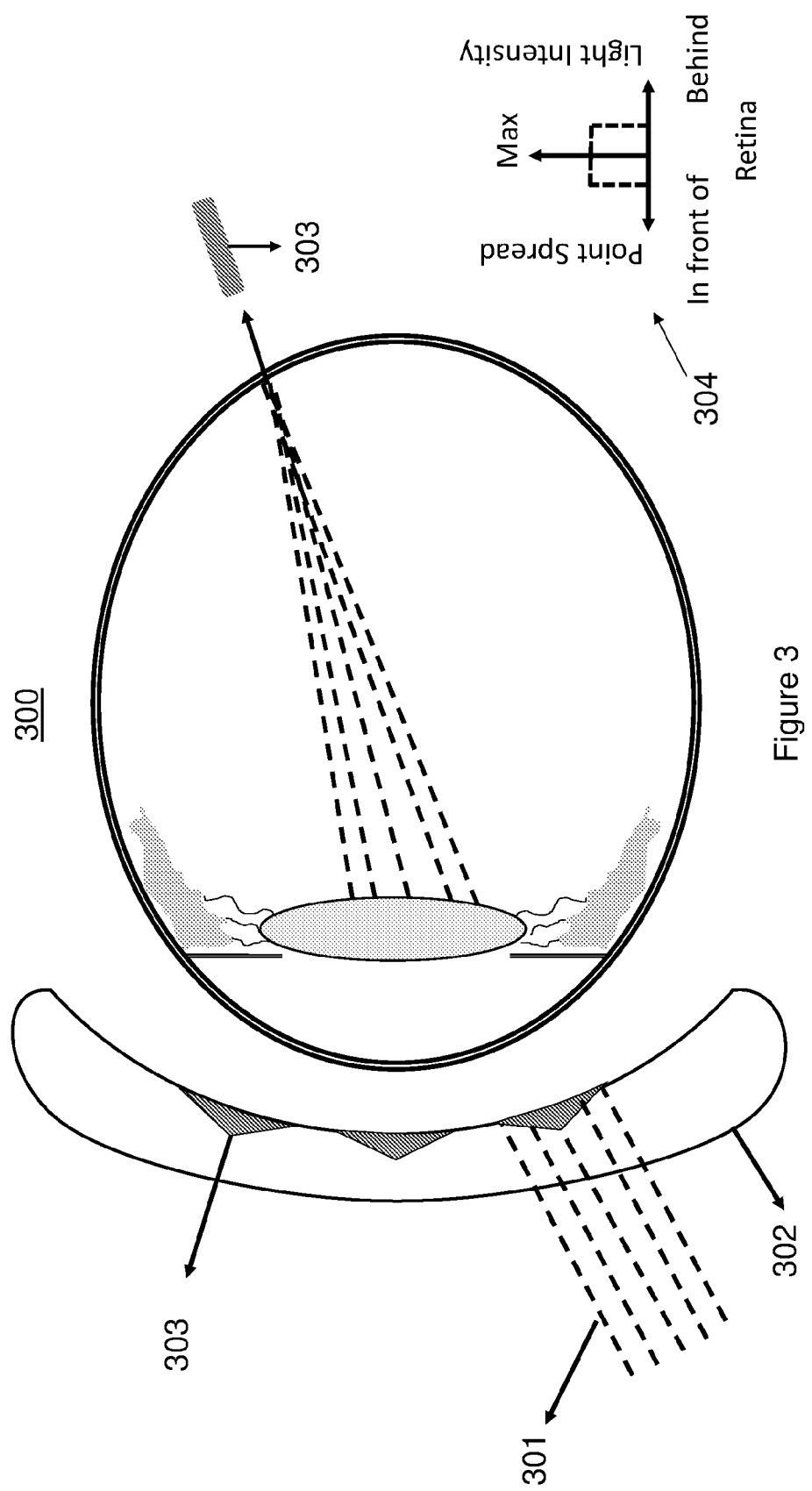
FIG. 3 illustrates a schematic diagram of an off-axis, through-focus retinal image spread, when the incoming light, with a visible wavelength (555 nm) and vergence of 0 D, depicting optical infinity, is obliquely incident on a −2 D myopic model eye corrected with one of the spectacle lens embodiments combined with an extended depth of focus auxiliary optical element disclosed herein. The regional or auxiliary optical element disclosed in FIG. 3 is a linear axicon.

FIG. 3 shows the schematic diagram of an off-axis, through focus analysis at the retinal plane when the uncorrected −2 D myopic model eye of FIG. 1 is corrected with a spectacle lens embodiment of the current disclosure. Here in this example, a linear axicon (303) in combination with the integral single vision base spectacle lens (302) with a power of −2 D is configured such that, when the off-axis incoming light (301) of a visible wavelength (for example, 555 nm) of a vergence 0 D, is incident on the corrected myopic eye, the resultant off-axis through focus point spread image on the retina (303) demonstrates the extension of depth of focus.

The off-axis through focus point spread image offered by the spectacle lens embodiment is further described using the plot (304), wherein the off-axis through-focus intensity distribution remains substantially constant across a through-focus region on the retina.

The contemplated regional or auxiliary optical elements used within or, in combination, in conjunction, or juxtaposition with the integral base single vision spectacle lens embodiment of FIGS. 2 and 3 are linear axicons. However, this example is not to be construed as limiting in scope.

In other embodiments, the contemplated regional or auxiliary optical elements may include an axicon, axilens, inverse axicon, linear axicon, forward linear axicon, backward linear axicon, logarithmic axicon, inverse logarithmic axicon, light sword element, modified light sword elements, single peacock eye element, double peacock eye element or a combination thereof, to provide the desired extension or elongation of the depth of focus to the spectacle wearer's eye at the desired retinal locations. In some embodiments, any of the contemplated regional or auxiliary optical elements may be configured in the forward or backward orientation.

In some other embodiments, a plurality of optical elements may be used within or, in combination, in conjunction, or juxtaposition to the integral base single vision spectacle lens embodiment which may comprise of a plurality of axicons, a plurality of linear axicons, a plurality of forward linear axicons, a plurality of backward axicons, a plurality of quartic axicons, a plurality of axilenses, a plurality of inverse axicons, a plurality of logarithmic axicons, a plurality of inverse logarithmic axicons, a plurality of light sword elements, a plurality of modified light sword elements, a plurality of modified light sword elements with no distinct ridge/ledge/edge, a plurality of single peacock eye elements, a plurality of double peacock eye elements, a plurality of logarithmic axicons, or combinations thereof. In some embodiments, any of the contemplated plurality of regional or auxiliary optical elements may be configured in the forward or backward orientation.

A schematic model eye chosen for illustrative purposes in FIGS. 1 to 3. However, in other exemplary embodiments, schematic raytracing model eyes like Liou-Brennan, Escudero-Navarro and others may be used instead of the above simple model eye.

One may also alter the parameters of the cornea, lens, retina, ocular media, or combinations thereof, to aid further simulation of the embodiments disclosed herein.

A model eye having the optical properties that are comparable to the average human eye may be used to evaluate the in-situ (bench-top) performance of the contemplated spectacle embodiment with one or more of the following regional or auxiliary optical elements: a linear axicon, a quartic axicon, a logarithmic axicon, an axilens, a light sword element, a modified light sword element, a peacock eye element, or a combination thereof, as described herein.

Exemplary Embodiment Design Example 1

Table 1 represents an example myopic model eye. The optical simulations were performed using Optic Studio version 20.1 (Zemax, LLC, USA), however, the same experiment may be performed using similar ray tracing algorithms.

A single wavelength of 589 nm was used for optical computations in this example; however, one could effortlessly expand this modelling exercise to include any wavelengths within the visible spectrum, 420 nm to 780 nm, inclusive.

The specific chosen ocular parameters of the example myopic model eye are not to be construed as limiting in scope. It should only be considered as one example of an exhaustive list of modelling exercises that are available for a person skilled in the art.

For example, a different corneal shape, anterior chamber depth, lenticular shape, vitreous chamber depth or retinal shape may be considered. Further, the example embodiment is designed using a standard CR39; however, this exercise could also be contemplated on any other spectacle materials of choice by a person skilled in the art.

TABLE 1

A myopic model eye with a prescription of −3 DS, fitted with a spectacle lens made of a conventional CR-39 and one of the exemplary embodiments of this disclosure (an axicon).

| | Radius (mm) | Thickness (mm) | Refractive Index | Semi-Diameter (mm) | Conic |
|---|---|---|---|---|---|
| Object | Infinity | 6000.000 | | 0.000 | 0.000 |
| Start | Infinity | 5.000 | | 2.000 | 0.000 |
| Cover | Infinity | 0.500 | 1.498 | 2.000 | 0.000 |
| Axicon | Infinity | 1.000 | 1.560 | 2.000 | 0.000 |
| Ant Surface | Infinity | 1.500 | 1.498 | 2.000 | 0.000 |
| Post Surface | 162.000 | 13.000 | | 2.000 | 0.000 |
| Ant Cornea | 7.750 | 0.550 | 1.376 | 5.750 | −0.250 |
| Post Cornea | 6.400 | 3.000 | 1.334 | 5.500 | −0.400 |
| Pupil | Infinity | 0.450 | 1.334 | 5.000 | 0.000 |
| Ant Lens | 10.800 | 3.800 | 1.423 | 4.500 | −4.798 |
| Post Lens | −6.250 | 17.725 | 1.334 | 4.500 | −4.101 |
| Retina | −12.000 | 0.000 | | 10.000 | 0.000 |

An Odd asphere was used to characterise the axicon surface (in the Example 1) configured on the front surface of the spectacle lens whose sag (z) is represented by Equation 9;

$$z = \beta_1\rho^1 + \beta_2\rho^2 + \beta_3\rho^3 + \beta_4\rho^4 + \beta_5\rho^5 + \beta_6\rho^6 + \beta_7\rho^7$$

Wherein, $\beta$ is the coefficients of the odd asphere surface; and $\rho$ is radial co-ordinate described as $\sqrt{x^2+y^2}$ The coefficients of the 7 terms used on the odd asphere surface to represent the axicon embodiment referred to in design Example 1 are tabulated below (Table 2).

TABLE 2

The optical prescription of an exemplary axicon embodiment (Example 1).

| $\beta 1$ | $\beta 2$ | $\beta 3$ | $\beta 4$ | $\beta 5$ | $\beta 6$ | $\beta 7$ |
|---|---|---|---|---|---|---|
| −2.76E−03 | 2.77E−03 | 8.30E−03 | −2.78E−03 | −2.03E−04 | 5.44E−04 | −1.28E−04 |

An optical transfer function is one of the measures used to evaluate the quality of the optical image formed on the retina of the model eye. In other embodiments, other retinal image quality metrics may be used to ascertain the achieved levels of extension of depth of focus, for example, a through-focus spot diagram, a through-focus point spread function diagram, a through-focus modulation transfer function, or a through-focus phase transfer function, as disclosed herein.

Figure 4:
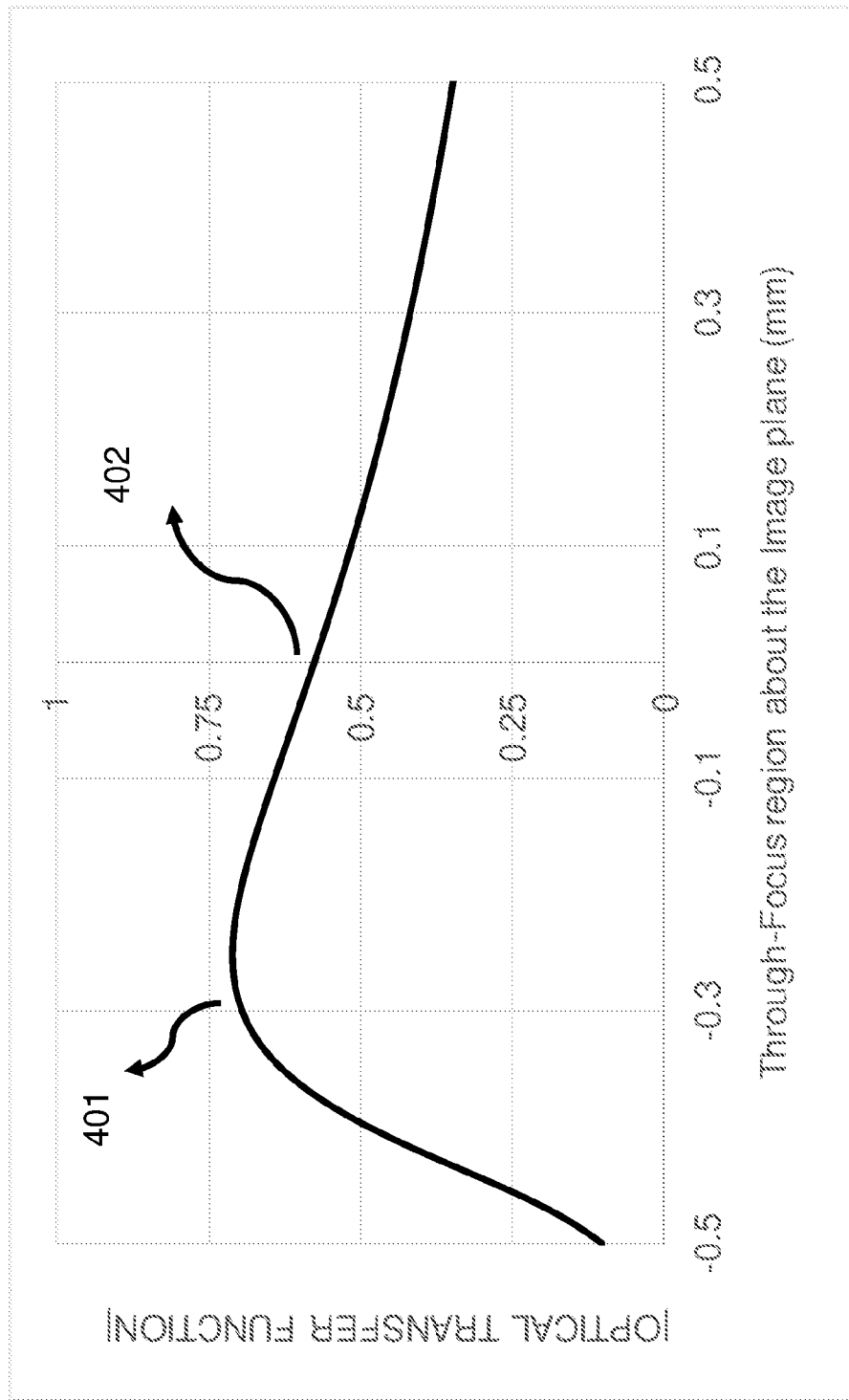
FIG. 4 demonstrates the modulus of the on-axis through-focus optical transfer function of the myopic model eye described in the FIG. 1; when corrected with the exemplary embodiment described in FIG. 2. The optical performance of the model eye was evaluated at a 4 mm pupil.

FIG. 4 demonstrates the modulus of on-axis through-focus optical transfer function measured at a specific spatial frequency of 75 cycles/mm when an exemplary axicon embodiment (Example 1) is used in conjunction with an integral base single vision spectacle lens (in CR39 polymer material) to correct a myopic model eye as described in Table 1 herein.

The optical performance was evaluated at a 4 mm pupil and the field angle chosen for performance evaluation was on-axis. As can be seen FIG. 4, the optical transfer function of the exemplary embodiment offers a smooth optical transfer function between −0.3 mm (in front of the retina) and 0.1 mm (on or behind the retina) denoting that the desired extension of depth of focus on the retina of the model eye has been achieved.

In other embodiments, the through-focus optical transfer function measurements may be considered at other spatial frequencies, for example, at 25 cycles/mm, at 50 cycles/mm or at 100 cycles/mm. In some other examples, the multiple spatial frequencies or a band of spatial frequencies may be considered to gauge the performance of the disclosed embodiment.

In other embodiments the performance evaluation may be considered at other pupils, for example at least 2.5, 3, 3.5, 4, 4.5, 5, 5.5 or 6 mm. In some other examples, the performance may be evaluated at multiple pupils for the performance to be deemed satisfactory. In some other embodiments, the performance evaluation may be considered off-axis, for example at least 5 degrees, at least 10 degrees, at least 15 degrees, or at least 20 degrees field angle.

The exemplary embodiment described in Design Example 1 can be used either in an isolated location, i.e., at only one location on the integral base spectacle lens or can also be used at multiple desired locations of the integral base spectacle lens.

For example, in some other embodiments, the desired location of the axicon embodiment may be specifically configured over the pupillary area in close proximity to the distance viewing region or in some other instances, the desired location of the axicon embodiment may be in proximity, or entirely in the region used for viewing near objects through the integral base spectacle lens.

The diameter of the exemplary embodiment (axicon in design Example 1) is 4 mm; however, in other embodiments, the coefficients defining the axicon can be reconfigured to achieve the required levels of extension in depth of focus on the retina by creating another axicon element with a much smaller diameter, for example, 0.75 mm, 1 mm, 1.5 mm, or 2 mm. The preferred diameter of the exemplary embodiment disclosed herein is between 0.75 mm and 4 mm, 0.75 mm and 2 mm, or 0.75 mm and 3 mm.

The material of choice for designing the Example 1 of the present disclosure has a refractive index of 1.56 (as shown in Table 1: surface axicon) with another adjoining lower refractive index material of 1.498 (as shown in Table 1: surface cover and anterior surface). In this example, the axicon surface is sandwiched between the lower refractive index material and the integral base lens substrate. In various embodiments of the disclosure, the lower the refractive index mismatch between the regional or auxiliary optical element and the adjacent surface, the greater the surface sag variations required to produce the desired optical effect described in this disclosure. For other embodiments, a person skilled in the art may use other refractive materials of choice to achieve similar outcomes presented in the disclosure. Any variations of material choices and desired refractive index mismatches adjacent to regional or auxiliary optical elements are considered to be well within the scope of this present disclosure.

In some other embodiments, the coefficients of the seven (7) terms used to describe the odd aspheric surface representing the axicon embodiment of design Example 1 may be configured with a preferred range of values.

TABLE 3

The minimum and maximum values for the coefficients $\beta1$ to $\beta7$ for describing an axicon as contemplated in the disclosure herein.

| Coefficients | $\beta1$ | $\beta2$ | $\beta3$ | $\beta4$ | $\beta5$ | $\beta6$ | $\beta7$ |
|---|---|---|---|---|---|---|---|
| Min | −3E−03 | −3E−03 | −9E−03 | −3E−03 | −3E−04 | −6E−04 | −2E−04 |
| Max | +3E−03 | 3E−03 | 9E−03 | 3E−03 | 3E−04 | 6E−04 | 2E−04 |

FIG. 5 illustrates a few variations of spectacle lens embodiments combined with regional or auxiliary optical elements contemplated in the current disclosure. For example, a logarithmic axicon (example 501*b* and 502*b*) and light sword elements (503*b*), in combination with an integral base single vision spectacle lens (501, 502 and 503, respectively).

Some embodiments illustrate that the regional or auxiliary optical elements are in juxtaposition with the front surface of the embodiment (502*b*), while some other regional or auxiliary optical elements are in juxtaposition with the back surface of the embodiment (501*b*).

A regional or auxiliary optical embodiment involving a light sword element, or a modified light sword element, may preferably be configured on the posterior surface of the integral base spectacle lens to avoid the formation of ledge potentially becoming an aesthetic issue i.e., cosmetically unappealing or displeasing to the wearer. Further, consider a light sword element or a modified light sword element on the back surface will also aid the manufacturability of the regional or auxiliary optical element provided the regional or auxiliary optical element has a refractive index that is substantially different from the refractive index of the integral base lens. The preferred absolute refractive index mismatch or difference between the integral base lens and the auxiliary optical element may be configured between at least 0.02, at least 0.04, at least 0.06, at least 0.08, or at least 0.1. The lower the refractive index mismatch the greater the sag profile variations allowing easier manufacturability of the features and vice versa.

In some embodiments, the preferred embodiment may be determined by the feasibility to design and manufacture a refractive logarithmic axicon that generates a quasi-diffraction-free beam with nearly constant beam size and intensity over a predetermined range on the retina.

For example, in some embodiments, the auxiliary or regional optical elements can be characterised with incoherent light and demonstrated good correspondence with the predicted behaviour of the intensity distribution and spot size on the retina. The through-focus energy distribution may be configured to be nearly constant over most of the designed range. Such logarithmic axicons can provide where a large depth of field and uniform axial intensity or energy distributions across various regions of the retina, as described herein.

Figure 5A:
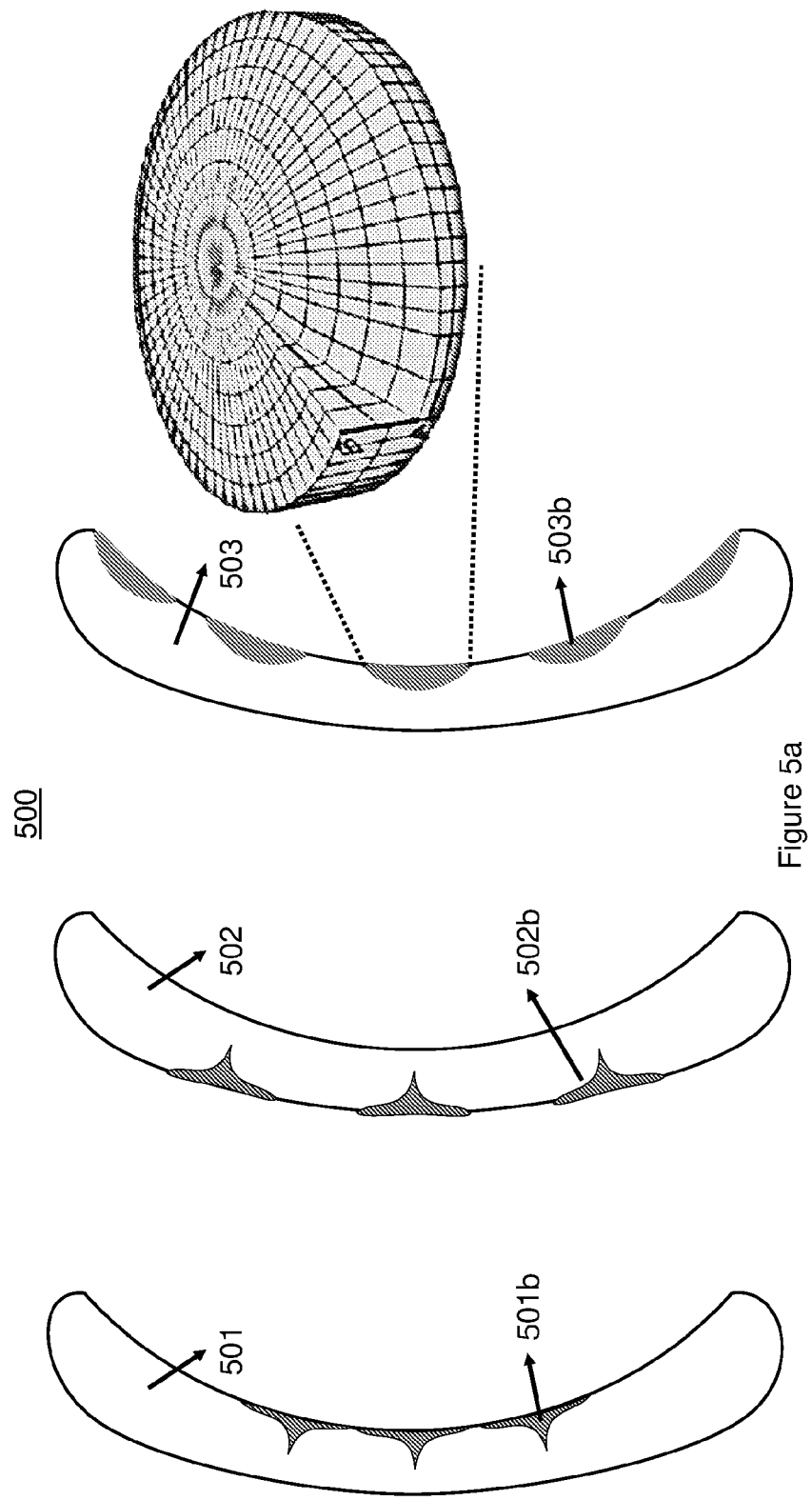
FIG. 5a illustrates a selection of exemplary embodiments of the current disclosure, for example, logarithmic axicons, positioned either on the front or back surface of the spectacle lens; and for example, light sword regional or auxiliary optical elements positioned on the back surface of the spectacle lens, as disclosed herein.

The regional or auxiliary optical elements combined with the spectacle lens in the embodiment example shown in FIG. 5a comprises of logarithmic axicons (501b and 502b) and light sword elements (503b) disclosed herein.

In some embodiments, implementation of refractive logarithmic axicons within the integral base spectacle lens may require direct laser writing using femtosecond laser via two-photon polymerization of resins, as described in the paper by Lin et al in Journal of Lightwave Technology, Volume 28(8) 2010, entitled "Production of Integratable Monolithic Micro Logarithmic Axicon Lenses", which is incorporated herein its entirety. The embodiment (501b) illustrates a logarithmic axicon which is combined with the front surface, while the embodiment (502b) illustrates a logarithmic axicon that is in juxtaposition with the back surface and the embodiment (503b) illustrates a light sword element configured in conjunction with the posterior surface of the spectacle lens.

In some embodiments, the refractive logarithmic axicon may be configured in the forward configuration, while in some other embodiments, the refractive logarithmic axicons may be configured in the backward configuration.

In some other embodiments of the disclosure, a union of two logarithmic axicons that have different topological or surface variations in different zones of the axicon expansion may be considered to be implemented in combination, conjunction with the base integral single vision spectacle lens.

A union of two logarithm axicons are referred to as vortex axicons herein. For example, a vortex axicon may be configured in combination with an integral base spectacle using two logarithmic axicons, one on the front surface of the spectacle lens and another on the back surface of the spectacle lens such that their geometric centres are substantially aligned.

In some embodiments, the light sword optical element, or modified light sword optical element, or a peacock-eye optical element, may require a continuous variation of the instantaneous radius of curvature as a function of the azimuthal angle about the geometric centre of the regional or auxiliary optical element.

When used within or, in conjunction, in combination or juxtaposition to the anterior surface of the integral base spectacle lens, the regional or auxiliary optical element may result in a ridge or ledge protruding outwards from the anterior surface (512), which may be cosmetically unacceptable for the spectacle wearer or may be in attractive design choice as it may attract dust and dirt during normal use.

In such instances, positioning the light sword element on the back surface of the spectacle lens may be contemplated to address the shortcomings discussed herein.

In some embodiments, the following variables: the desired extension of depth of focus achievable by an optical element; manufacturability of the surface of the optical element; and the gradient of the refractive index between the adjacent surfaces; may govern the choice of whether the contemplated optical elements should be used either in conjunction with the anterior surface, posterior surface, or matrix of the material of the spectacle lens. In some embodiments, the contemplated optical element may be used in conjunction with both anterior and posterior spectacle surfaces; while in some other embodiments, the elements may be incorporated within the matrix of the material.

In some embodiments, the required power variation with the modified light sword element or peacock-eye element may be too small, as gauged by the change in the radius of curvature desired on the surface, to manufacture with acceptable precision levels. In such instances, positioning the light sword element in conjunction with the posterior spectacle surface may be contemplated.

As a smaller refractive index gradient between the refractive surface may facilitate improved manufacturability of the small yet desired instantaneous curvature changes of the light sword element.

In yet another example embodiment of the disclosure, a spectacle lens comprising an axicon, and/or a light sword element implemented to control the refractive foci of incident light on the said spectacle lens may be contemplated. The regional and auxiliary optical elements combined with the integral base spectacle lens in the embodiment showcased in FIG. 5a comprises of a plurality of axicons, logarithmic axicons, light sword elements.

In some embodiments, for example, the surface may be further defined by a Q-type asphere over the axicon, logarithmic axicon, or a light sword element to optimise the desired levels of depth of focus.

Specific details of the Q-type aspheres are described in the following paper, which is incorporated herein in its entirety by reference: Forbes, "Shape specification for axially symmetric optical surfaces", Optics Express (2007), Volume (15), Issue (8).

In some other embodiments of the contemplated disclosure, additional surface descriptions may be contemplated over the said linear axicons, logarithmic axicons, or light sword elements, for example, base surfaces defined by an asphere, odd asphere, an extended odd polynomial, an extended even polynomial, a conic section, a biconic section, a toric surface, a Bessel function, a Jacobi polynomial expansion or combinations thereof.

In an example embodiment of the disclosure, an integral base single vision spectacle lens comprises of an auxiliary optical element(s) configured with an angular modulation of phase transmittance (FIG. 5a). The functionality of the regional or auxiliary optical element is further described in FIG. 5b.

Axicons and light sword element based optical element focus light into a focal line segment and are therefore well suited for extended depth of focus applications. In the case of light sword elements, the angular variation of phase transmittance offers the independence of power on pupil changes.

Figure 5B:
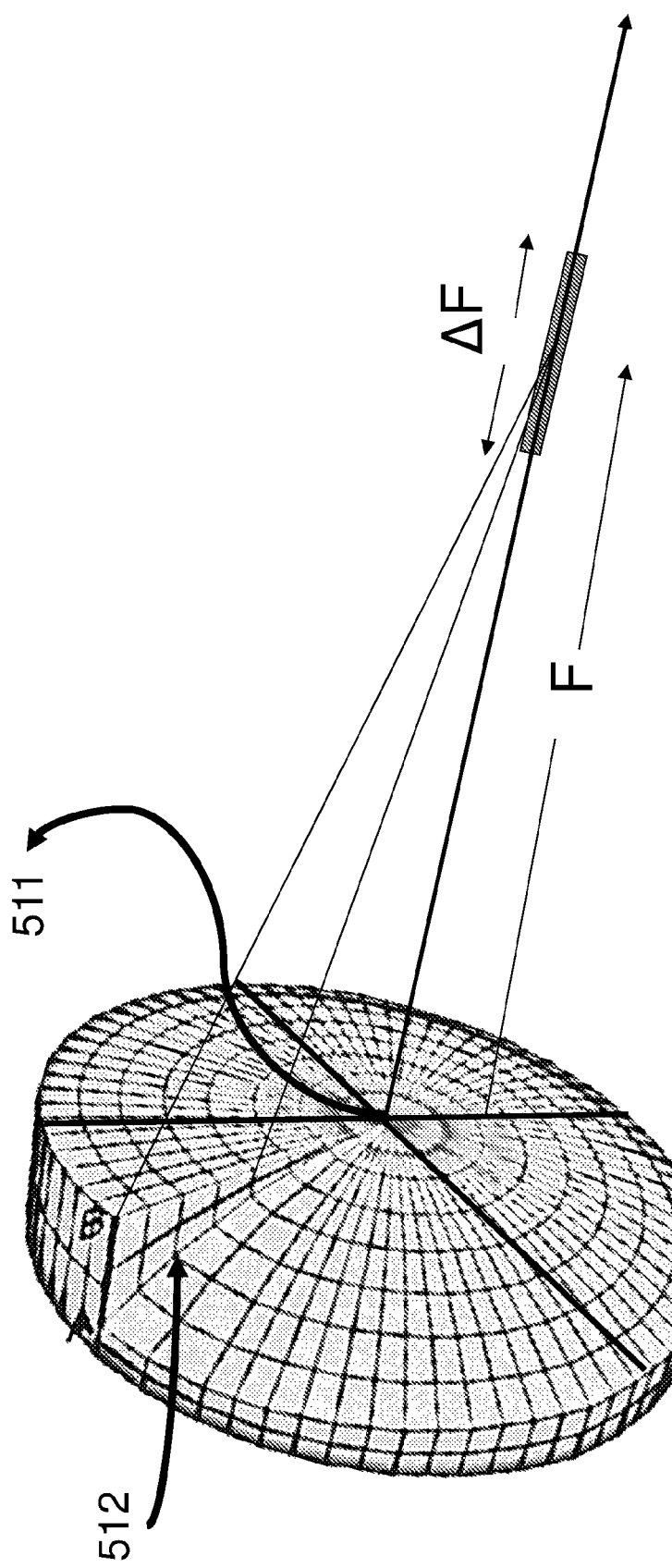
FIG. 5b illustrates the features of one of the light-sword regional or auxiliary optical element of the current disclosure, for example, the exemplary light sword element is configured such that the light passing through the light sword results in an extended depth of focus region about its' focal plane. The angular variation in the radius of curvature of the light sword element results in a visible ledge or ridge, as disclosed herein.

A purposeful configuration of a gradient in the instantaneous radius of curvature as a function of an angular co-ordinate, about the geometric centre of the optical element (511), creates a depth of focus range ($\Delta F$) about a focal point (F), as described in FIG. 5b. The rate of change in the instantaneous radius of curvature as a function of an angular co-ordinate may be manipulated in the function of the required design needs, for example, the required levels of extension of depth of focus, in diopters.

Figure 5C:
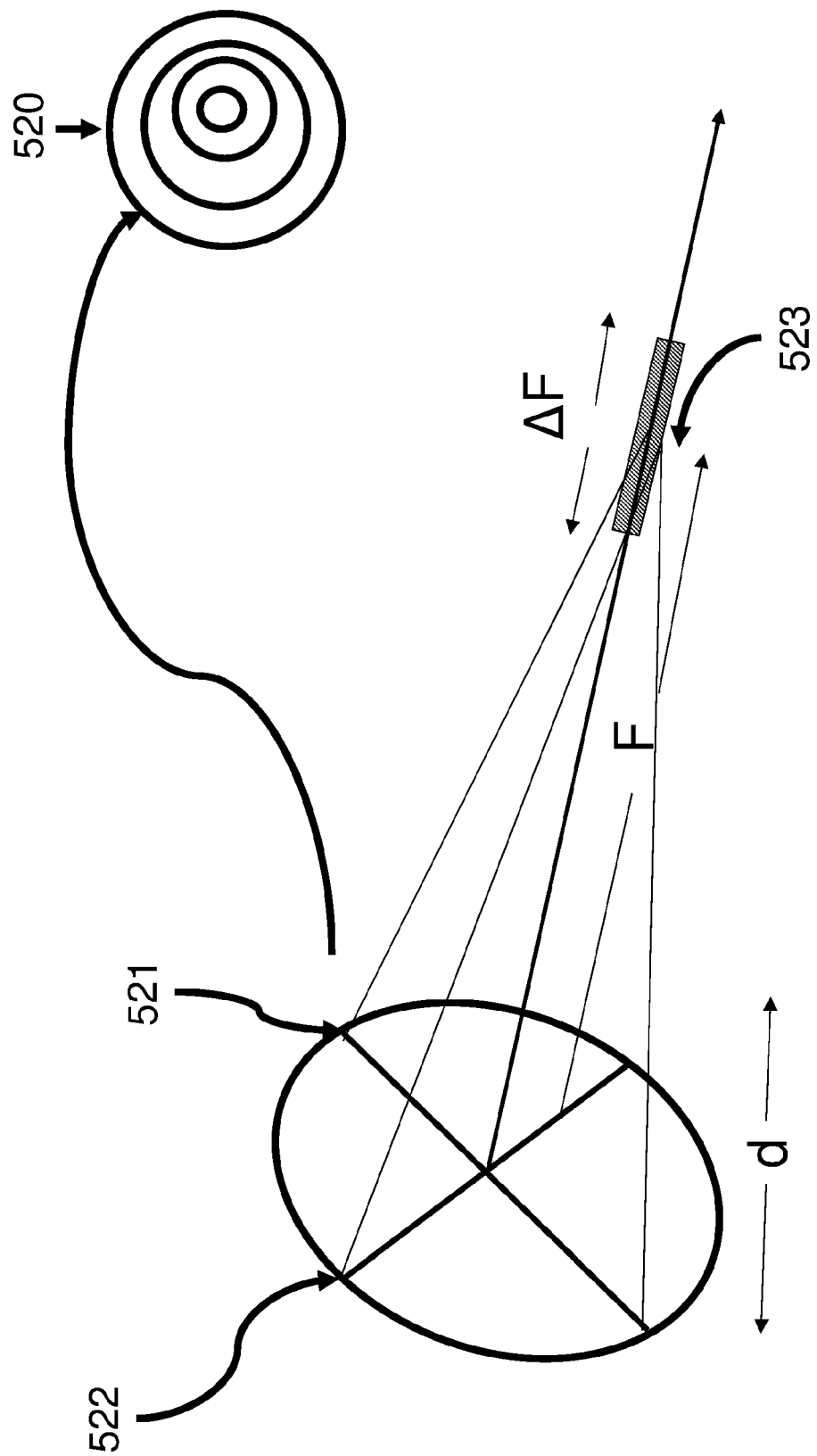
FIG. 5c illustrates the features of one of the single peacock-eye regional or auxiliary optical element of the current disclosure, for example, the exemplary single peacock-eye is configured such that the light passing through the single peacock-eye results in an extended depth of focus region about its' focal plane.
Figure 5D:
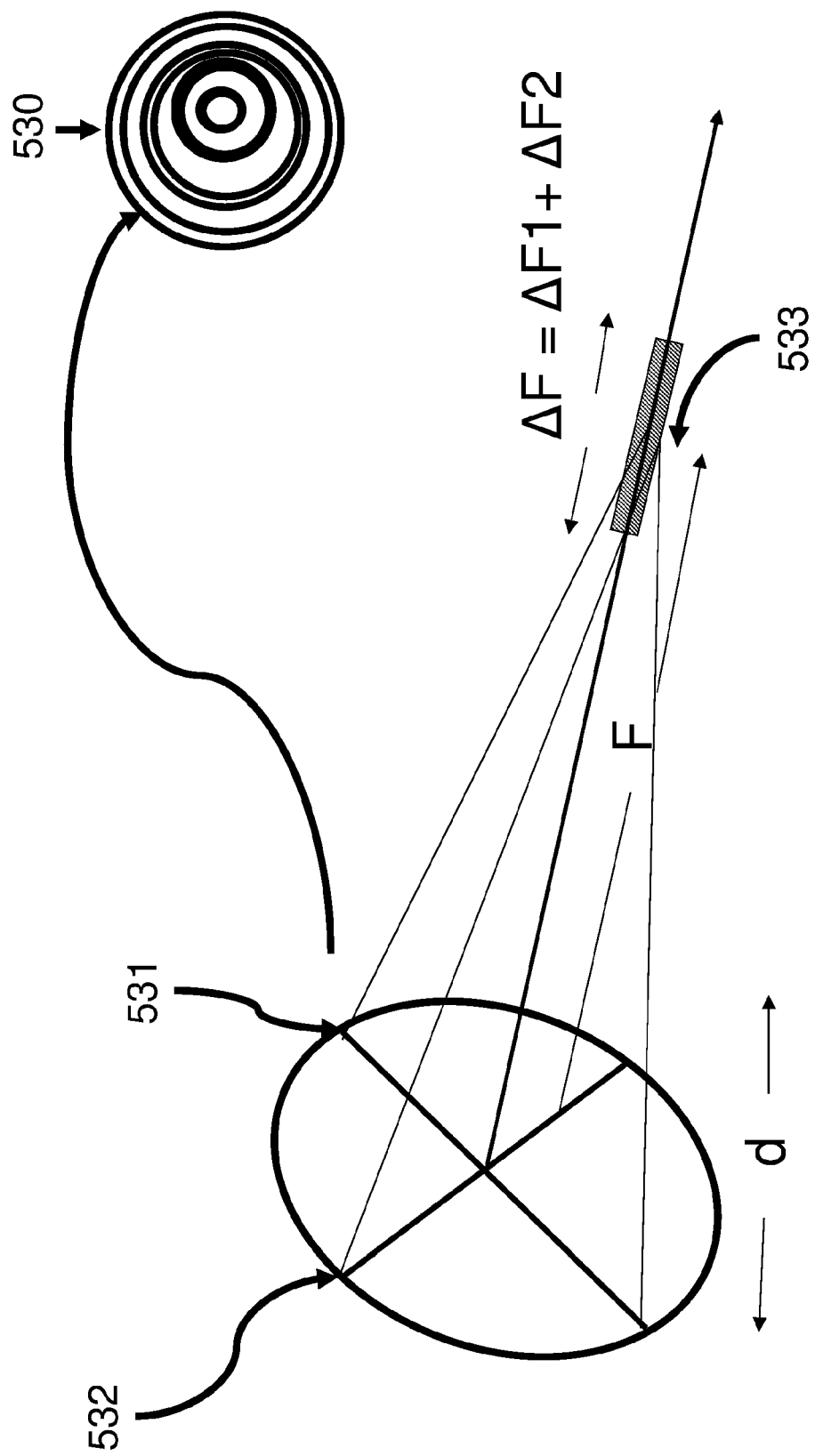
FIG. 5d illustrates the features of one of the double peacock-eye regional or auxiliary optical element of the current disclosure, for example, the exemplary single peacock-eye is configured such that the light passing through the double peacock-eye results in an extended depth of focus region about its' focal plane.

In an example embodiment, an integral base spectacle lens comprises of an auxiliary or regional optical element, the optical element may be an arbitrarily decentred optical element, referred to as a single peacock-eye optical element (520), as disclosed in FIG. 5c. The decentred optical element is configured with an optical path difference described by Equation 7.

The functionality of this regional or auxiliary single peacock-eye optical element (520) is further described in FIG. 5c; wherein the incident plane wave of light is focused onto a focal segment 523 about the focal length F; in this case the diameter of the optical element is 'd' with a varying optical path difference between the horizontal 521 and the vertical 522 meridians.

In another example embodiment of the disclosure, two arbitrarily decentred optical elements may be superimposed to construct a double peacock-eye element (530). The functionality of this regional or auxiliary double peacock eye optical element (530) is further described in FIG. 5d; wherein the incident plane wave of light is focused onto a focal segment 533 about the focal length F; in this case the diameter of the optical element is 'd' with a varying optical path difference between the horizontal 531 and the vertical 532 meridians.

In this example, the total length of the focal segment created by the double peacock-eye element is the sum of individual focal segments caused by its constituent single peacock-eye elements.

In some embodiments, the purposefully configured variation in the radius of curvature may be optimised to yield at least 0.5 D, at least 1 D, at least 1.5 D, at least 2 D, or at least 2.5 D of the depth of focus. The greater the mismatch between the maximum and minimum instantaneous radius of curvatures within the regional optical element, the greater the shape discontinuity observed.

Figure 6:
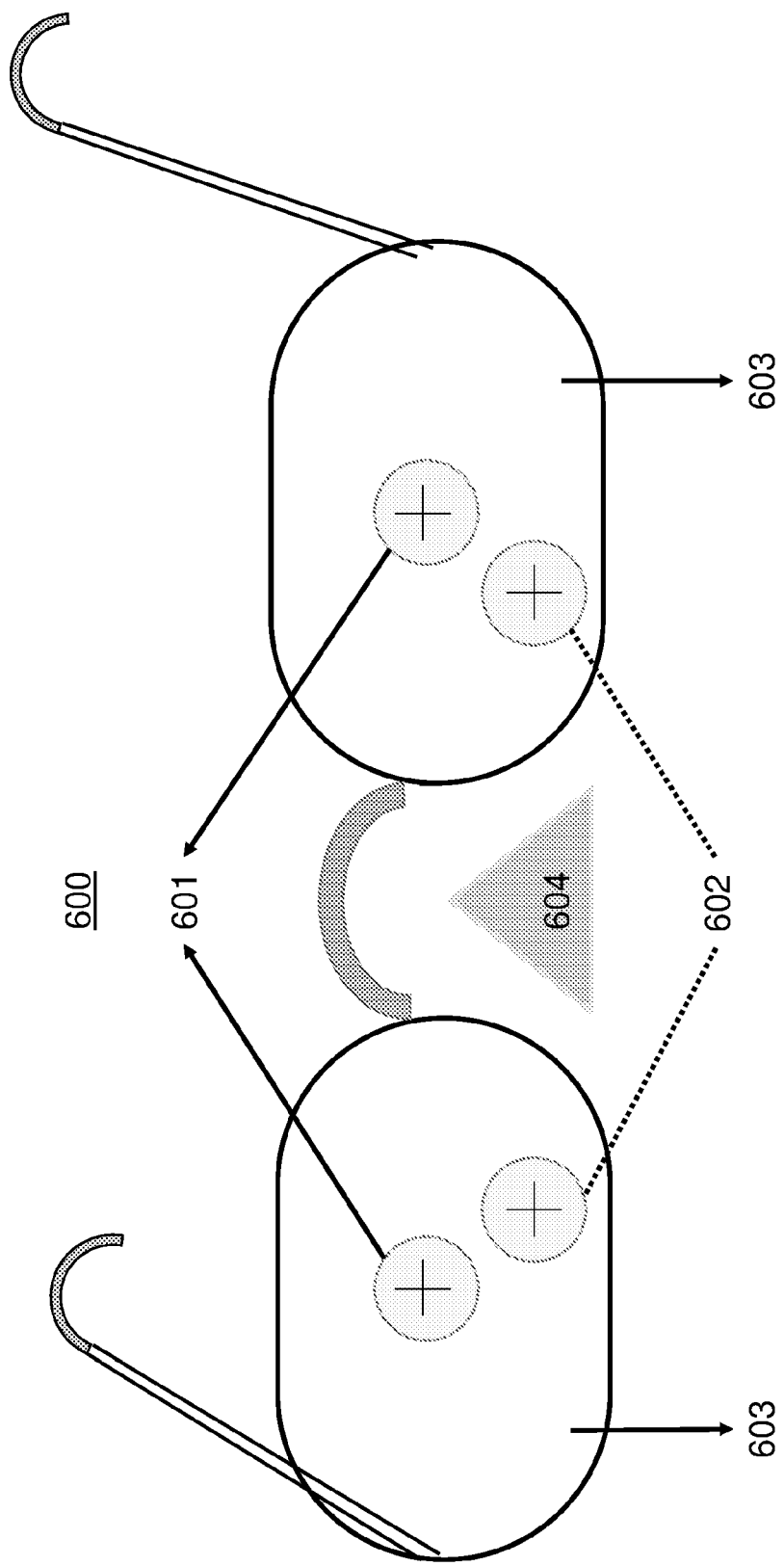
FIG. 6 illustrates the frontal view of another spectacle lens embodiment combined with auxiliary optical elements of the disclosed invention herein. The contemplated auxiliary optical element embodiments of the present disclosure are configured within dedicated distance and near zones.

In some embodiments of the disclosure, an alternative option of avoiding significant shape discontinuities are proposed by considering specific optical profiles, disclosed herein. The regional or auxiliary optical elements combined with the integral base single vision spectacle lens in the embodiment shown in FIG. 6 are confined to two distinct regions or zones on the spectacle lens.

In this example, a zone (601) corresponding to the prescription allowing viewing of far visual distances, which covers the pupil of the spectacle wearer in the primary gaze. Another zone (602) corresponds to viewing near visual distances, covering the pupil of the spectacle wearer in an inferior-nasal gaze (i.e., downwards, and inwards towards the nose 604).

In this example, a zone (603) with distance prescription which is free, substantially free, devoid, or substantially devoid of the contemplated extended depth of focus regional or auxiliary optical elements. This is one of the contemplated designs of the current disclosure. In some other embodiments of the disclosure, only one regional or auxiliary optical element may be combined with the integral base single vision spectacle lens in each of these zones or regions (far and/or near).

In yet another embodiment, a plurality of optical elements may be configured in each of these said distance and/or near zones (i.e., far and/or near zones).

In another example embodiment of the present disclosure, the spectacle lens may have two distinct areas of far and near vision correction zones that may be substantially aligned with the pupil centre of the wearer, while the wearer views far and near viewing distances, respectively.

In some examples, the distinct areas of far and near vision correction may have one or more regional or auxiliary optical element that provides an extended depth of focus at the retinal level of the spectacle wearer, as disclosed herein.

Figure 7:
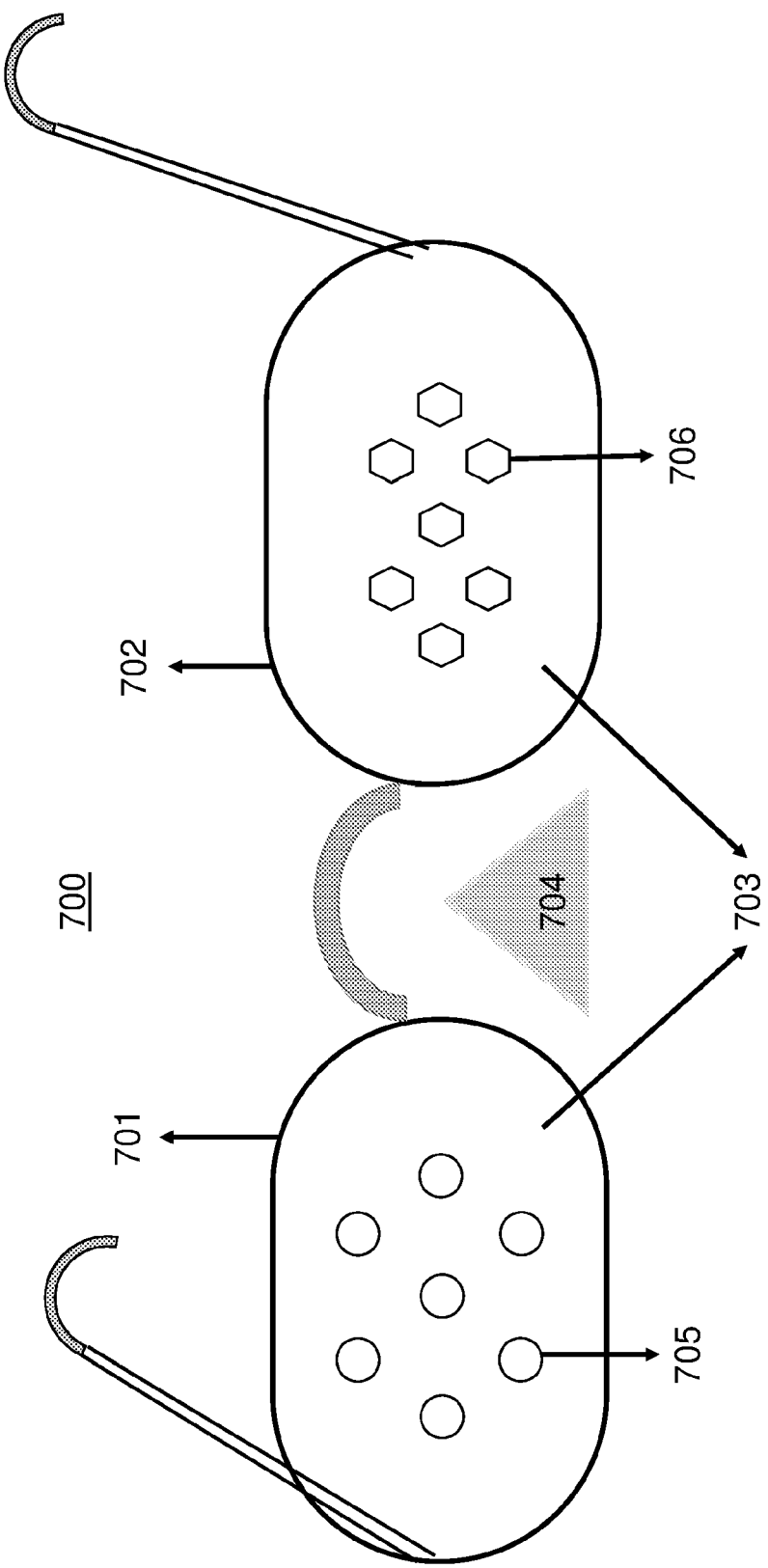
FIG. 7 illustrates the frontal view of another spectacle lens embodiment combined with auxiliary optical elements of the disclosed invention herein. The contemplated embodiments of the present disclosure are configured across the spectacle lenses without limiting the elements to any dedicated distance and near zones.

The regional or auxiliary optical elements combined with the integral base single vision spectacle lens in the embodiment shown in FIG. 7 are positioned in different arrangements spread across the integral base single vision spectacle lens. For example, the left lens (701) of the spectacle embodiment, described in FIG. 7, has a certain arrangement of substantially circular-shaped optical elements (705) about the optical centre.

On the other hand, the right lens (702) of the spectacle embodiment (702), described in FIG. 7, comprises of hexagonal-shaped optical elements (706) which are arranged substantially across the horizontal meridian of the spectacle lens. As noted, a zone (703) configured with base distance prescription which is free, substantially free, devoid, or substantially devoid of the contemplated extended depth of focus optical elements.

Prior Art Design

To demonstrate the improvements of the current disclosure over the prior art described using defocus based lenslets, for example defocus incorporated multi-segment spectacle lenses disclosed in the prior art U.S. Ser. No. 10/268,050B2, the performance of the prior art lenses is described in a specific experiment setting and compared with the results obtained with the embodiments of the current disclosure under the same experimental setting.

Figure 8:
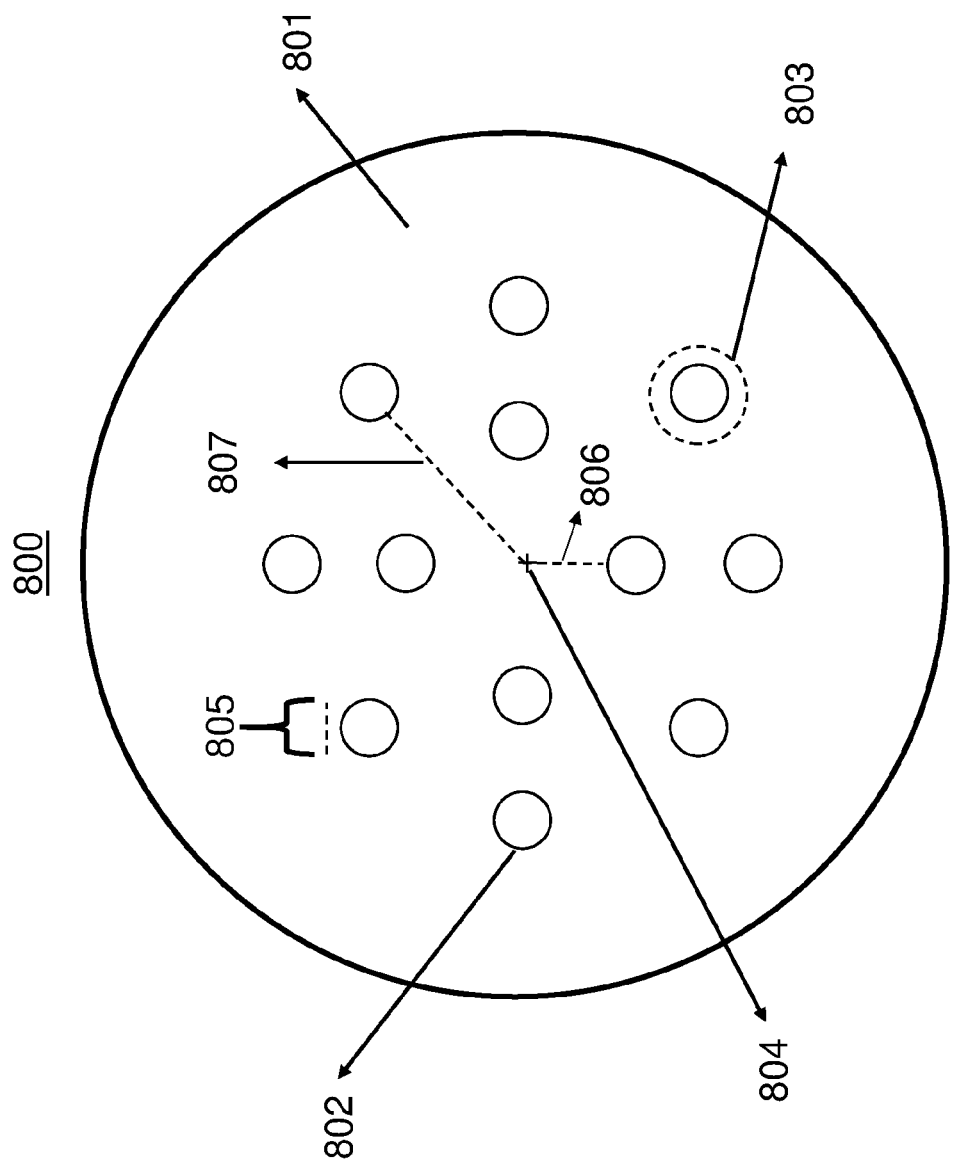
FIG. 8 illustrates the frontal view of a spectacle lens of the prior art, wherein about 12 regional defocus based lenslets are configured in a certain arrangement. The first central 4 defocus based lenslets are configured within a fixed radius of approximately 3 mm from the optic centre and separated by approximately 90 degrees each about the optical axis; while the rest of the 8 lenslets are configured within a fixed radius of approximately 6 mm from the optic centre and separated by approximately 45 degrees each about the optical axis.

FIG. 8 illustrates a prior art spectacle lens (800) designed using defocus based lenslets. The base spectacle lens (801) is designed with 12 defocus based lenslets (802) configured in a certain arrangement.

In this example, certain arrangement (FIG. 8, 800) of the defocus based lenslets can be described as two sets characterised by their fixed distance from the optic centre (804).

In this example, the first set of four (4) defocus based lenslets configured within a fixed radius of approximately 3 mm (806) from the optical centre (804); while the second set of the eight (8) defocus based lenslets (807) is configured within a fixed radius of approximately 6 mm from the optical centre (804).

In this example, the first set of 4 defocus based lenslets are separated from the immediate adjacent lenslets by approximately 90 degrees defined about the optical centre (804). The second set of the eight (8) defocus based lenslets are separated from the immediate adjacent lenslets by approximately 45 degrees defined about the optical centre (804). The diameter of the spectacle lens is approximately 50 mm.

In this example, the diameter of each of the defocus based lenslets (805) configured on the front surface of the spectacle lens is approximately 2 mm. A circumscribing region of approximately 4 mm in diameter is selected about the defocus based lenslets of the prior art spectacle lens (803) is used to describe its optical properties; which serve as a representative for all 12 lenslets of the prior art spectacle lens.

Figure 9:
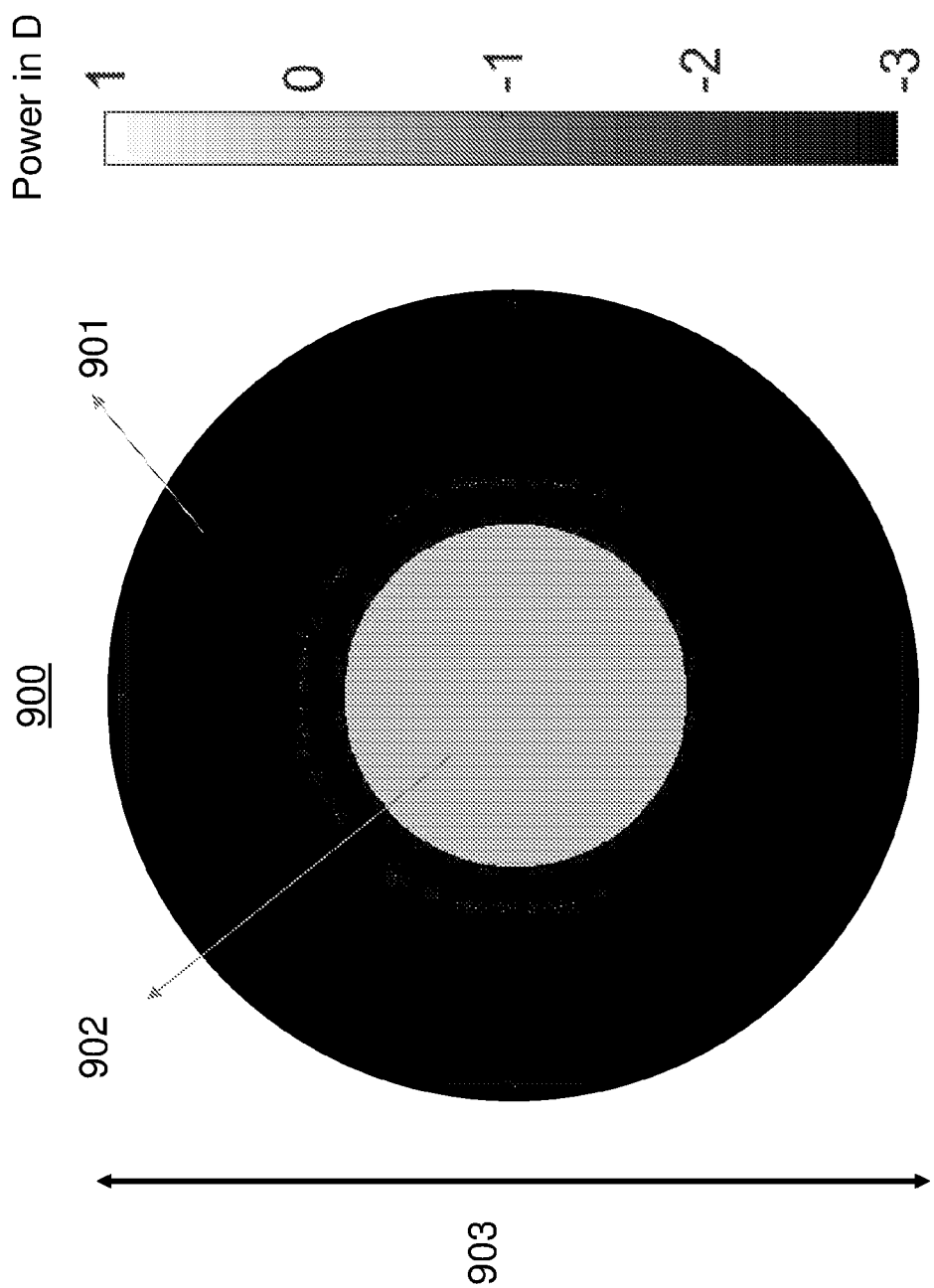
FIG. 9 illustrates the power profile of a defocus based lenslet and the circumscribing region about the defocus based lenslet of the prior art spectacle lens, described in FIG. 8.

In this example, the power profile of the circumscribing region (803) of the prior art spectacle lens is illustrated in FIG. 9 (900). In this example, the total diameter of the circumscribing region (903) is approximately 4 mm. The defocus incorporated region of the prior art spectacle lens is approximately 2 mm in diameter (902). The base prescription of the prior art spectacle lens described in 901 is approximately about −3 D and the defocus incorporated region 902 is incorporated with approximately +3 D spherical power relative to the base prescription. The prior art spectacle lens described comprises of a plurality of defocus incorporated multi segment regions, as described in FIG. 9.

Figure 10:
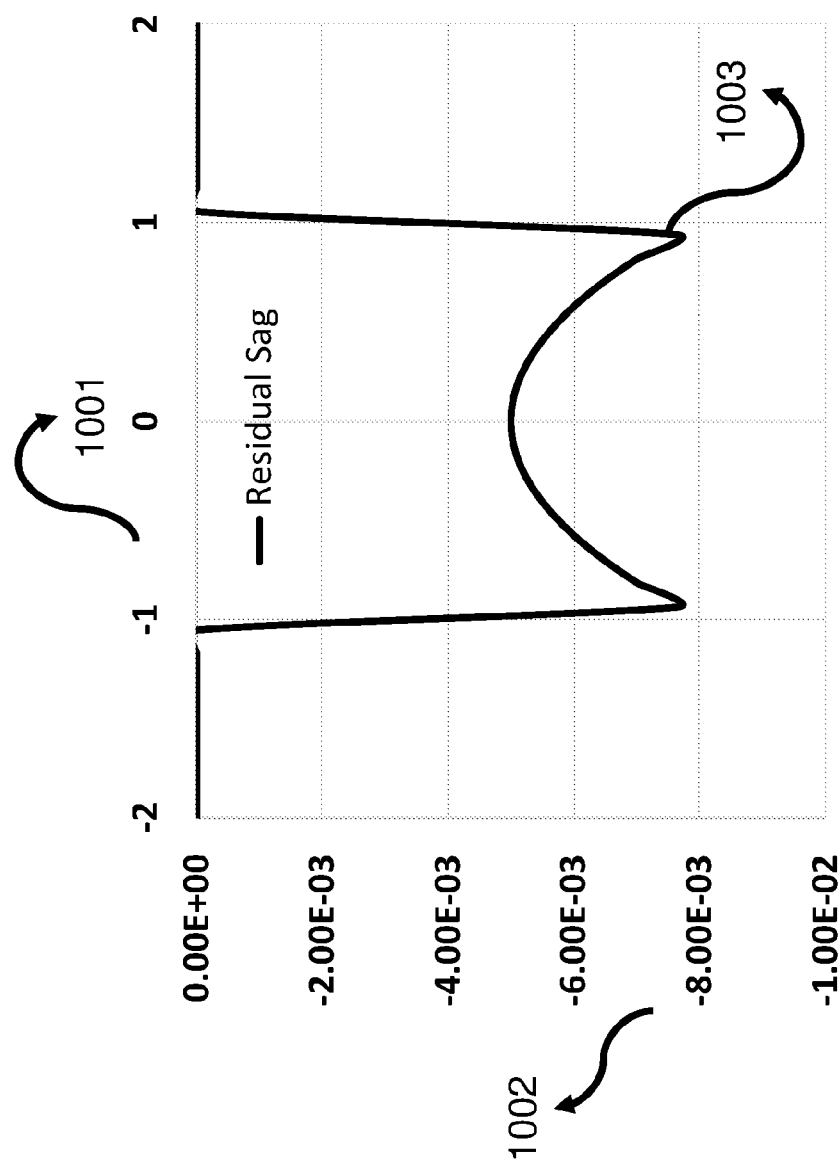
FIG. 10 illustrates the residual sag profile of a defocus based lenslet of the prior art and the circumscribing region about the defocus based lenslet of the prior art of the prior art spectacle lens, described in FIG. 9.

In this example, the residual sag profile of the circumscribing region (803) of the prior art spectacle lens is further illustrated in FIG. 10. The residual sag is obtained by deducting the sag of the underlying radius of curvature of the front surface of the spectacle lens. The residual sag profile (1002) (in mm) is plotted as a function of the diameter (in mm) of the circumscribing region (1001).

In this example, the total diameter of the circumscribing region (1001) is approximately 4 mm. The defocus incorporated region of the prior art spectacle lens is approximately 2 mm in diameter. In this example, approximately a 2-micron variation in the residual sag is needed to provide the desired amount of defocus (1003). The geometric centre of the circumscribed region of interest (803) is considered to be the reference, in this example.

Figure 11:
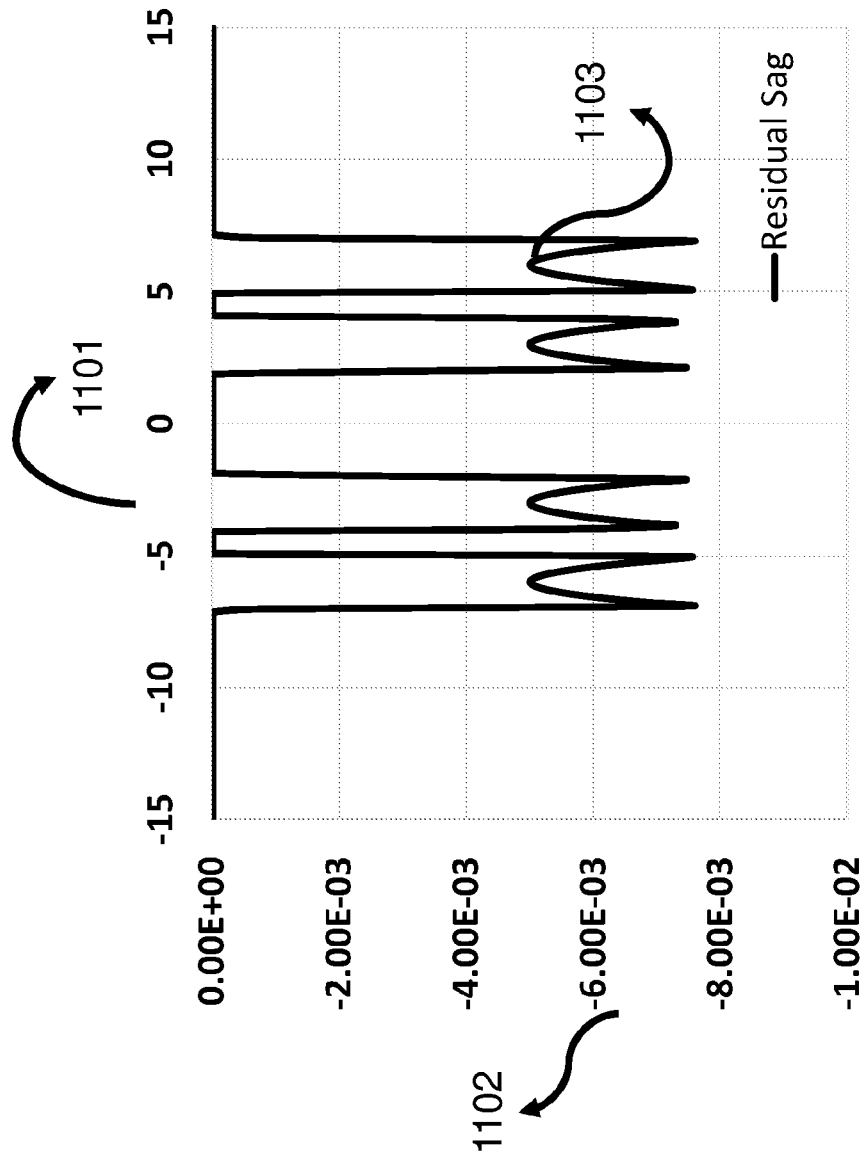
FIG. 11 illustrates the residual sag profile (along the horizontal axis or x-axis) of the entire prior art spectacle lens, described in FIG. 8. The prior art spectacle lens described comprises of a plurality of defocus based lenslets. The power profile is rotationally symmetric about the geometric centre of the lenslet, as described in FIG. 9.

The residual sag profile of the entire prior art spectacle lens, along the horizontal axis, as described in FIG. 8 is illustrated in FIG. 11. As can be noted in FIG. 8, there are four (4) defocus incorporated multi-segment regions along the horizontal dimension (x-axis). The residual sag profiles (1102) of the multi-segment regions as a function of diameter (1101) can be noted in FIG. 11. The geometric centre of the circumscribed region of interest (1103) is considered to be the reference.

The spectacle lens of the prior art, described in FIGS. 8 to 11, configured with a base prescription of −3 D and 12 defocus incorporated elements, each with +3 D relative add power, was used to correct a schematic myopic eye (Rx: −3 D) of Table 1.

The base spectacle lens of the prior art has a front surface radius of curvature of 1000 mm, a back surface radius of curvature of 142 mm, the central thickness of 1.5 mm and the spectacle lens was designed with CR-39 polymer.

Figure 12:
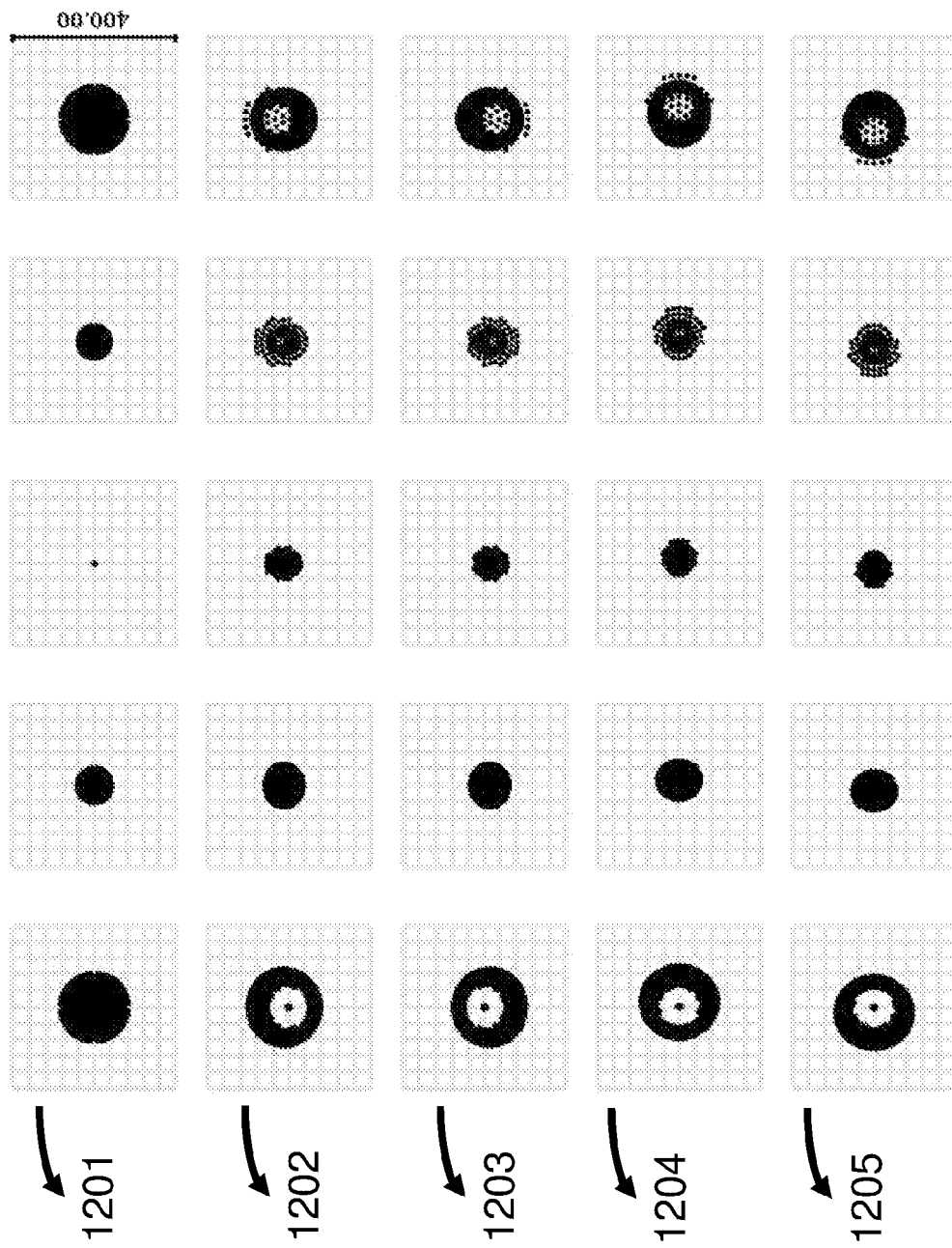
FIG. 12 illustrates a schematic diagram of a wide-angle, through-focus, retinal image point spread depicted as a spot diagram, when the incoming light, with a visible wavelength (589 nm) and vergence of 0 D, depicting optical infinity, is incident on a −3 D myopic model eye corrected with one of the prior art spectacle lenses described in FIG. 9. The performance of the schematic model eye corrected with one of the prior art lenses is evaluated at a 4 mm pupil.

In some other examples of the disclosure, various other appropriate front surface radii of curvature, central thickness and choice of material may be considered. FIG. 12 represents a schematic diagram of a wide-angle, through-focus, retinal image point spread depicted as a spot diagram, when the incoming light, with a visible wavelength (589 nm) and vergence of 0 D, depicting optical infinity, is incident on a −3 D schematic myopic model eye of Table 1. The optical performance was evaluated at a 4 mm pupil diameter. As can be noted, the on-axis through-focus optical performance results in an in-focus image on the retina and out of focus images immediately in front and behind the retina, as described in row 1201. The rows 1202 to 1205 represent the off-axis performance of the prior art spectacle lens used in conjunction with the schematic myopic model eye, representing 4 field angles (in degrees), namely (0,10), (0,−10), (10,0) and (−10,0), respectively. The five columns of FIG. 12 represent various positions in the anterior-posterior direction of the retina; $1^{st}$ column (−0.7 mm, in front of the retina), $2^{nd}$ column (−0.35 mm, in front of the retina), $3^{rd}$ column (0 mm, on the retina), $4^{th}$ column (0.35 mm, behind the retina) and $5^{th}$ column (0.7 mm, behind the retina).

Figure 13:
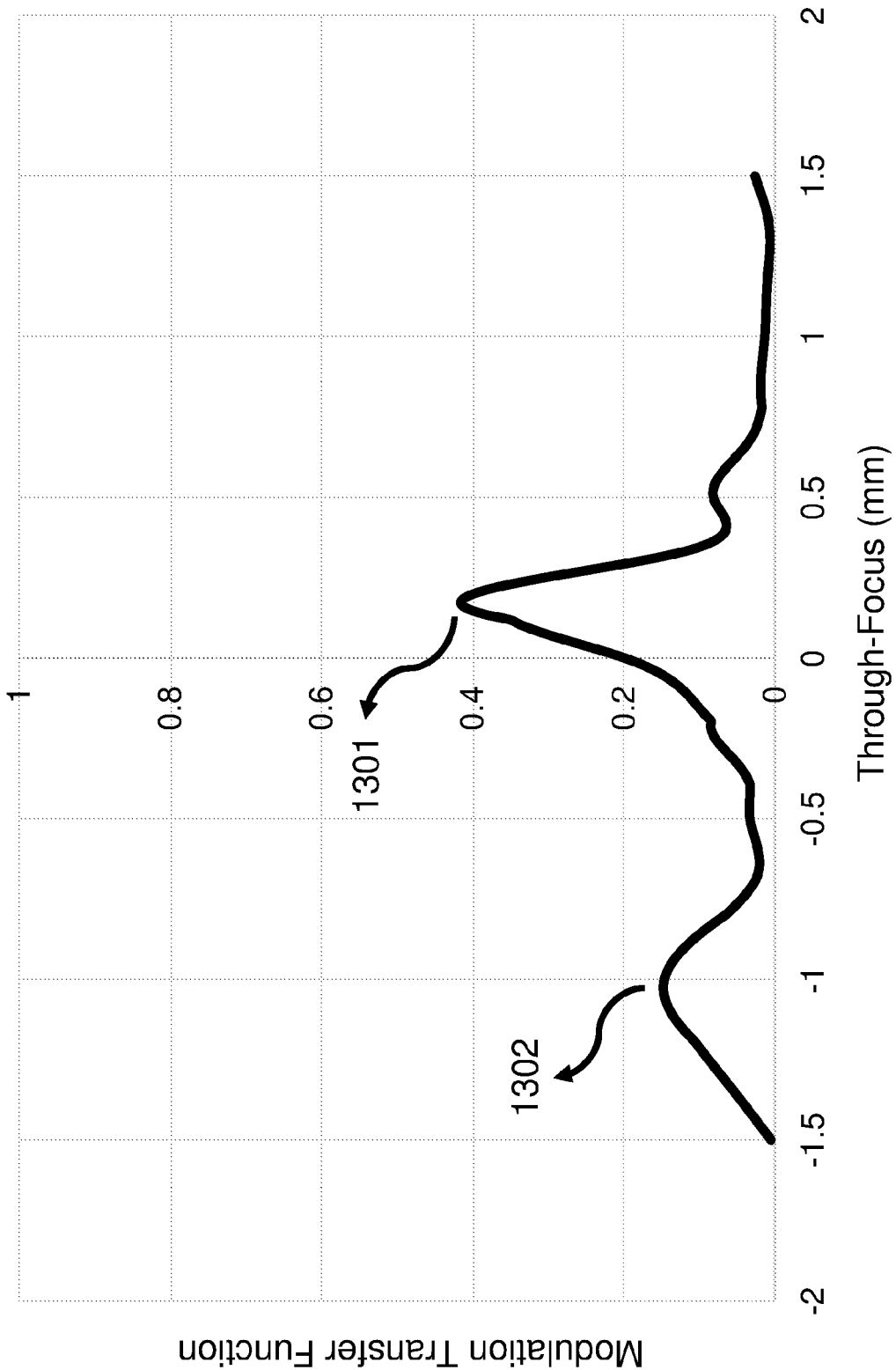
FIG. 13 demonstrates the modulus of the off-axis through-focus optical transfer function when the single vision spectacle lens (Rx: −3 D) configured with prior art defocus based lenslets described in FIG. 9, was used to correct a −3 D myopic model eye. The through-focus optical transfer function was obtained with a pupil of 4 mm at a field angle of (10,0) degrees.

As can be seen in the first column of rows 1202 through to 1205, the spot diagram reveals an in-focus subregion within the overall blur detected substantially in front of the retina (−0.7 mm, in front of the retina). FIG. 13 illustrates the modulus of the off-axis through-focus optical transfer function when the prior art spectacle lens with a base prescription (Rx: −3 D) and multiple defocus segments was used to correct a −3 D schematic myopic model eye of Table 1.

The through-focus optical transfer function was obtained with a pupil of 4 mm at a field angle of 10 degrees. As can be seen, the off-axis through-focus performance of the prior art spectacle lens depicts a bimodal performance with a peak forming approximately on the retina (1301) and the other peak (1302) substantially in front of the retina. Further, the off-axis through-focus performance creates a substantial valley or trough between the two performance peaks which is not desirable for optimal visual performance.

Exemplary Embodiment Design Example 2

Figure 14:
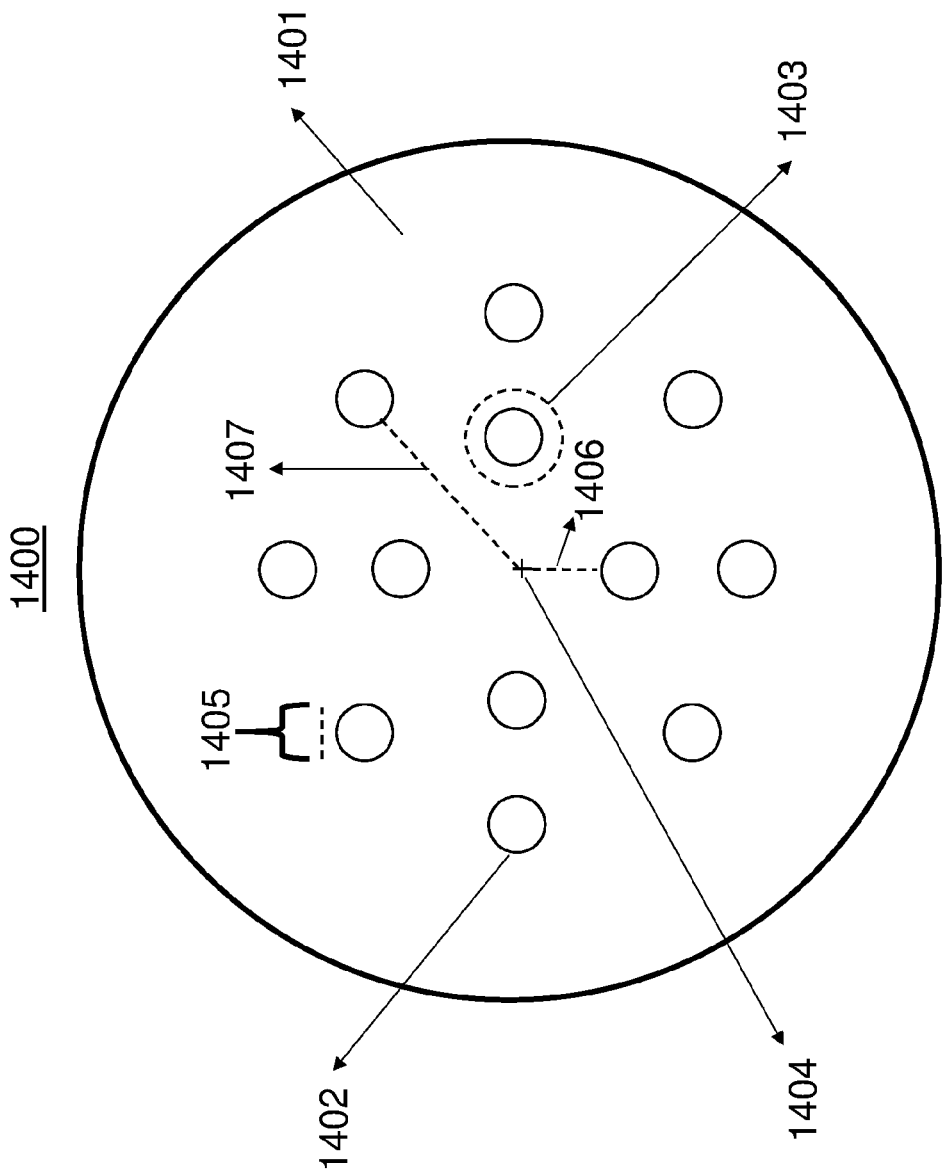
FIG. 14 illustrates an example of a spectacle lens of the present disclosure, wherein about 12 regional/auxiliary modified light-sword optical elements are configured in a certain arrangement. The first 4 regional/auxiliary modified light-sword optical elements are configured within a fixed radius of approximately 3 mm from the optical centre, each separated by approximately 90 degrees from each other about the optical axis; while the rest 8 regional/auxiliary modified light-sword optical elements are configured within a fixed radius of approximately 6 mm from the optic centre, each separated by approximately 45 degrees from each other about the optical axis.

FIG. 14 illustrates an exemplary embodiment spectacle lens (1400) of the current disclosure purposefully configured in combination with a plurality of regional or auxiliary optical elements, such that the optical elements are configured using modified light sword optical elements that are specifically designed without causing a distinct ledge, or ridge, or edge, at the interface of the regional or auxiliary optical element adjoining the integral base spectacle lens.

In this example, certain arrangement (FIG. 14, 1400) of the plurality of regional or auxiliary optical elements incorporated within an integral base spectacle lens can be described as two sets characterised by their fixed distance from the optic centre (1404). The first set of four (4) regional or auxiliary optical modified light sword elements are configured within a fixed radius of approximately 3 mm (1406) from the optical centre (1404); while the second set of the eight (8) regional or auxiliary modified light sword optical elements (1407) are configured within a fixed radius of approximately 6 mm from the optical centre (1404). The first set of 4 regional or auxiliary modified light sword optical elements are separated from the immediate adjacent regional optical elements by approximately 90 degrees defined about the optical centre (1404). The second set of the regional or auxiliary modified light sword optical elements are separated from the immediate adjacent regional optical elements by approximately 45 degrees defined about the optical centre (1404). The diameter of the spectacle lens is approximately 50 mm.

In this example, the diameter of each of the regional or auxiliary modified light sword optical element (1405) configured on the front surface of the spectacle lens is approximately 2 mm. A circumscribing region of approximately 4 mm in diameter is selected about the regional or auxiliary modified light sword optical element (1403) is used to describe its optical properties serving as a representative for all 12 regional or auxiliary modified light sword optical elements of the spectacle lens embodiment of the current disclosure. The integral base spectacle lens of the disclosure was configured with a front surface radius of curvature of 1000 mm, a back surface radius of curvature of 142 mm, the central thickness of 1.5 mm and the integral base spectacle lens was designed using CR-39 polymer. The diameter of the integral base spectacle lens in this example was 30 mm.

Figure 15:
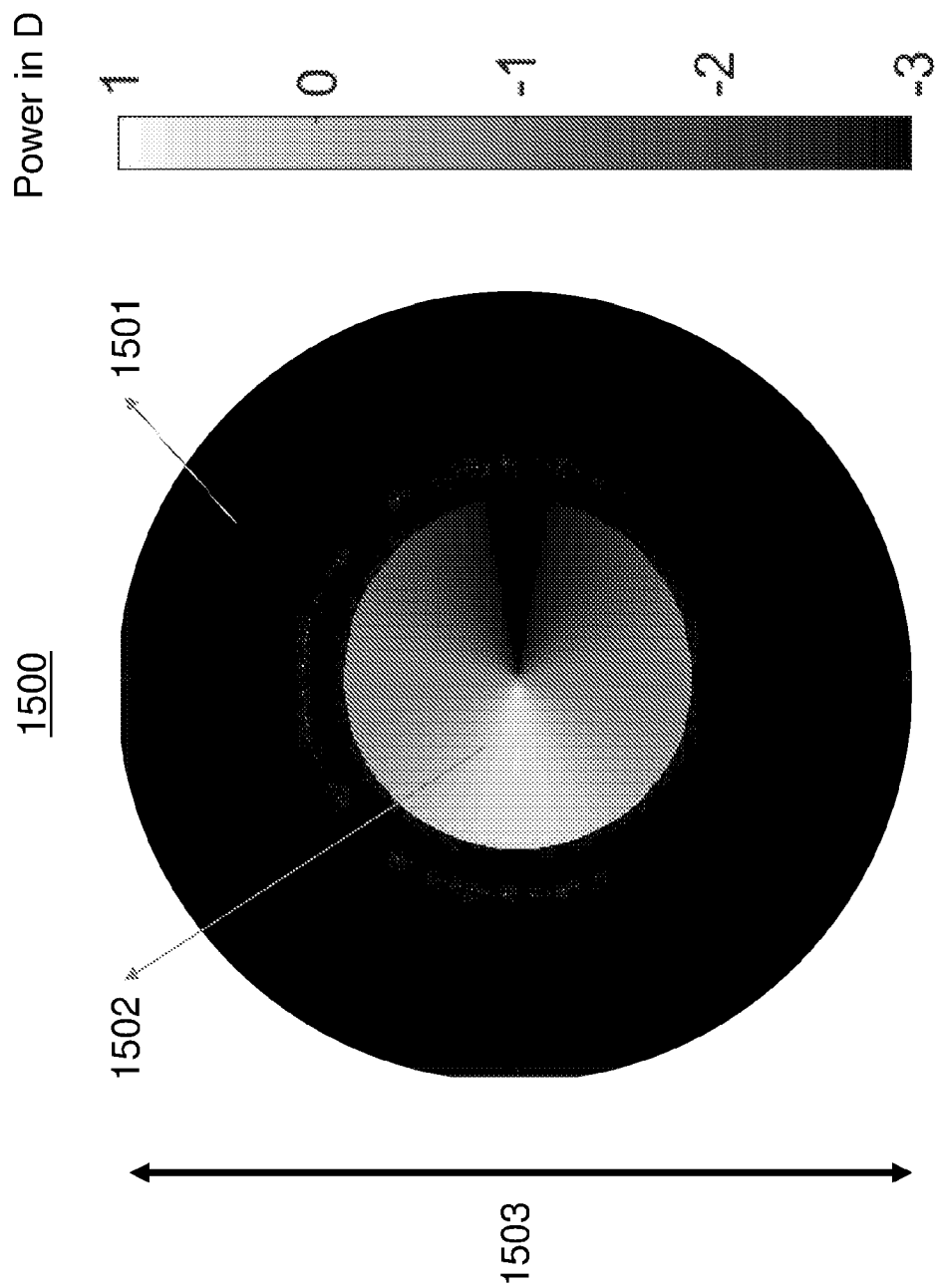
FIG. 15 illustrates the power profile of an auxiliary or regional modified light-sword optical element and the circumscribing region about the auxiliary or regional optical element of an exemplary embodiment of the present disclosure described in FIG. 14.

In this example, the power profile of the circumscribing region (1403) of the spectacle lens embodiment of the disclosure is further illustrated in FIG. 15. In this example, the total diameter of the circumscribing region (1503) is approximately 4 mm. The modified light sword element within the regional or auxiliary modified light sword optical element (1502) is approximately 2 mm in diameter.

In this example, the integral base spectacle lens (1501) has a power of approximately −3 D and the regional or auxiliary modified light sword optical elements 1502 is incorporated with a power profile that varies with the angular segment defined about the geometric centre of the regional element, relative to the base prescription, as described in FIG. 15.

Figure 16:
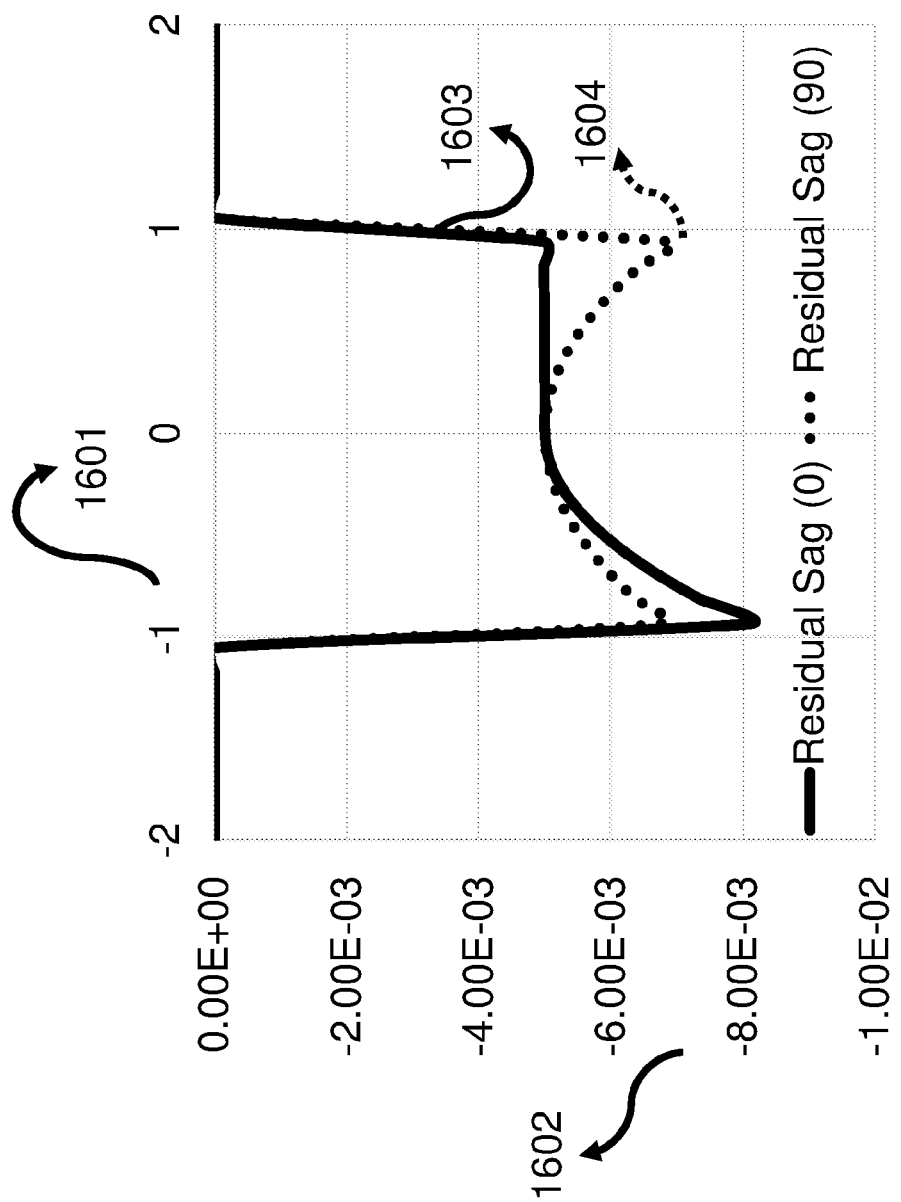
FIG. 16 illustrates the residual sag profile of an auxiliary or regional modified light-sword optical element and the circumscribing region about the auxiliary optical element of an exemplary embodiment of the present disclosure described in FIG. 15.

In this example, the residual sag profile of the circumscribing region (1403) of the embodiment spectacle lens is further illustrated in FIG. 16. The residual sag is obtained by deducting the sag of the underlying radius of curvature of the front surface of the integral base spectacle lens. The residual sag profile (1602) (in mm) is plotted as a function of the diameter (in mm) of the circumscribing region (1601).

In this example, the total diameter of the circumscribing region (1601) is approximately 4 mm. The modified light sword element region of the embodiment spectacle lens is approximately 2 mm in diameter.

In this example, approximately a 3-micron asymmetric sag change in the horizontal orientation (0 degrees) (1603) and a 2-micron symmetric sag change in the vertical (90 degrees)/perpendicular orientation (1604) is needed to provide the desired amount of power variation about the geometric centre of the regional or auxiliary modified light sword optical element (1503).

Figure 17:
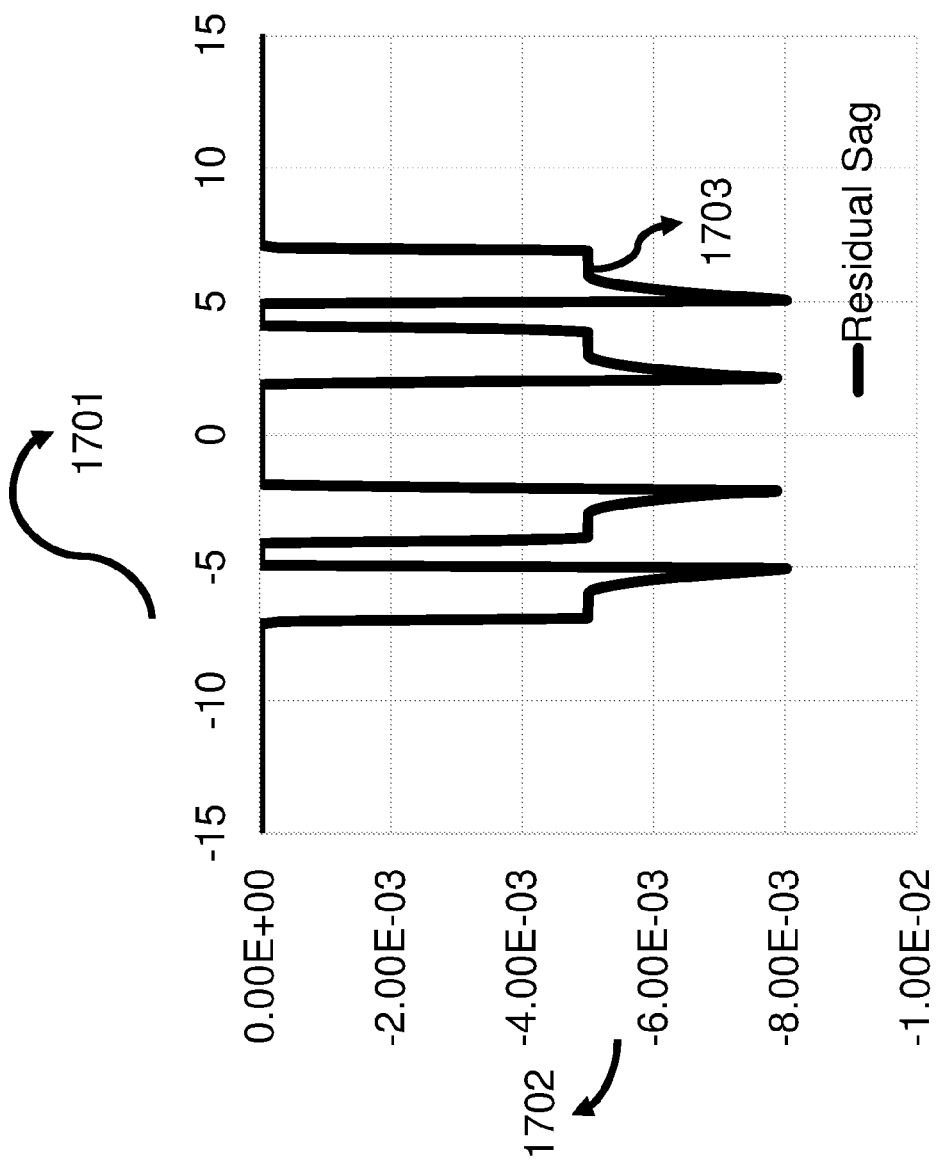
FIG. 17 illustrates the residual sag profile (along the horizontal axis or x-axis) of the entire embodiment spectacle lens, described in FIG. 14. The exemplary spectacle lens embodiment described comprises of a plurality of modified light sword elements specifically designed without a visible ledge or ridge, characterised by angular modulation of power profile about the geometric centre of the auxiliary modified light sword-based optical element described in FIG. 15.

The residual sag profile of the entire embodiment spectacle lens, along the horizontal axis, is further illustrated in FIG. 17. As can be noted in FIG. 14, there are four (4) modified light sword optical elements configured along the horizontal dimension (x-axis). The residual sag profiles (1702) (in mm) of the modified light sword elements as a function of diameter (1701) (in mm) can be noted in FIG. 17. The geometric centre of the circumscribed region of interest (1703) is considered to be the reference.

Figure 18:
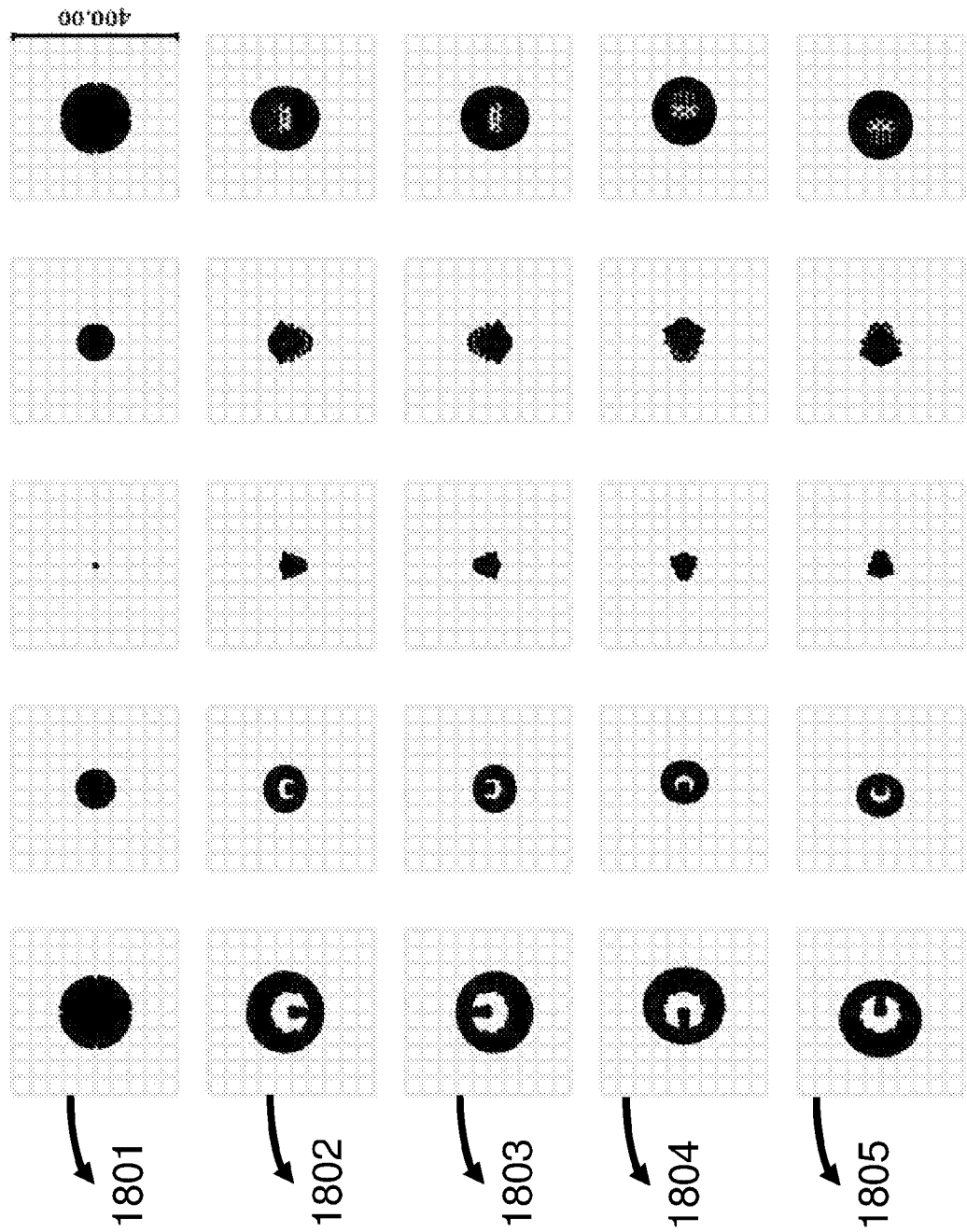
FIG. 18 illustrates a schematic diagram of a wide-angle, through-focus, retinal image point spread depicted as a spot diagram, when the incoming light, with a visible wavelength (589 nm) and vergence of 0 D, depicting optical infinity, is incident on a −3 D myopic model eye corrected with one of the embodiments of the present disclosure described in FIG. 15. The performance of the schematic model eye corrected with the exemplary embodiment is evaluated at a 4 mm pupil.

FIG. 18 represents a schematic diagram of a wide-angle, through-focus, retinal image point spread depicted as a spot diagram, when the incoming light, with a visible wavelength (589 nm) and vergence of 0 D, is incident on a −3 D schematic myopic model eye of Table 1 when corrected with the disclosed embodiment described in FIG. 14. The optical performance was evaluated at a 4 mm pupil diameter.

As can be noted, the on-axis through-focus optical performance results in an in-focus image on the retina and out of focus images immediately in front and behind the retina, as described in row 1801. The rows 1802 to 1805 represent the off-axis performance of the embodiment spectacle lens used in conjunction with the schematic myopic model eye, representing 4 field angles (in degrees), namely (0,10), (0,−10), (10,0) and (−10,0), respectively.

The five columns of FIG. 18 represent various positions in the anterior-posterior direction of the retina; $1^{st}$ column (−0.7 mm, in front of the retina), $2^{nd}$ column (−0.35 mm, in front of the retina), $3^{rd}$ column (0 mm, on the retina), $4^{th}$ column (0.35 mm, behind the retina) and $5^{th}$ column (0.7 mm, behind the retina).

As can be seen in the first column of rows 1802 to 1805, the spot diagram reveals an in-focus line-shaped segment, subregion within the overall blur detected substantially in front of the retina (−0.7 mm and −0.3 mm, in front of the retina).

Figure 19:
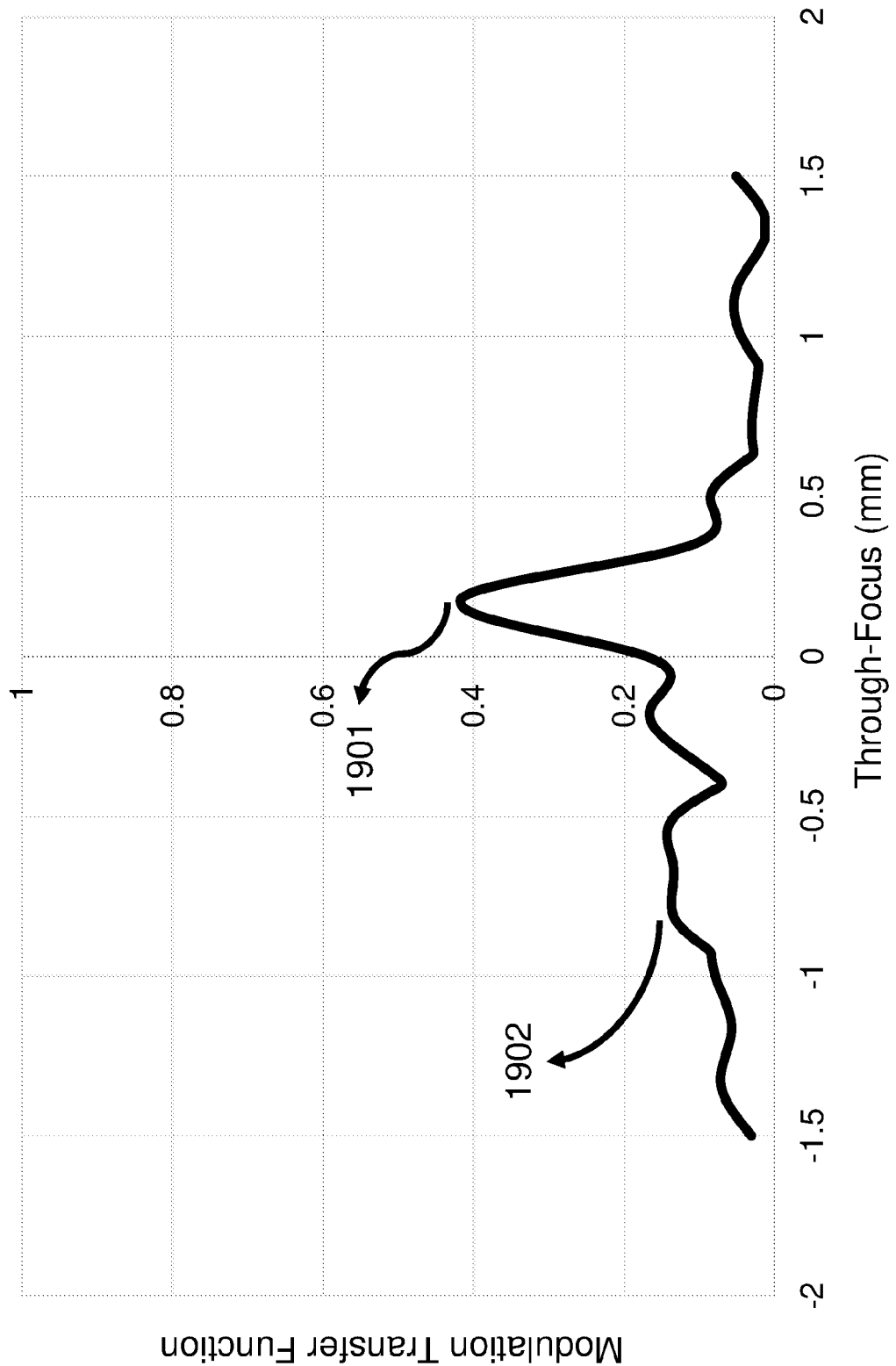
FIG. 19 demonstrates the modulus of off-axis through-focus optical transfer function when the single vision spectacle lens (Rx: −3 D) configured with modified light sword-based auxiliary optical element features described in FIG. 15, was used to correct a −3 D myopic model eye. The through-focus optical transfer function was obtained with a pupil of 4 mm at a field angle of (10,0) degrees.

FIG. 19 illustrates the modulus of the off-axis through-focus optical transfer function when the embodiment spectacle lens with a base prescription (Rx: −3 D) configured with a plurality of modified light sword elements was used to correct a −3 D schematic myopic model eye of Table 1.

The through-focus optical transfer function was obtained with a pupil of 4 mm at a field angle of 10 degrees. As can be seen, the off-axis through-focus performance of the embodiment spectacle lens does not depict a bimodal performance unlike the performance (FIG. 13) with a prior art design of Example 1.

The distance peak (1901) forming approximately on the retina has an elongated arm (1902) of the optical performance demonstrating an elongation of the depth of focus, substantially in the direction representing images in front of the retina.

Unlike the performance obtained with the prior art spectacle embodiment (FIG. 13), the off-axis through-focus performance does not create a substantial valley or trough and does not create distinct performance peaks observed with a conventional bifocal lens. This improvement gauged as the optical performance on the schematic model eye is proposed to translate into a significant and meaningful improvement in the visual performance for the myopic eye wearing the exemplary embodiment over the prior art lens described herein. Furthermore, the improvement gauged as the optical performance on the schematic model eye is proposed to also improve overall tolerance.

Exemplary Embodiment Design Example 3

Figure 20:
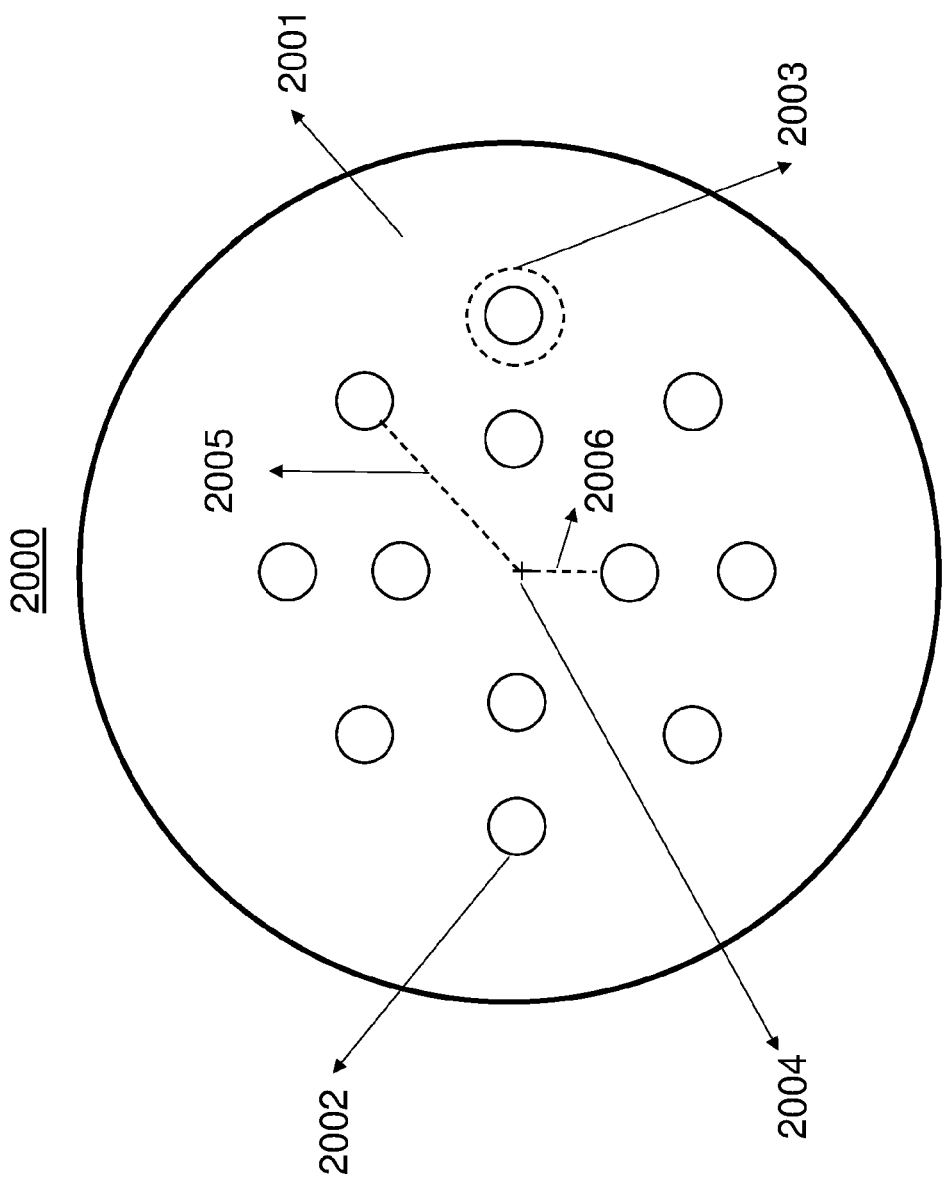
FIG. 20 illustrates an example of a spectacle lens of the present disclosure, wherein about 12 regional/auxiliary modified light sword-based optical elements are configured in a certain arrangement. The first 4 regional/auxiliary modified light sword-based optical elements are configured within a fixed radius of approximately 3 mm from the optical centre, each separated by approximately 90 degrees from each other about the optical axis; while the rest 8 regional/auxiliary modified light sword-based optical elements are configured within a fixed radius of approximately 6 mm from the optic centre, each separated by approximately 45 degrees from each other about the optical axis.

FIG. 20 illustrates a spectacle lens (2000) of the current disclosure designed in combination with a plurality of regional or auxiliary optical elements, such that the optical elements are configured using another variant of a modified light sword optical element; wherein the regional or auxiliary modified light sword optical elements are specifically designed without causing a distinct ledge, or ridge, or edge, at the interface of the regional or auxiliary optical element adjoining the integral base spectacle lens.

In this example, certain arrangement (FIG. 20, 2000) of the plurality of regional or auxiliary modified light sword optical elements incorporated within an integral base spectacle lens can be described as two sets characterised by their fixed distance from the optic centre (2004). The first set of four (4) regional or auxiliary modified light sword optical elements are configured within a fixed radius of approximately 3 mm (2006) from the optical centre (2004); while the second set of the eight (8) regional or auxiliary modified light sword optical elements are configured within a fixed radius of approximately 6 mm (2005) from the optical centre (2004). The first set of 4 regional or auxiliary modified light sword optical elements are separated from the immediate adjacent regional optical elements by approximately 90 degrees defined about the optical centre (2004). The second set of the eight (8) regional or auxiliary modified light sword optical elements are separated from the immediate adjacent regional optical elements by approximately 45 degrees defined about the optical centre (2004). The diameter of the spectacle lens is approximately 30 mm.

In this example, the diameter of each of the regional or auxiliary modified light sword optical element (2002) configured on the front surface of the spectacle lens is approximately 2 mm. A circumscribing region (2003) of approximately 4 mm in diameter is selected about the regional or auxiliary modified light sword optical element is used to describe its optical properties serving as a representative for all 12 regional or auxiliary modified light sword optical elements of the spectacle lens embodiment of the current disclosure. The integral base spectacle lens of the disclosure was configured with a front surface radius of curvature of 1000 mm, a back surface radius of curvature of 142 mm, the central thickness of 1.5 mm and the integral base spectacle lens was designed using CR-39 polymer. The diameter of the integral base spectacle lens in this example was 30 mm.

Figure 21:
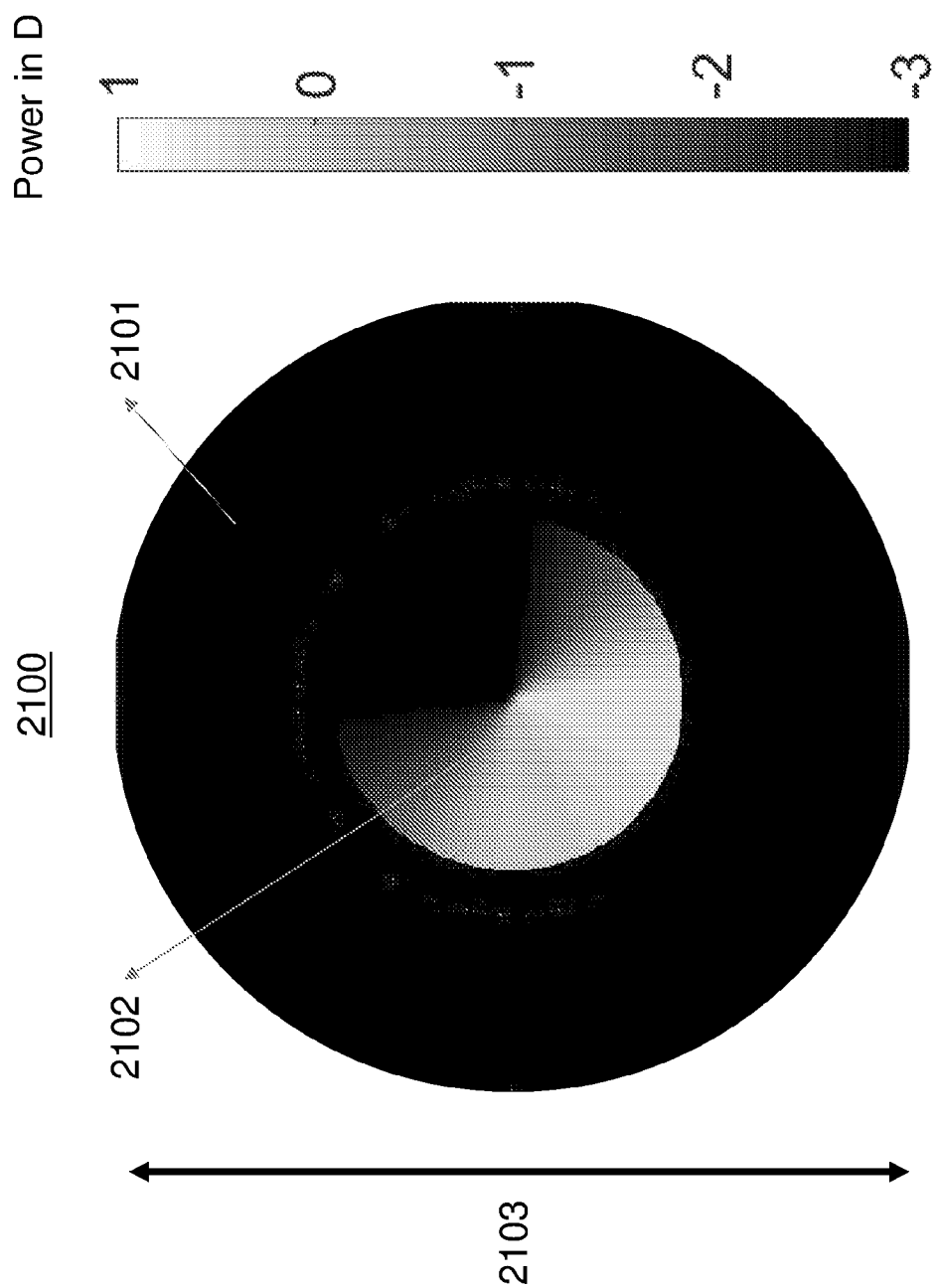
FIG. 21 illustrates the power profile of an auxiliary or regional modified light sword-based optical element and the circumscribing region about the auxiliary or regional optical element of an exemplary embodiment of the present disclosure described in FIG. 20.

In this example, the power profile of the circumscribing region (2003) of the spectacle lens embodiment of the disclosure is further illustrated in FIG. 21. In this example, the total diameter of the circumscribing region (2103) is approximately 4 mm. Another variant of a modified light sword element within the regional or auxiliary optical element (2102) is approximately 2 mm in diameter. The integral base spectacle lens (2101) has a power of approximately −3 D and the regional or auxiliary modified light sword optical elements 2102 is incorporated with a power profile that varies with the angular segment defined about the geometric centre of the regional element, relative to the base prescription, as described in FIG. 21.

Figure 22:
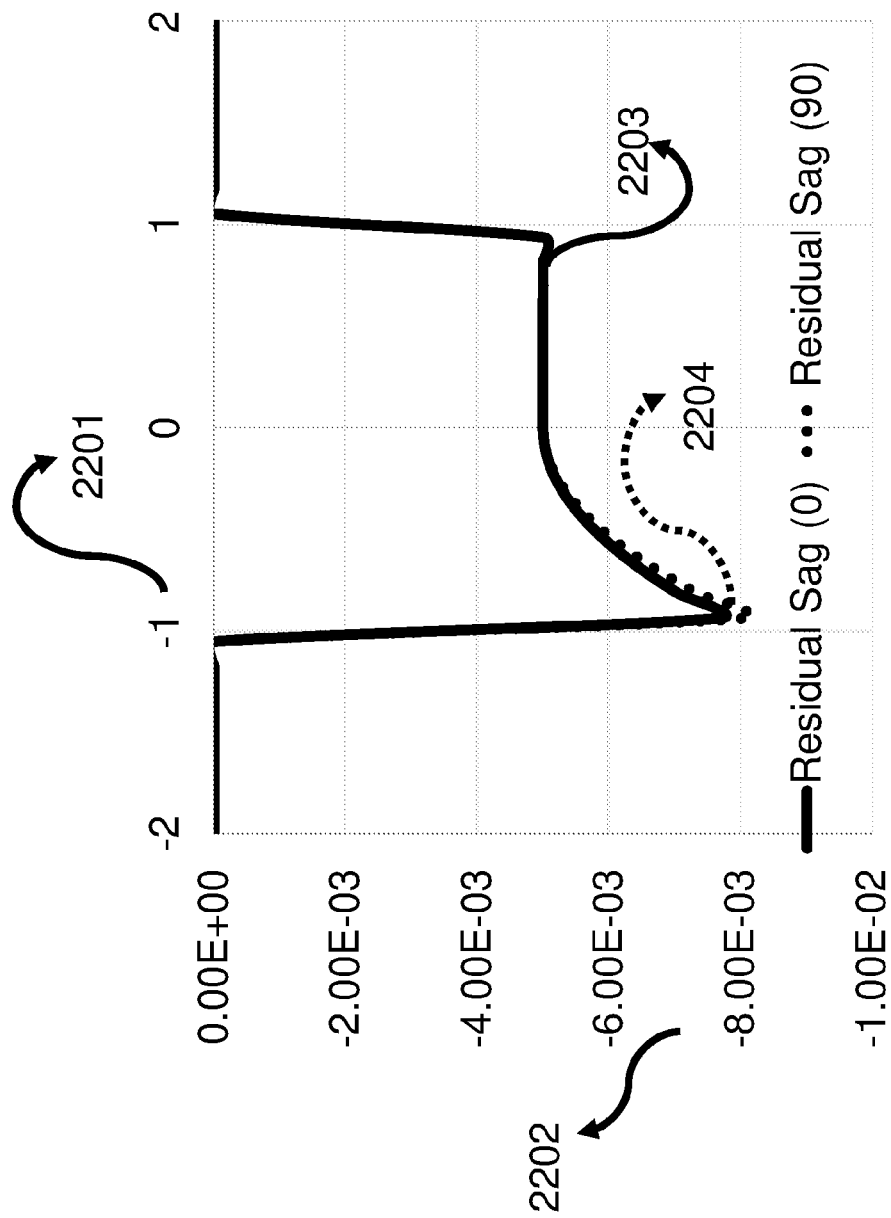
FIG. 22 illustrates the residual sag profile of an auxiliary or regional optical element and the circumscribing region about the auxiliary or regional modified light sword-based optical element of an exemplary embodiment of the present disclosure described in FIG. 21.

In this example, the residual sag profile of the circumscribing region (2003) of the embodiment spectacle lens is further illustrated in FIG. 22. The residual sag is obtained by deducting the sag of the underlying radius of curvature of the front surface of the integral base spectacle lens. The residual sag profile (2202) (in mm) is plotted as a function of the diameter of the circumscribing region (2201) (in mm). In this example, the total diameter of the circumscribing region (2201) is approximately 4 mm. This variant of a regional or auxiliary modified light sword optical element of the embodiment spectacle lens is approximately 2 mm in diameter. In this example, approximately a 3-micron asymmetric sag change in the horizontal and vertical orientations (0 & 90 degrees) (2203 & 2204) is needed to provide the desired amount of power variation about the geometric centre of the regional or auxiliary modified light sword optical element (2103).

Figure 23:
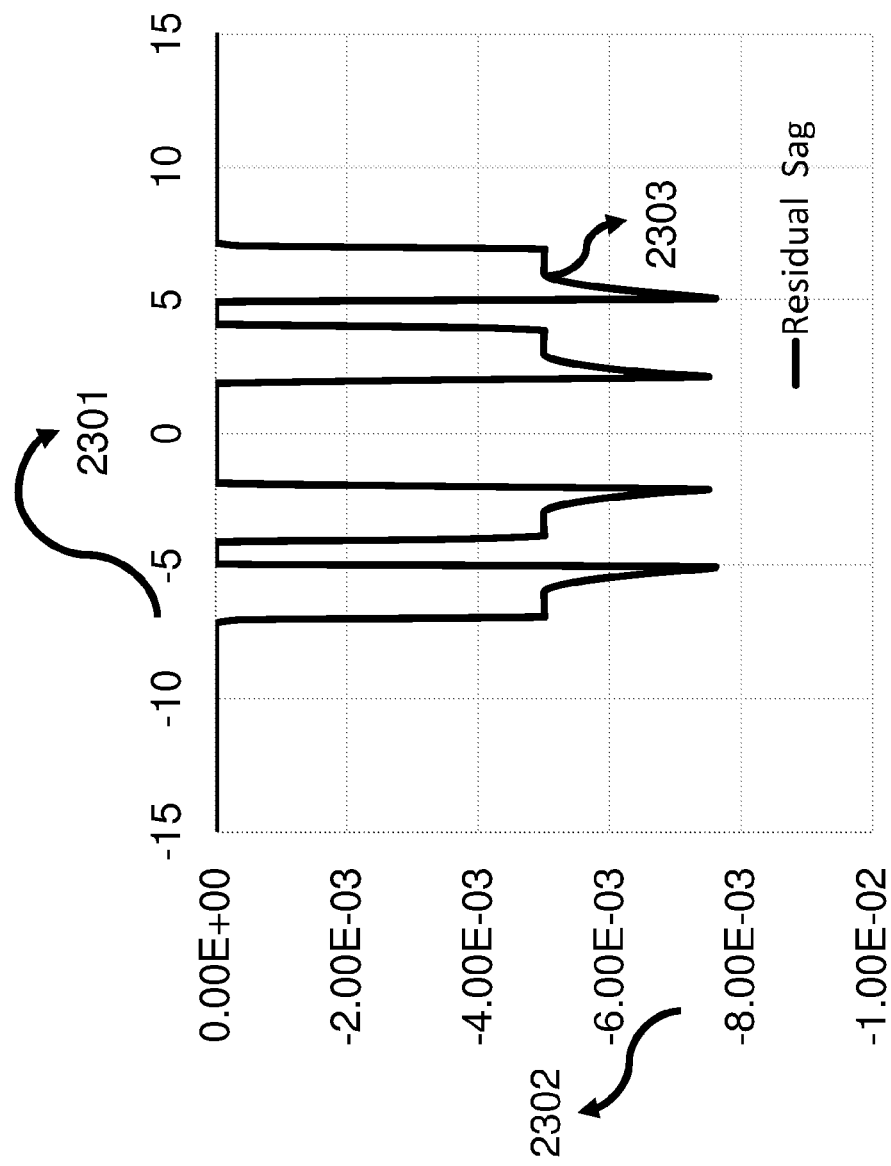
FIG. 23 illustrates the residual sag profile (along the horizontal axis or x-axis) of the entire embodiment spectacle lens, described in FIG. 20. The exemplary spectacle lens embodiment described comprises of a plurality of modified light sword elements specifically designed without a visible ledge or ridge, characterised by angular modulation of power profile about the geometric centre of the auxiliary modified light sword-based optical element described in FIG. 21.

The residual sag profile of the entire embodiment spectacle lens, along the horizontal axis, is further illustrated in FIG. 23. As can be noted in FIG. 20, there are four (4) modified light sword optical elements configured along the horizontal dimension (x-axis). The residual sag profiles (2302) of the modified light sword elements as a function of diameter (2301) can be noted in FIG. 23. The geometric centre of the circumscribed region of interest (2303) is considered to be the reference.

Figure 24:
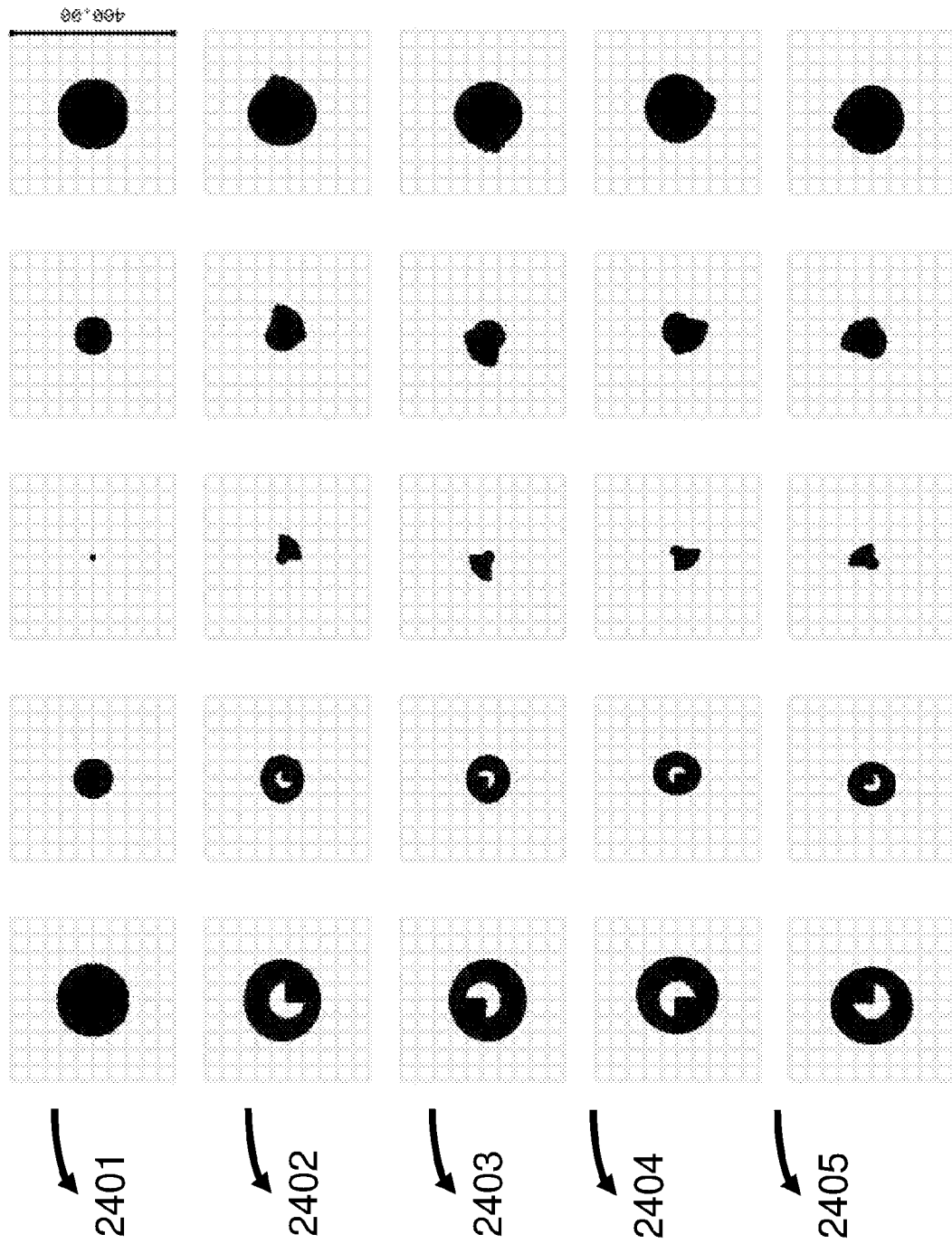
FIG. 24 illustrates a schematic diagram of a wide-angle, through-focus, retinal image point spread depicted as a spot diagram, when the incoming light, with a visible wavelength (589 nm) and vergence of 0 D, depicting optical infinity, is incident on a −3 D myopic model eye corrected with one of the embodiments of the present disclosure described in FIG. 21. The performance of the schematic model eye corrected with the exemplary embodiment is evaluated at a 4 mm pupil.

FIG. 24 represents a schematic diagram of a wide-angle, through-focus, retinal image point spread depicted as a spot diagram, when the incoming light, with a visible wavelength (589 nm) and vergence of 0 D, is incident on a −3 D schematic myopic model eye of Table 1 when corrected with the disclosed embodiment described in FIG. 20. The optical performance was evaluated at a 4 mm pupil diameter.

As can be noted, the on-axis through-focus optical performance results in an in-focus image on the retina and out of focus images immediately in front and behind the retina, as described in row 2401. The rows 2402 to 2405 represent off-axis performance of the embodiment spectacle lens used in conjunction with the schematic myopic model eye, representing 4 field angles (in degrees), namely (0,10), (0,−10), (10,0) and (−10,0), respectively. The five columns of FIG. 24 represent various positions in the anterior-posterior direction of the retina; $1^{st}$ column (−0.7 mm, in front of the retina), $2^{nd}$ column (−0.35 mm, in front of the retina), $3^{rd}$ column (0 mm, on the retina), $4^{th}$ column (0.35 mm, behind the retina) and $5^{th}$ column (0.7 mm, behind the retina).

As can be seen in the first column of rows 2402 to 2405, the spot diagram reveals an in-focus, arc-shaped segment, subregion within the overall blur detected substantially in front of the retina (−0.7 mm and −0.3 mm, in front of the retina).

Figure 25:
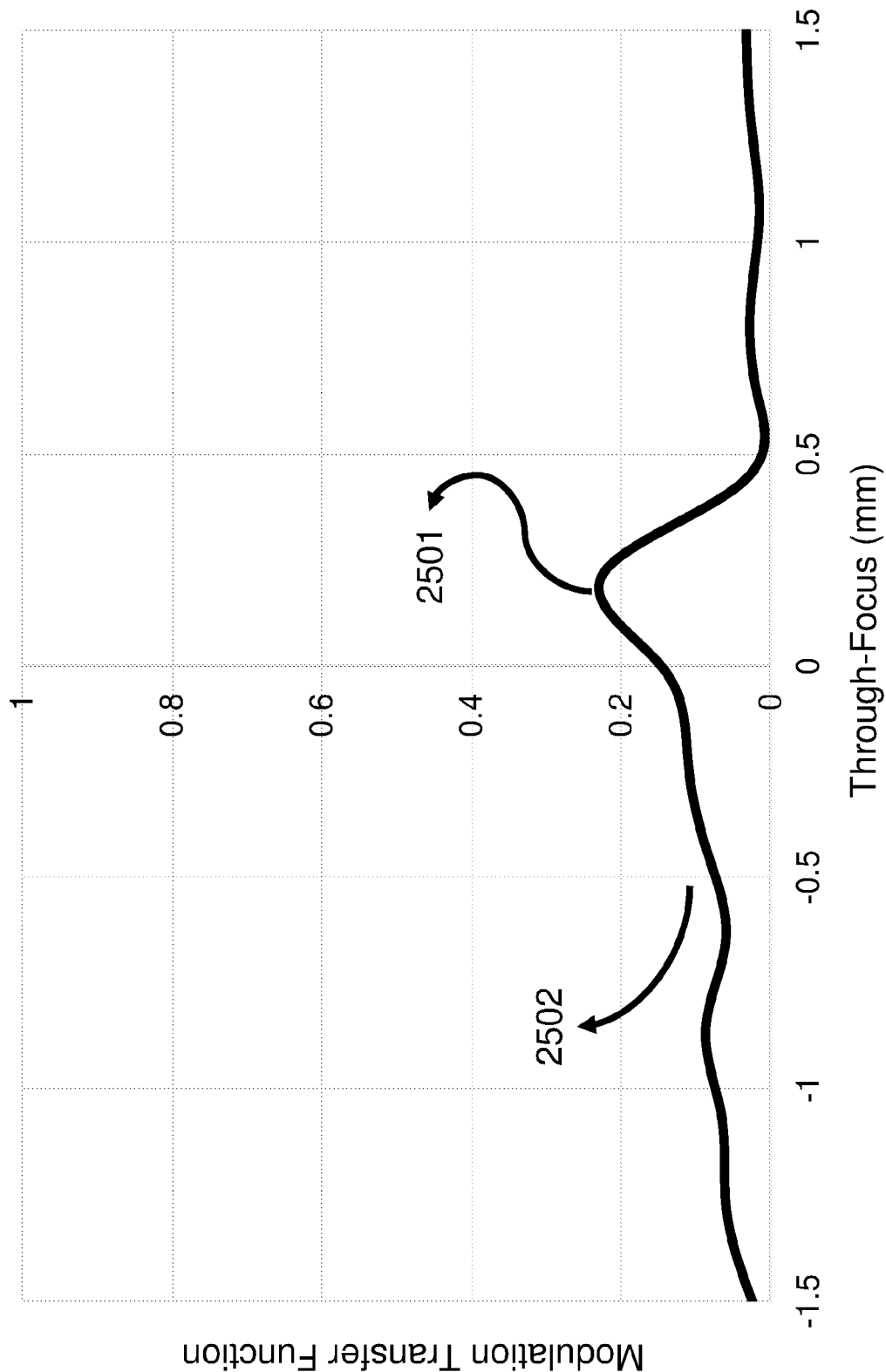
FIG. 25 demonstrates the modulus of off-axis through-focus optical transfer function when the single vision spectacle lens (Rx: −3 D) configured with the modified light sword-based auxiliary optical element features described in FIG. 21, was used to correct a −3 D myopic model eye. The through-focus optical transfer function was obtained with a pupil of 4 mm at a field angle of (10,0) degrees.

FIG. 25 illustrates the modulus of off-axis through-focus optical transfer function, when the embodiment spectacle lens with a base prescription (Rx: −3 D) configured with a plurality of modified light sword elements was used to correct a 3D schematic myopic model eye of Table 1. The through-focus optical transfer function was obtained with a pupil of 4 mm at a field angle of 10 degrees.

As can be seen, the off-axis through-focus performance of the embodiment spectacle lens does not depict a bimodal performance unlike the performance (FIG. 13) with a prior art design of Example 1. The distance peak (2501) forming approximately on the retina has an elongated arm (2502) of the optical performance demonstrating an elongation of depth of focus, substantially in the direction representing images in front of the retina. Unlike the performance obtained with the prior art spectacle embodiment (FIG. 13), the off-axis through-focus performance does not create a substantial valley or trough and does not create distinct performance peaks observed with a conventional bifocal lens.

This improvement gauged as the optical performance on the schematic model eye is proposed to translate into a significant and meaningful improvement in the visual performance for the myopic eye wearing the exemplary embodiment over the prior art lens described herein. Furthermore, the improvement gauged as the optical performance on the schematic model eye is proposed to also improve overall tolerance.

Exemplary Embodiment Design Example 4

Figure 26:
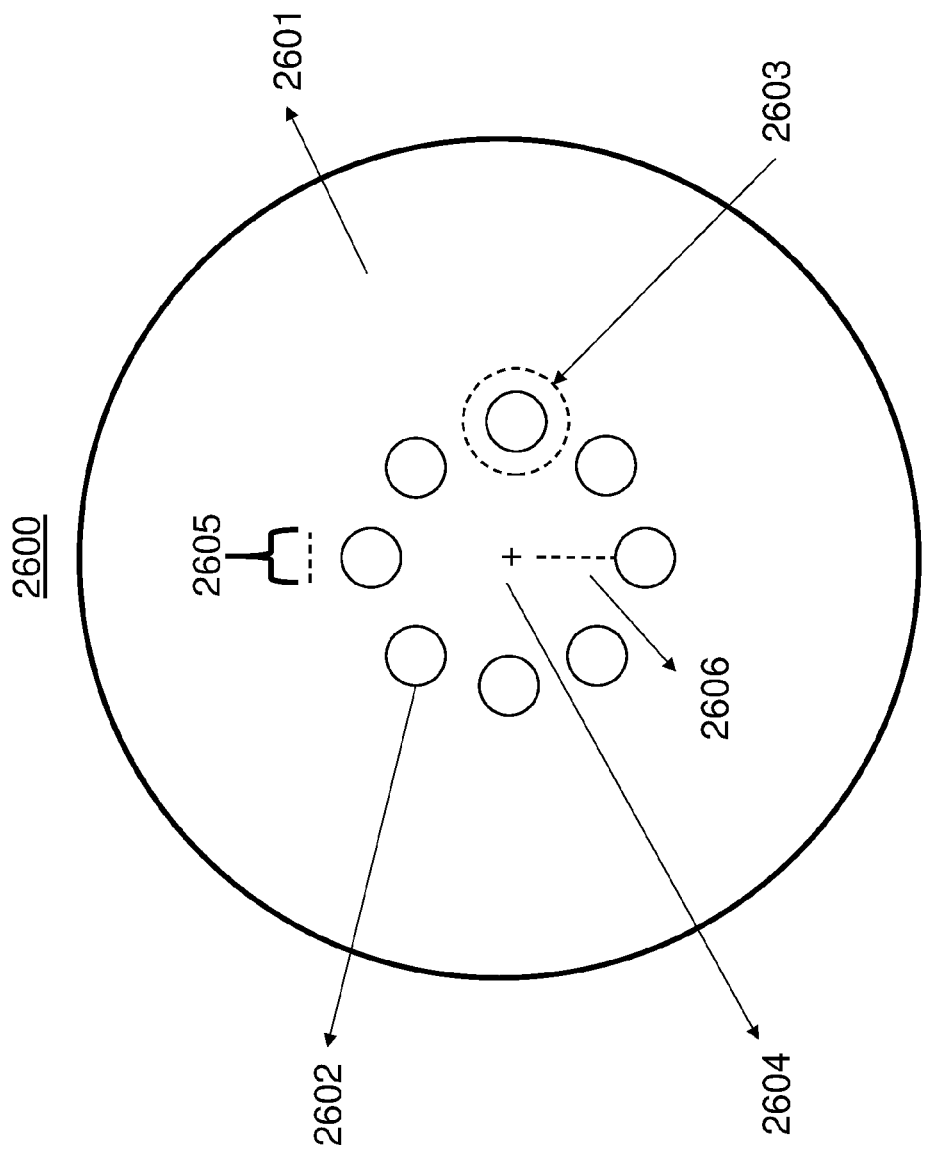
FIG. 26 illustrates an example of a spectacle lens of the present disclosure, wherein about 8 regional/auxiliary axicon optical elements are configured in a circular arrangement. The 8 regional/auxiliary forward linear axicon optical elements are configured within a fixed radius of approximately 3.5 mm from the optical centre, each separated by approximately 45 degrees from each other about the optical axis.

FIG. 26 illustrates an example of a spectacle lens of the present disclosure configured in combination with a plurality of regional or auxiliary forward linear axicon optical elements, wherein about eight (8) regional or auxiliary linear axicon optical elements are configured in a circular arrangement about the optical centre of the spectacle lens. In this example, the eight (8) regional or auxiliary linear axicon optical elements are configured within a fixed radius of approximately 3.5 mm from the optical centre of the spectacle lens. The circular arrangement of the regional or auxiliary linear axicon optical elements are each separated by approximately 45 degrees from its adjacent optical element's geometric centre, gauged about the optical axis of the spectacle lens. In this example, the diameter of each of the regional or auxiliary linear axicon optical elements (2605) configured on the front surface of the spectacle lens is approximately 1.5 mm. A circumscribing region of approximately 3 mm in diameter is selected about the regional or auxiliary linear axicon optical element (2603) to describe its surface properties. The selected circumscribing region serves as a representative for all eight (8) regional or auxiliary linear axicon optical elements of the spectacle lens embodiment of the current disclosure.

In this example, the integral base spectacle lens of the disclosure was configured in CR39 material, with a front surface radius of curvature of 1000 mm, a back surface radius of curvature of 142 mm, the central thickness of 1.5 mm and the integral base spectacle lens was designed using CR-39 polymer. The diameter of the integral base spectacle lens in this example was 30 mm. Each of the regional or auxiliary forward linear axicon optical element of this example were configured as a forward linear axicon using an extremely steep radius of curvature of 0.1 mm and an asphericity (Q, conic constant) of −500, defined over the underlying base front surface spherical radius.

In this example, the anterior surface of the spectacle lens embodiment incorporating the regional or auxiliary linear axicon optical element was coated with a second material, different from the integral base spectacle lens CR39 material, with a refractive index of 1.4. The refractive index mismatch between the regional or auxiliary linear axicon optical elements configured on the front surface and the coating is approximately 0.1. The residual sag profile of the entire embodiment spectacle lens, along the horizontal axis, is further illustrated in FIG. 27. As noted in FIG. 26, there are two (2) regional or auxiliary linear axicon optical elements configured along the horizontal dimension (x-axis) of the spectacle lens embodiment. The residual sag profiles (2702) (in mm) of the regional or auxiliary linear axicon optical elements as a function of diameter (2701) (in mm) can be noted in FIG. 27. The geometric centre of the circumscribed region of interest (2703) is considered to be the reference. To obtain the residual sag profile of the regional or auxiliary linear axicon optical element, the radius of curvature of the front surface of the spectacle was removed.

Figure 27:
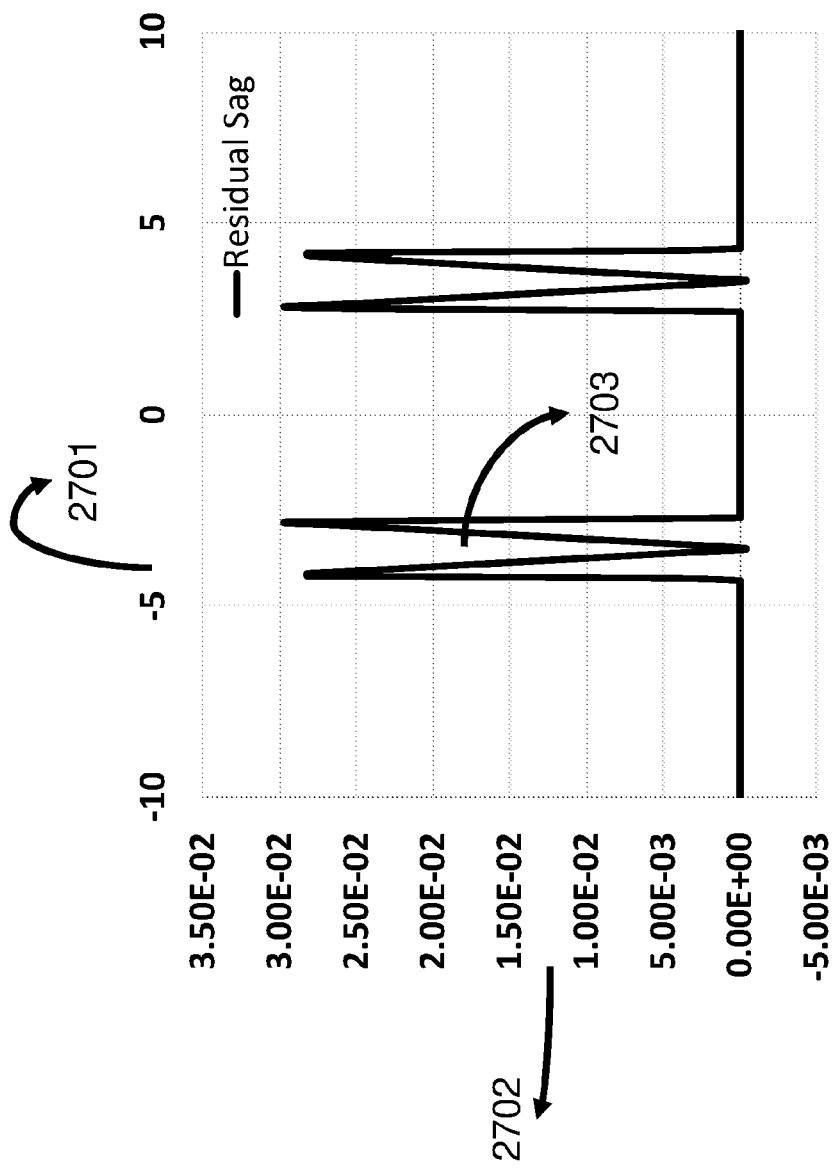
FIG. 27 illustrates the residual sag profile (along the horizontal axis or x-axis) of the entire embodiment spectacle lens, described in FIG. 26. The exemplary spectacle lens embodiment described comprises of a plurality of axicons specifically designed about the optic centre of the spectacle lens, in this example the auxiliary optical element described in FIG. 26 are forward linear axicons.
Figure 28:
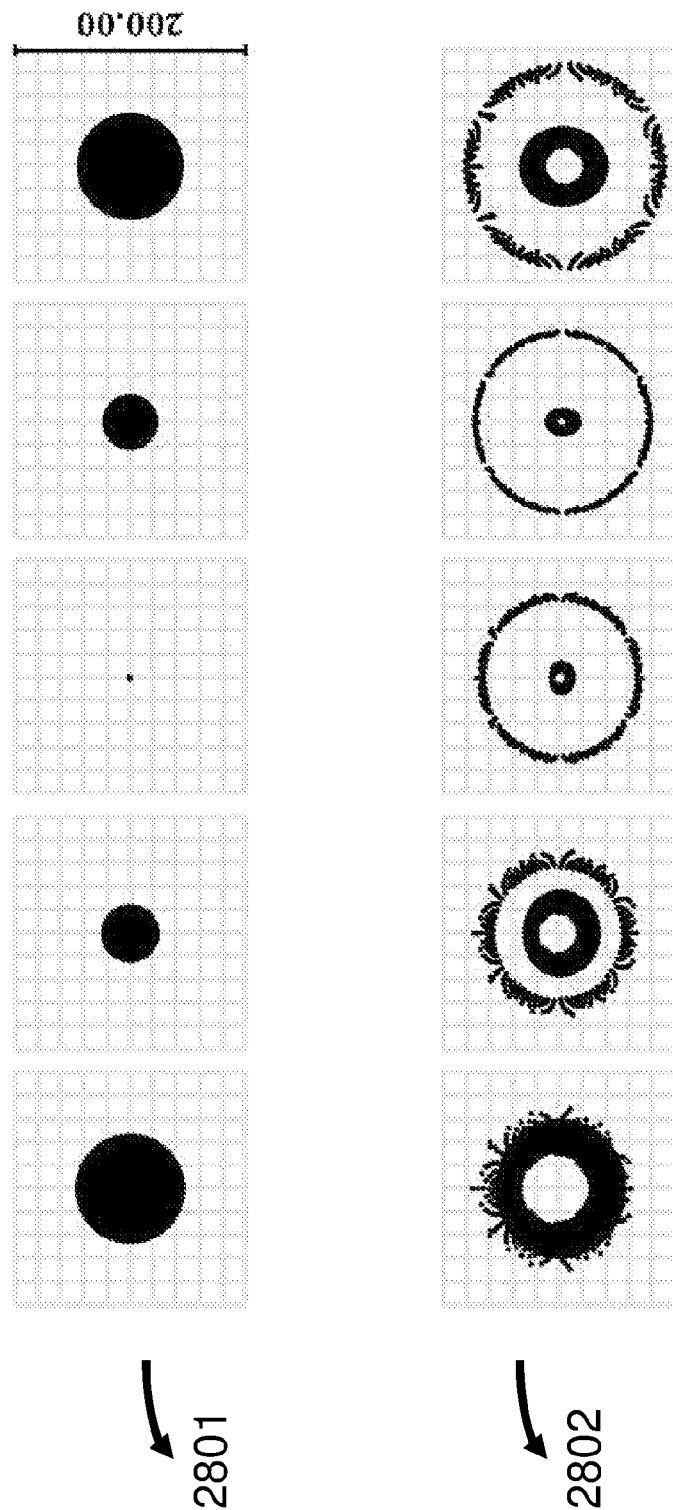
FIG. 28 illustrates a schematic diagram of a wide-angle, through-focus, retinal image point spread depicted as a spot diagram, when the incoming light, with a visible wavelength (589 nm) and vergence of 0 D, depicting optical infinity, is incident on a −3 D myopic model eye corrected with one of the embodiments of the present disclosure described in FIG. 26. The through-focus optical transfer function was obtained with a pupil of 2.5 mm at a field angle of (0.12.5) degrees.

FIG. 28 represents a schematic diagram of a wide-angle, through-focus, retinal image point spread depicted as a spot diagram, when the incoming light, with a visible wavelength (555 nm) and vergence of 0 D, depicting optical infinity, is incident on a −3 D schematic myopic model eye of Table 1 when corrected with the disclosed embodiment described in FIG. 27. The optical performance was evaluated at 2.55 mm pupil diameter. As can be noted, the on-axis through-focus optical performance results in an in-focus image on the retina and out of focus images immediately in front and behind the retina, as described in row 2801. The row 2802 represents off-axis performance of the embodiment spectacle lens used in conjunction with the schematic myopic model eye, representing the (0, 12.5 degrees) field angle.

In this example, the five columns of FIG. 28 represent various positions in the anterior-posterior direction of the retina; $1^{st}$ column (−0.5 mm, in front of the retina), $2^{nd}$ column (−0.25 mm, in front of the retina), $3^{rd}$ column (0 mm, on the retina), $4^{th}$ column (0.25 mm, behind the retina) and $5^{th}$ column (0.5 mm, behind the retina).

As can be seen in 2802, a relatively laterally constant ring shaped intensity profile is obtained for an off-axis incident plane wave passing through the combination of the regional or auxiliary linear axicon optical element and the integral base spectacle lens.

In this example, the relatively constant lateral size and relatively constant intensity profile or relatively constant energy distribution observed in the off-axis through-focus region of FIG. 2802 is a surrogate measure of the extension of depth of focus provided by the regional or auxiliary linear axicon optical element in combination with integral base spectacle lens on the retina of the schematic model eye.

In other embodiments, when the linear or logarithmic axicons are the regional or auxiliary optical elements, which are combined with the integral base spectacle lens, they may generate a substantially non-diffractive constant beam size and relatively constant intensity over a predetermined focal region on the retina of the wearer. The near-uniform or substantially near uniform on-axis intensity over the desired through focus region about the retina may offer a stop signal to the progressing myopic eye. As seen in the example, the resultant of the forward or backward linear axicons combined with the integral base spectacle lens generates a ring-shaped light distribution pattern that is substantially of similar width and intensity pattern over the substantial through focus region of the retina.

Exemplary Embodiment Design Example 5

Figure 29:
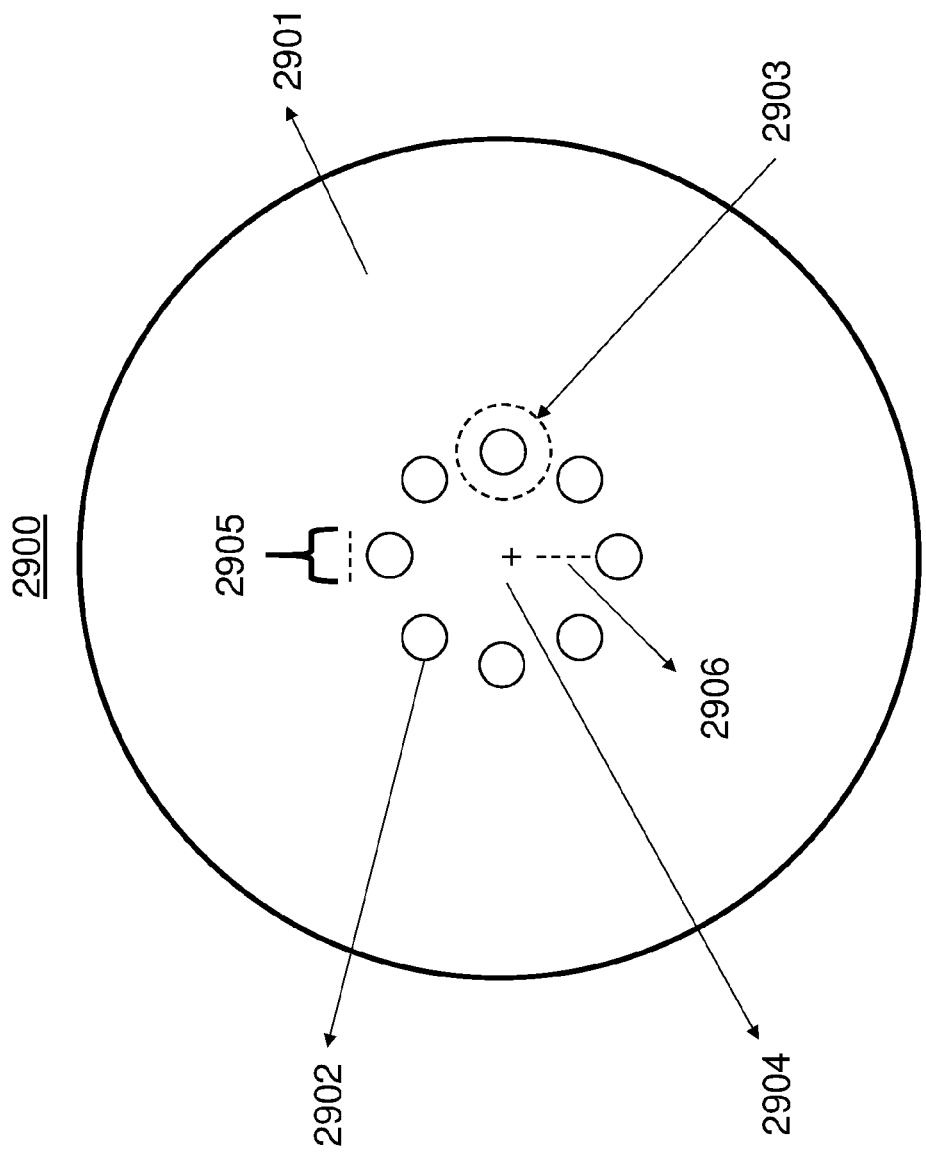
FIG. 29 illustrates an example of a spectacle lens of the present disclosure, wherein about 8 regional/auxiliary backward linear axicon optical elements are configured in a circular arrangement. The 8 regional/auxiliary backward linear axicon optical elements are configured within a fixed radius of approximately 2.25 mm from the optical centre, each separated by approximately 45 degrees from each other about the optical axis.

FIG. 29 illustrates an example of a spectacle lens of the present disclosure configured in combination with a plurality of regional or auxiliary backward linear axicon optical elements, wherein about eight (8) regional or auxiliary linear axicon optical elements are configured in a circular arrangement about the optical centre of the spectacle lens.

In this example, the eight (8) regional or auxiliary linear axicon optical elements are configured within a fixed radius of approximately 2.25 mm from the optical centre of the spectacle lens. The circular arrangement of the regional or auxiliary backward linear axicon optical elements are each separated by approximately 45 degrees from its adjacent optical element's geometric centre, gauged about the optical axis of the spectacle lens. In this example, the diameter of each of the regional or auxiliary linear axicon optical element (2905) configured on the back surface of the spectacle lens is approximately 0.75 mm. A circumscribing region of approximately 3 mm in diameter is selected about the regional or auxiliary linear axicon optical element (2903) to describe its surface properties. The selected circumscribing region serves as a representative for all remaining eight (8) regional or auxiliary linear axicon optical elements of the spectacle lens embodiment of the current disclosure. In this example, the integral base spectacle lens of the disclosure was configured in CR39 material, with a front surface radius of curvature of 1000 mm, a back surface radius of curvature of 142 mm, the central thickness of 1.5 mm and the integral base spectacle lens was designed using CR-39 polymer. The diameter of the integral base spectacle lens in this example was 35 mm.

Figure 30:
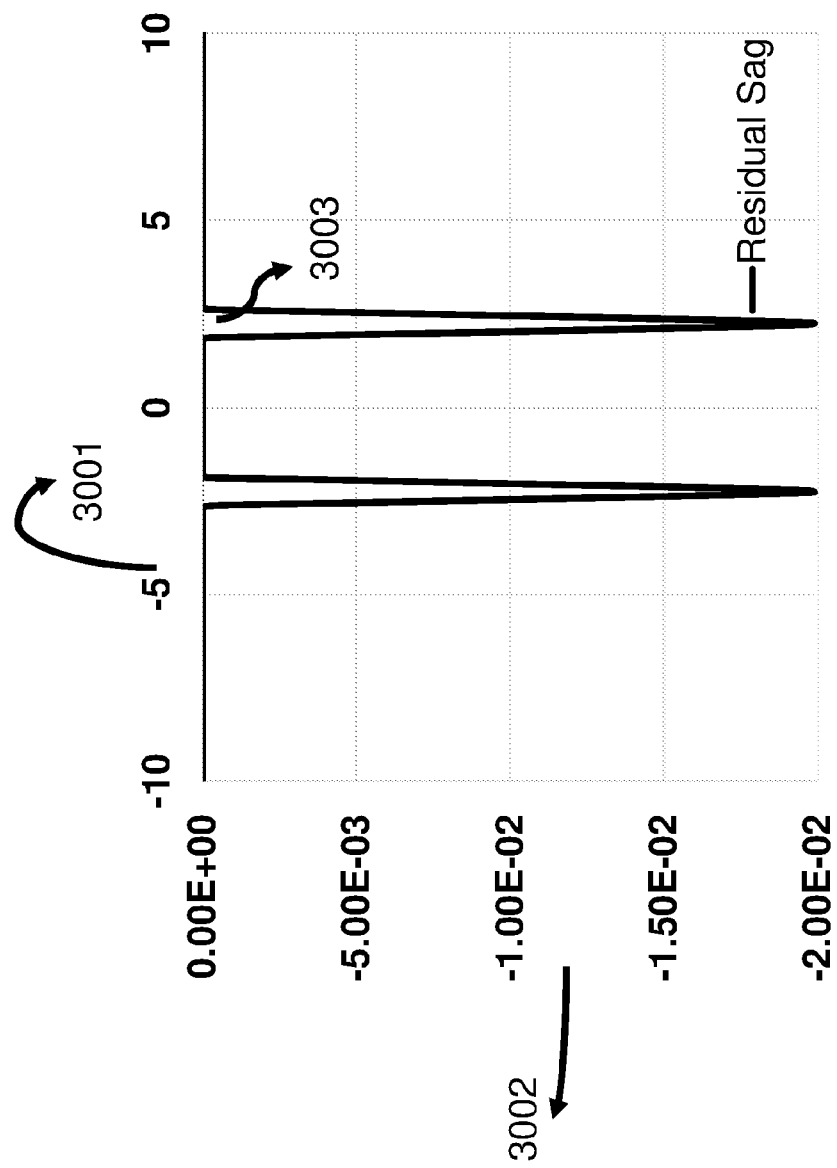
FIG. 30 illustrates the residual sag profile of the entire embodiment spectacle lens described in FIG. 29. The exemplary spectacle lens embodiment described comprises of a plurality of axicons specifically designed about the optic centre of the spectacle lens, in this example the auxiliary optical element described in FIG. 29 are backward linear axicons.

In this example, each of the regional or auxiliary optical elements of this example were configured as an axicon on the back surface of spectacle using an extremely steep radius of curvature of 0.1 mm and an asphericity (Q, conic constant) of −2000, defined over the underlying base back surface spherical radius. In this example, the anterior surface of the spectacle lens embodiment incorporating the regional or auxiliary linear axicon optical element was protruding into the material matrix of the spectacle lens, and therefore no special or additional coating was considered. The residual sag profile of the entire embodiment spectacle lens, along the horizontal axis, is further illustrated in FIG. 30. As can be seen in FIG. 29, there are two (2) regional or auxiliary linear axicon optical elements configured along the horizontal dimension (x-axis) of the spectacle lens embodiment. The residual sag profiles (3002) (in mm) of the regional or auxiliary linear axicon optical elements as a function of diameter (3001) (in mm) can be noted in FIG. 30. The geometric centre of the circumscribed region of interest (3003) is considered to be the reference. To obtain the residual sag profile of the regional or auxiliary linear axicon optical element, the radius of curvature of the back surface of the spectacle was removed.

Figure 31:
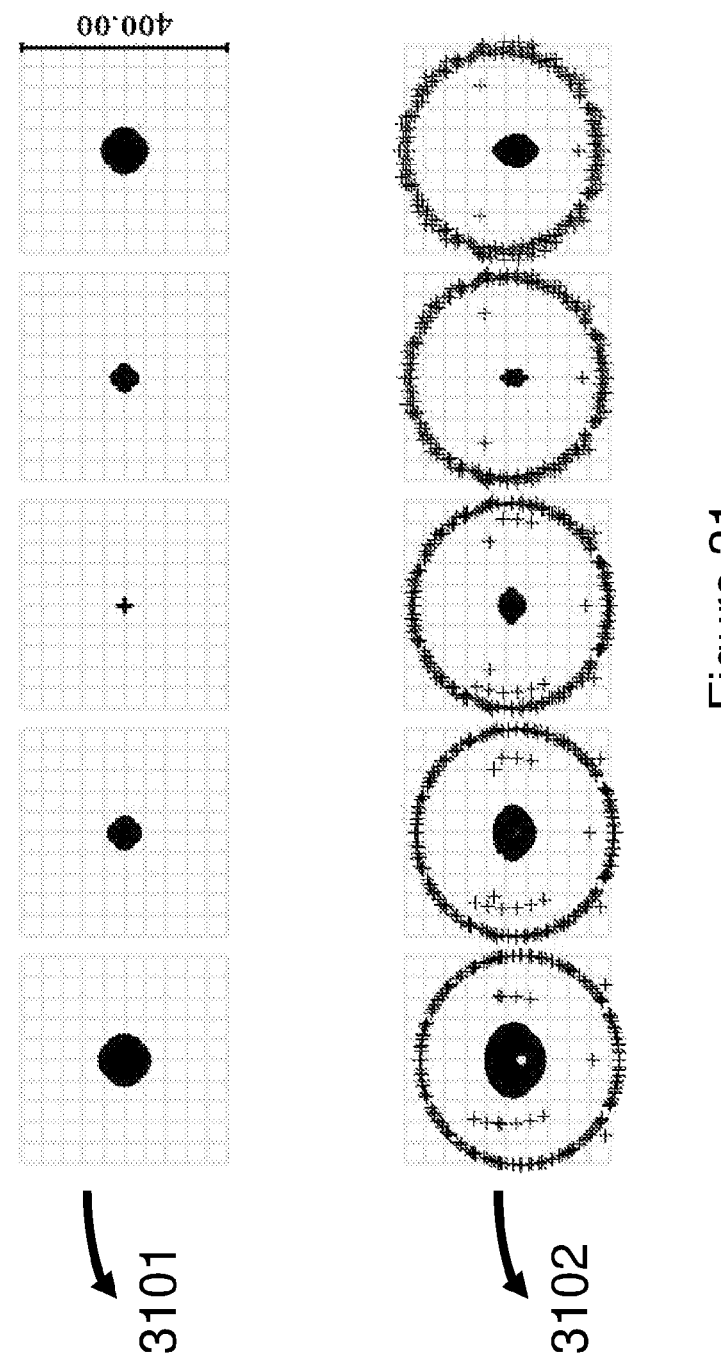
FIG. 31 illustrates a schematic diagram of a wide-angle, through-focus, retinal image point spread as a spot diagram.

FIG. 31 represents a schematic diagram of a wide-angle, through-focus, retinal image point spread depicted as a spot diagram, when the incoming light, with a visible wavelength (555 nm) and vergence of 0 D, depicting optical infinity, is incident on a −3 D schematic myopic model eye of Table 1 when corrected with the disclosed embodiment described in FIG. 29. The optical performance was evaluated at 2.5 mm pupil diameter.

As can be noted, the on-axis through-focus optical performance results in an in-focus image on the retina and out of focus images immediately in front and behind the retina, as described in row 3101. The row 3102 represents off-axis performance of the embodiment spectacle lens used in conjunction with the schematic myopic model eye, representing the (0.30 degrees) field angle. The five columns of FIG. 31 represent various positions in the anterior-posterior direction of the retina; $1^{st}$ column (−0.5 mm, in front of the retina), $2^{nd}$ column (−0.25 mm, in front of the retina), $3^{rd}$ column (0 mm, on the retina), $4^{th}$ column (0.25 mm, behind the retina) and $5^{th}$ column (0.5 mm, behind the retina).

In this example, as can be seen in 3102, a relatively laterally constant ring shaped intensity profile is obtained for an off-axis incident plane wave passing through the combination of the regional backward linear axicon optical element and the integral base spectacle lens.

In this example, the relatively constant lateral size and relatively constant intensity profile or relatively constant energy distribution observed in the off-axis through-focus region of FIG. 3102 is a surrogate measure of the extension of depth of focus provided by the regional or auxiliary backward linear axicon optical element in combination with integral base spectacle lens on the retina of the schematic model eye.

As seen in the example, the resultant of the forward or backward linear axicons combined with the integral base spectacle lens generates a ring-shaped light distribution pattern that is substantially of similar width and intensity pattern over the substantial through focus region of the retina.

Other Variants of Examples 1 to 4

In some other embodiments, the arrangement of the regional or auxiliary optical elements on the spectacle lens may be circular, non-circular, semi-circular, annular, oval, rectangular, octagonal, hexagonal, random, or square in shape to introduce the desired levels of extension of depth of focus at different desired locations of the retina of the wearer's eye and to produce a desirable stop signal for the progressing myopic eye.

In certain embodiments, a plurality of regional or auxiliary optical elements to be configured with, or in conjunction, in combination or in juxtaposition, with integral base spectacle lens may comprise of various combinations of auxiliary optical elements disclosed herein. For example, in one embodiment, a plurality of forward/backward axicons may be combined with a plurality of light sword or modified light sword elements. In another example embodiment, a plurality of forward/backward axicons may be combined with single or double peacock eye elements.

In certain embodiments, a plurality of regional or auxiliary optical elements to be configured with, or in conjunction, in combination or in juxtaposition, with integral base spectacle lens may be arranged differently along different regions of the spectacle lens or may be arrange differently between the right and left eyes.

In certain embodiments, the centre-to-centre separation between one or more regional or auxiliary optical elements combined with the spectacle lens may be at least 0.5 mm, 1 mm, 2 mm, 3 mm, 4 mm, 5 mm, or combinations thereof. In some other embodiments, the centre-to-centre separation between one or more regional or auxiliary optical elements combined with the spectacle lens may be between 0.5 and 5 mm, 1 and 3 mm, 2 and 5 mm, 3 and 5 mm, or combinations thereof.

In some other embodiments, the diameter of the regional or auxiliary optical elements on the spectacle lens may be at least 0.75 mm, 1 mm, 1.25 mm, 1.5 mm, 1.75 mm, or 2 mm. In some other embodiments, the diameter of the regional or auxiliary optical elements on the spectacle lens may be between 0.75 mm and 1.5 mm, between 1.25 mm and 1.75 mm, between 1 mm and 2 mm.

In some other embodiments, the surface area of any of the regional or auxiliary optical elements on the spectacle lens may be at least 1.75 square mm, 2 square mm, 2.25 square mm, 2.5 square mm, 2.75 square mm, 3 square mm, 3.25 square mm, or 3.5 square mm.

In some other embodiments, the diameter of the regional or auxiliary optical elements on the spectacle lens may be between 1.75 square mm and 2.5 square mm, between 2.25 square mm and 2.75 square mm, between 1.75 square mm and 3.5 square mm.

In some other embodiments, the total surface area of substantially all of the regional or auxiliary optical elements on the spectacle lens may be less than 10%, 12.5%, 15%, 17.5%, 20%, 22.5%, 25%, 27.5%, or 30% of the total surface area of the spectacle lens or spectacle lens blank. In other embodiments, the total surface area of substantially all of the regional or auxiliary optical elements on the spectacle lens may be between 10% and 20%, 10% and 15%, 15% and 25%, 10% and 20% of the total surface area of the spectacle lens or spectacle lens blank.

In certain embodiments, the induced extension of elongation of depth of focus (i.e., stop signal) configured within the spectacle lens in conjunction with at least one regional or auxiliary optical element may be at least +0.5 D, +0.75 D, +1 D, +1.25 D, +1.5 D, +1.75 D, +2 D or +2.5 D.

In certain embodiments, the induced extension or elongation of depth of focus configured within the of spectacle lens in conjunction with the at least one regional or auxiliary optical element may be between +0.5 D and +1 D, +0.5 D and +1.5 D, +0.5 D and +2 D, or +0.5 D and +2.5 D.

In some embodiments, the integral base single vision spectacle lens may be configured with multiple regions with individual regional or auxiliary optical elements whose optical profile when combined with the optical profile of the base spectacle lens is capable of providing extended depth of focus to at least one desired region on the retina of the wearer's eye. The said integral base single vision spectacle lens in combination with the auxiliary optical element(s) may be configured such that the embodiment is capable of reducing, inhibiting, or controlling the rate of progression of myopia for an individual according to an exemplary aspect of the disclosure.

In some embodiments, a region or zone corresponding to viewing far visual distances, which cover the pupil of the spectacle wearer in the primary gaze; and another region or zone corresponding to viewing near visual distances, covering the pupil of the spectacle wearer in inferior-nasal gaze (i.e., downwards, and inwards towards the nose) may be contemplated. In some other embodiments, only one regional or auxiliary optical element may be combined with the spectacle lens in each of these zones or regions (far and/or near).

In yet another embodiment, a plurality of regional or auxiliary optical elements may be contemplated in each of these zones or regions (far and/or near). The regional or auxiliary optical elements in combination with spectacle lenses disclosed herein may vary substantially in their optical and physical properties.

In some embodiments, the regional or auxiliary optical elements may be configured in juxtaposition to the integral base spectacle lens which may be manufactured in sheets which may comprise of a single layer, while in other embodiments it may comprise of multiple layers. Such sheets may then be grafted to properly fit or function in conjunction with a spectacle lens. The sheet comprising regional or auxiliary optical elements may be applied or adhered to a spectacle lens in order to work in conjunction with the spectacle lens in several ways including, but not limited to, thermal, mechanical, or chemical adhesives. In some embodiments, the at least one regional optical element of the spectacle lens may be located, formed, or placed on the anterior surface, posterior surface, or combinations thereof. In some embodiments, the at least one regional optical element of the spectacle lens is devoted to produce specific features of the stop signal, for example extension or elongation of depth of focus or light energy distributed substantially in front of the retina.

In certain embodiments, the refractive index of the one or more of the regional or auxiliary optical elements may be higher than the refractive index of the material surrounding the regional or auxiliary optical element, while in other embodiments the refractive index of the one or more of the regional or auxiliary optical elements may be lower than the refractive index of the material surrounding the optical element. In some embodiments, a useful range for the refractive index of the optical element is between 1.35 and 1.75. In certain other embodiments, the refractive index of the one or more of the regional or auxiliary optical elements may be of a gradient form, also referred to as a gradient index refractive medium.

In some spectacle lens embodiments, a smaller difference between refractive indices of the one or more regional or auxiliary optical elements as compared with the area surrounding the regional or auxiliary optical elements may be advantageous for improved manufacturing precision. In some embodiments, the refractive index differences of around 0.005, 0.01, 0.05 or 0.1 are contemplated.

In certain other embodiments, the at least one regional or auxiliary optical element of the spectacle lens is located, formed, or placed on one of the two surfaces of the spectacle lens and the other surface may have other features for further reducing eye growth. For example, use of additional features like defocus, coma, or spherical aberration.

The examples provided herein have used a −3 D myopic model eye to disclose the present invention, however the same disclosure can be extended to other degrees of myopia, for example, −1 D, −2 D, −5 D or −6 D. Further, it is understood that a person skilled in the art can draw extensions to eyes with varying degrees of myopia in conjunction with astigmatism, for example up to 1 DC or 2 DC.

In the example embodiments, reference was made to a specific wavelength of 555 nm, however it is understood that a person skilled in the art can draw extension to other visible wavelengths between 420 nm and 760 nm.

In another embodiment, a method, or a process for manufacturing a spectacle lens includes the steps of: (a) moulding and/or cutting a material to form an optical element on a surface of a spectacle lens, implementing a radial and/or an azimuthal power distribution; and (b) the desired steps taken to substantially eliminate any discontinuity along said azimuthal power distribution on said spectacle lens.

For example, by considering the light sword optical element in juxtaposition with the posterior surface of the spectacle lens to avoid the ledge caused by the angular change of the surface profile required to produce the said light sword optical element with angular or rotationally asymmetric power distribution is contemplated.

Specific structural and functional details disclosed in this figures and examples are not to be interpreted as limiting, but merely as a representative basis for teaching a person skilled in the art to employ the disclosed embodiments in numerous variations.

In one embodiments of the disclosure, a spectacle lens for a myopic eye is disclosed which comprises an integral base spectacle lens, configured with a distance base prescription to correct, at least in part, the refractive error of the myopic eye; and further comprises at least one regional or auxiliary optical element formed within or, in conjunction, in combination, or in juxtaposition to the integral base spectacle lens; wherein the at least one regional or auxiliary optical element is configured to provide an optical effect to the eye that is different to that provided by the integral base spectacle lens; and wherein the combination of the integral base spectacle lens and the at least one auxiliary optical element is configured to provide an elongation of depth of focus for at least one portion on the retina of the myopic eye.

In one example, the integral base spectacle lens has a spherical or toric base prescription. In one example, the diameter of each regional or auxiliary optical element is greater than 0.75 mm. In one example, the surface area of each regional or auxiliary optical element is greater than 1.75 square mm. In one example, the total combined surface area of regional or auxiliary optical elements is less than 30% of the total surface area of the spectacle lens. In one example, each of the regional or auxiliary optical element utilises at least in part an axicon, an inverse axicon, or a logarithmic axicon. In certain other embodiments of the disclosure, each of the regional or auxiliary optical elements utilises at least in part a light sword element, a modified light sword element, or a peacock eye element.

In other embodiments of the disclosure, the elongation of depth of focus comprises a positive end and the negative end, and wherein the elongation of depth of focus is configured such that the negative end is positioned substantially in front of the retina and positive end is positioned substantially on the retina of the myopic eye. For example, in one instance, the elongation of depth of focus provided by each of the regional or auxiliary optical elements is between 0.2 mm and 1.5 mm in width.

In certain other embodiments of the disclosure, the elongation of depth of focus is achieved for a plurality of wavelengths of visible light between 460 nm and 760 nm, inclusive. In one example the at least one portion on the retina is within 30 degree visual field of the myopic eye. In certain examples, the at least one regional or auxiliary optical element is configured on the anterior surface, or posterior surface, or both surface of the spectacle lens.

In some examples, the at least one regional or auxiliary optical element is configured within the matrix of the spectacle lens. In some examples, the at least one regional or auxiliary optical element has one or more of the following shapes: circular, elliptical, regular polygon or irregular polygon. Few other exemplary embodiments of spectacle lenses are described in the following example set A.

Set of "A" Claim Examples

A spectacle lens for reducing myopia progression in a person comprising: a spectacle lens; and at least one regional or auxiliary optical element used within, or in conjunction, in combination, or in juxtaposition with the integral base single vision spectacle lens; wherein the at least one regional or auxiliary optical element is a permanent overlay that may be applied, or glued, to the anterior surface of the spectacle lens, the posterior surface of the spectacle lens or is formed within the matrix of the spectacle lens; wherein the at least one regional or auxiliary optical element utilises at least in part, an axicon, a logarithmic axicon, a linear axicon, a forward axicon, a backward axicon, an inverse logarithmic axicon, a quartic axicon, an axilens, a light sword element, a modified light sword purposefully designed without a distinct ridge or ledge, a single peacock eye element, or a double peacock eye element.

The spectacle lens of one or more preceding examples A, wherein the spectacle lens comprises at least one regional or auxiliary optical element implementing an angular modulation of power variation about the geometric centre of the regional or auxiliary optical element; wherein the configured power variation is purposefully selected such that it does not cause a distinct ridge, edge, ledge at the junction of the spectacle lens and the adjoining regional or auxiliary optical element.

The spectacle lens of one or more preceding examples A, wherein the spectacle lens comprises at least an auxiliary or regional optical element; wherein the at least one auxiliary or regional optical element combined with the spectacle lens results in purposefully configured such that there is angular power variation across the geometric or optical centre of the regional optical element for at least 30%, 40%, 50%, 60% or 70% of the region of the auxiliary or regional optical element and it is purposefully selected such that such that it does not cause a distinct ridge, edge, ledge at the junction of the spectacle lens and the adjoining regional or auxiliary optical element.

The spectacle lens of one or more preceding examples A, wherein the plurality of auxiliary or regional optical elements covers at least 5%, 8% 10%, 12%, 15%, 18%, 20%, 22%, 24%, 26%, 28%, 30%, 32%, or 34% of the surface area of the spectacle lens or spectacle lens blank.

The spectacle lens of one or more preceding examples A, wherein the at least one regional or auxiliary optical element is configured to provide extension or elongation of depth of focus of at least +0.5 D, +0.75D, +1 D, +1.25 D, +1.5 D, +1.75 D or +2 D, for an eye of a wearer.

The spectacle lens of one or more preceding examples A, wherein the at least one regional or auxiliary optical element is configured to provide extension or elongation of depth of focus over 10%, 15%, 20%, 25%, or 30%, of the viewing angles available to the wearer.

The spectacle lens of one or more preceding examples A, wherein the at least one regional or auxiliary optical element of the spectacle lens comprises of at least one permanent layer; wherein the layers may be a spray coating or an adhesive.

The spectacle lens of one or more preceding examples A, wherein the at least one refractive index of the material used to form the at least one regional or auxiliary optical element is different from the refractive index of the material used to form the spectacle lens.

The spectacle lens of one or more preceding examples A, wherein the plurality of regional or auxiliary optical elements have at least 1, 2, 3, 4, 5 or 6 different diameters within the spectacle lens.

The spectacle lens of one or more preceding examples A, wherein the plurality of regional or auxiliary optical elements provide at least 1, 2, 3, 4, 5 or 6 different ranges of extension or elongation of depth of focus for a myopic eye.

The spectacle lens of one or more preceding examples A, wherein the spectacle lens is configured to modify incoming light through spectacle lenses and utilises extension or elongation of depth of focus to decelerate the rate of myopia progression.

The spectacle lens of one or more preceding examples A, wherein the spectacle lens is capable of providing a stop signal to a progressing eye for a substantial portion of the viewing angles of the spectacle lens.

The spectacle lens of one or more preceding examples A, wherein the spectacle lens is configured to provide a stop signal to a progressing eye for at least 50% of the total of the viewing angles of the spectacle lens.

The spectacle lens of one or more preceding examples A, wherein the spectacle lens is configured to provide a stop signal to a progressing eye for a substantial portion of the viewing angles of the region of the spectacle lens that contains the at least one regional or auxiliary optical element.

The spectacle lens of one or more preceding examples A, wherein the spectacle lens is configured to provide a progressing eye for at least 50% of the total of the viewing angles of the region of the spectacle lens that contains the at least one regional optical element.

The spectacle lens of one or more preceding examples A, wherein the spectacle lens is cosmetically indistinguishable from traditional or conventional single vision spectacle lens.

The spectacle lens of one or more preceding examples A, wherein the spectacle lens is ledge, ridge, or edge free at the interface adjoining any of the regional or auxiliary optical elements.

A method of reducing myopia progression in a person comprising: measurement of refraction of the eyes of a wearer; identifying a distance prescription based at least in part on the refraction measurement of the eyes, choosing a lens for each eye, wherein the lens is configured with a base distance prescription power that is substantially close to the refraction measurement of the eye providing at least one spectacle lens as set forth in one or more of A examples configured to introduce the required extension or elongation of depth of focus at the retinal plane of the spectacle wearer; and the method including wearing this device for extended periods during the day.

Set of "B" Claim Examples

A spectacle lens for a myopic eye comprising: an integral base lens, configured with a distance single vision base prescription to correct, at least in part, the refractive error of the myopic eye; and at least one auxiliary or regional optical element formed in conjunction or juxtaposition to the integral base lens; wherein the at least one auxiliary optical element is configured to provide an optical effect to the eye that is different to that provided by the integral base lens; and wherein the combination of the integral base lens and the at least one auxiliary optical element is configured to provide an elongation of depth of focus for at least one portion on the retina of the myopic eye.

A spectacle lens of one or more preceding B examples, wherein the integral base lens has a spherical or toric base prescription.

A spectacle lens of one or more preceding B examples, wherein the diameter of each of the auxiliary or regional optical element is greater than 0.75 mm.

A spectacle lens of one or more preceding B examples, wherein the surface area of each auxiliary optical element is greater than 1.75 square mm.

A spectacle lens of one or more preceding B examples, wherein the total combined surface area of auxiliary optical elements is less than 30% of the total surface area of the spectacle lens.

A spectacle lens of one or more preceding B examples, wherein at least one of the auxiliary optical element utilises at least in part an axicon, a forward axicon, a backward axicon, a linear axicon, an inverse axicon, or a logarithmic axicon.

A spectacle lens of one or more preceding B examples, wherein each of the auxiliary optical element utilises at least in part a light sword element, a modified light sword element, a single peacock eye element or double peacock eye element.

A spectacle lens of one or more preceding B examples, wherein the elongation of depth of focus comprises a positive end and the negative end, and wherein the elongation of depth of focus is configured such that the negative end is positioned substantially in front of the retina and positive end is positioned substantially on the retina of the myopic eye.

A spectacle lens of one or more preceding B examples, wherein the elongation of depth of focus provided by each of the auxiliary or regional optical element is between 0.2 mm and 1.5 mm in width at the retina of the eye.

A spectacle lens of one or more preceding B examples, wherein the elongation of depth of focus is achieved for a plurality of wavelengths of visible light between 460 nm and 760 nm, inclusive.

A spectacle lens of one or more preceding B examples, wherein the elongation of depth of focus is achieved for a plurality of pupil diameters between 2.5 mm and 6 mm, inclusive.

A spectacle lens of one or more preceding B examples, wherein the at least one portion on the retina is within 30 degree visual field of the myopic eye.

A spectacle lens of one or more preceding B examples, wherein the at least one auxiliary optical element is configured on the anterior surface, or posterior surface, or both surface of the spectacle lens.

A spectacle lens of one or more preceding B examples, wherein the at least one auxiliary optical element is configured within the matrix of the spectacle lens.

A spectacle lens of one or more preceding B examples, wherein the at least one auxiliary optical element has one or more of the following shapes: circular, elliptical, regular polygon or irregular polygon.

The spectacle lens of one or more preceding B examples, wherein the spectacle lens is cosmetically indistinguishable from a traditional or conventional single vision spectacle lens.

The spectacle lens of one or more preceding B examples, wherein the spectacle lens is configured to provide a progressing eye for at least 50% of the total of the viewing angles of the region of the spectacle lens that contains the at least one regional optical element.

The spectacle lens of one or more preceding B examples, wherein the spectacle lens is capable of providing a stop signal to a progressing eye for a substantial portion of the viewing angles of the spectacle lens.

The spectacle lens of one or more preceding B examples, wherein the spectacle lens is configured to provide a stop signal to a progressing eye for at least 50% of the total of the viewing angles of the spectacle lens.

The spectacle lens of one or more preceding B examples, wherein the spectacle lens is configured to provide a stop signal to a progressing eye for a substantial portion of the viewing angles of the region of the spectacle lens that contains the at least one regional optical element.

A spectacle lens of one or more preceding B examples, wherein double peacock eye element comprises two substantially similar single peacock eye optical elements.

A spectacle lens of one or more preceding B examples, wherein double peacock eye element comprises two substantially dissimilar single peacock eye optical elements.

A spectacle lens of one or more preceding B examples, wherein the optical path of at least one auxiliary or regional optical element in combination of the integral base lens is defined by:

$$OPD(x, y) = \frac{[F - (\Delta F/2)]d^2}{\Delta F^2} \ln\left(\frac{\Delta F}{d}x + (F)\right) - \frac{d}{\Delta F}x - \frac{y^2}{2\left(\frac{\Delta F}{d}x + (F)\right)}$$

Wherein, x and y are cartesian coordinates of the optical phase function of the regional or auxiliary optical element; parameters F and $\Delta F$ stand for the focal length of the lens and the range of extended depth of focus of the regional or auxiliary optical element, both in lens units (mm); and 'd' is the diameter of the optical element; wherein F approximately matching the underlying refractive error of the eye, $\Delta F$ may between 0.25 to 1.5 mm in width; and d is between 0.375 and 2 mm.

A spectacle lens of one or more preceding B examples, wherein the at least one auxiliary or regional optical element is an axicon that is defined using a steep radius of curvature between 0.05 mm and 0.5 mm, and a very large asphericity factor characterised by a conic constant (Q) value between −250 and −5000.

A spectacle lens of one or more preceding B examples, wherein the optical path of at least one auxiliary or regional optical element in combination of the integral base lens is defined by:

$$OPD(\rho) = C\frac{\rho}{2F}$$

wherein, $\rho$ is the radial coordinate of the phase function ($\rho=\sqrt{x^2+y^2}$), F is the focal length of the regional or auxiliary optical element in lens units (mm); C is an arbitrary coefficient; wherein F approximately matching the underlying refractive error of the eye.

A spectacle lens of one or more preceding B examples, wherein the optical path of at least one auxiliary or regional optical element in combination of the integral base lens is defined by:

$$OPD(\rho) = \frac{\rho^4}{4\Delta FR^2}$$

wherein, $\rho$ is the radial coordinate of the phase function ($\rho=\sqrt{x^2+y^2}$), $\Delta F$ is the range of extended depth of focus of the optical element in lens units (mm); and R is the semi-diameter of the regional or auxiliary optical element; wherein $\Delta F$ may between 0.25 to 1.5 mm in width; and R is between 0.375 and 2 mm.

A spectacle lens of one or more preceding B examples, wherein the optical path of at least one auxiliary or regional optical element in combination of the integral base lens is defined by:

$$OPD(\rho) = \frac{1}{2A\ln\left(1 + A\frac{\rho^2}{F}\right)}$$

wherein, ρ is the radial coordinate of the phase function (ρ=$\sqrt{x^2+y^2}$), A=ΔF/R², F and ΔF stand for the focal length of the lens and the range of extended depth of focus of the optical element, both in lens units (mm); and R is the semi-diameter of the optical element; wherein F approximately matching the underlying refractive error of the eye, ΔF may between 0.25 to 1.5 mm in width; and R is between 0.375 and 2 mm.

A spectacle lens of one or more preceding B examples, wherein the optical path of at least one auxiliary or regional optical element in combination of the integral base lens is defined by:

$$OPD(\rho, \theta) = \frac{\rho^2}{2\left[F + \Delta F\left(\frac{\theta}{2\pi}\right)\right]}$$

wherein, ρ, and θ is the radial (ρ=$\sqrt{x^2+y^2}$) and azimuthal $$\left(\theta = \tan^{-1}\left(\frac{y}{x}\right)\right)$$

coordinates respectively of the phase function; and parameters F and ΔF stand for the focal length of the lens and the range of extended depth of focus of the regional or auxiliary optical element, both in lens units (mm); wherein F approximately matching the underlying refractive error of the eye, ΔF may between 0.25 to 1.5 mm in width.

A spectacle lens of one or more preceding B examples, wherein the optical path of at least one auxiliary or regional optical element in combination of the integral base lens is defined by:

$$OPD(\rho,\theta)=A\rho^2+B\theta\rho^2$$

wherein, ρ, and θ is the radial (ρ=$\sqrt{x^2+y^2}$) and azimuthal $$\left(\theta = \tan^{-1}\left(\frac{y}{x}\right)\right)$$

coordinates respectively; and parameters A and B stand for:

$$A = \frac{1}{2F} \text{ and } B = \frac{1}{4\pi}\left[\frac{1}{F} - \frac{1}{F+\Delta F}\right]$$

wherein, parameters F and ΔF stand for the focal length of the lens and the range of extended depth of focus of the auxiliary or regional optical element, both in lens units (mm); wherein F approximately matching the underlying refractive error of the eye, ΔF may between 0.25 to 1.5 mm in width.

A spectacle lens of one or more preceding B examples, wherein the optical path of at least one auxiliary or regional optical element in combination of the integral base lens is defined by:

$$OPD(\rho, \theta) = \frac{\rho^2}{2\left[F + \Delta F\left(\frac{\rho}{R}\right)^b\right]}$$

wherein, ρ is the radial coordinate (ρ=$\sqrt{x^2+y^2}$) of the phase function; F and ΔF stand for the focal length of the lens and the range of extended depth of focus of the optical element, both in lens units (mm); R is the semi-diameter of the auxiliary or regional optical element, and b is a constant that determines the intensity distribution of the central peak; wherein F approximately matching the underlying refractive error of the eye, ΔF may between 0.25 to 1.5 mm in width; and R is between 0.375 and 2 mm.

A spectacle lens of one or more preceding B examples, wherein the sag of at least one auxiliary optical element is characterised by an odd asphere axicon surface configured on the front or back surface of the integral base lens is represented by equation;

$$sag(z)=\beta_1\rho^1+\beta_2\rho^2+\beta_3\rho^3+\beta_4\rho^4+\beta_5\rho^5+\beta_6\rho^6+\beta_7\rho^7$$

wherein, β is the coefficients of the odd asphere surface; and ρ is radial co-ordinate described as $\sqrt{x^2+y^2}$; wherein the coefficients $\beta_1$ to $\beta_7$ have minimum and maximum values described in Table 3 of the current disclosure.

The invention claimed is:

1. A spectacle lens for a myopic eye comprising:
   an integral base spectacle lens with a front and a back surface, configured with a distance base prescription to correct, at least in part, the refractive error of the myopic eye;
   wherein the integral base spectacle lens has a spherical or a toric base prescription; and a plurality of regional optical elements formed within, or in conjunction with the front or the back surface of the integral base spectacle lens;
   wherein each of the plurality of regional optical elements is configured with a residual sag profile, a surface area greater than 1.75 square mm and a center-to-center separation of at least 0.5 mm; and
   wherein a total combined surface area of the plurality of regional optical elements is less than 35% of the total surface area of the integral base spectacle lens; and
   wherein the combination of each of the plurality of regional optical elements and the integral base spectacle lens is configured to provide an extension of regional depth of focus for at least one portion on the retina of the myopic eye.

2. A spectacle lens of claim 1, wherein the residual sag profile utilizes at least in part an axicon, a linear axicon, a forward axicon, a backward axicon, an inverse logarithmic axicon, a logarithmic axicon, or a combination thereof.

3. A spectacle lens of claim 2, wherein the residual sag profile is characterized by an odd asphere represented by an equation:

$$sag(z)=\beta_1\rho^1+\beta_2\rho^2+\beta_3\rho^3+\beta_4\rho^4+\beta_5\rho^5+\beta_6\rho^6+\beta_7\rho^7$$

wherein β1 to β7 are coefficients of the odd asphere surface; and ρ is radial co-ordinate described as $\sqrt{x^2+y^2}$;

wherein the coefficients β1 values range between −3E-03 and +3E-03, β2 values range between −3E-03 and +3E-03, β3 values range between −9E-03 and +9E-03, β4 values range between −3E-03 and +3E-03, β5 values range between −3E-04 and +3E-04, β6 values range between −6E-04 and +6E-04, β7 values range between −2E-04 and +2E-04.

4. A spectacle lens of claim 2, wherein the logarithmic axicon is configured to produce an optical path difference (OPD) that is defined by:

$$OPD(\rho) = \frac{1}{2A\ln\left(1 + A\frac{\rho^2}{F}\right)}$$

wherein, $\rho$ is the radial coordinate of a phase function ($\rho = \sqrt{x^2+y^2}$), $A=\Delta F/R^2$, parameter F (mm) stands for the combined focal length of the integral base spectacle lens and the regional optical element, parameter $\Delta F$ (mm) stands for the range of regional extended depth of focus obtained with the regional optical element; and R is the semi-diameter of the regional optical element; wherein $\Delta F$ is between 0.25 to 1.5 mm in width.

5. A spectacle lens of claim 2, wherein the axicon is configured as a quartic axicon or a lensacon, to produce the optical path difference (OPD) that is defined by:

$$OPD(\rho, \theta) = \frac{\rho^4}{4\Delta F R^4}$$

wherein, $\rho$ is the radial coordinate of the phase function ($\rho = \sqrt{x^2+y^2}$), parameter $\Delta F$ (mm) stands for the range of regional extended depth of focus obtained with the regional optical element; and R is the semi-diameter of the regional optical element; wherein $\Delta F$ is between 0.25 to 1.5 mm in width.

6. A spectacle lens of claim 1, wherein the regional optical element in conjunction with the integral base spectacle lens generates a ring shaped light distribution on the retina of the myopic eye with a width and an intensity pattern, such that the width is configured with a relatively constant lateral size, and the intensity pattern is configured with a relatively constant energy distribution over a through focus region of the retina: wherein the through focus region of the retina includes at least 0.5 mm in front of the retina and 0.5 mm behind the retina.

7. A spectacle lens of claim 1, wherein the regional optical element is configured by the residual sag profile utilizing at least in part a light sword element, a modified light sword element, or a combination thereof, to produce an optical path difference (OPD) that is defined by:

$$OPD(\rho, \theta) = \frac{\rho^2}{2\left[F + \Delta F\left(\frac{\theta}{2\pi}\right)\right]}$$

wherein, $\rho$, and $\theta$ is radial ($\rho = \sqrt{x^2+y^2}$) and azimuthal $$\left(\theta = \tan^{-1}\left(\frac{y}{x}\right)\right)$$

coordinates respectively: parameter F (mm) stands for the combined focal length of the integral base spectacle lens and the regional optical element, parameter $\Delta F$ (mm) stands for the range of regional extended depth of focus obtained with the regional optical element; wherein $\Delta F$ is between 0.25 to 1.5 mm in width.

8. A spectacle lens of claim 1, wherein the regional optical element is configured by the residual sag profile utilizing at least in part a light sword element, a modified light sword element, or a combination thereof, to produce an optical path difference (OPD) that is defined by:

$$OPD(\rho,\theta) = A\rho^2 + B\theta\rho^2$$

wherein, $\rho$, and $\theta$ is the radial ($\rho = \sqrt{x^2+y^2}$) and azimuthal $$\left(\theta = \tan^{-1}\left(\frac{y}{x}\right)\right)$$

coordinates respectively; and parameters A and B stand for:

$$A = \frac{1}{2F} \text{ and } B = \frac{1}{4\pi}\left[\frac{1}{F} - \frac{1}{F+\Delta F}\right]$$

wherein, parameter F (mm) stands for the combined local length of the integral base spectacle lens and the regional optical element, parameter $\Delta F$ (mm) stands for the range of regional extended depth of focus obtained with the regional optical element; wherein $\Delta F$ is between 0.25 to 1.5 mm in width.

9. A spectacle lens of claim 7, wherein the residual sag profile comprises of at least a horizontal and vertical orientation of the regional optical element resulting in an asymmetry of at least 2 microns.

10. A spectacle lens of claim 1, wherein the regional optical element is configured by the residual sag profile utilizing at least in part an axilens, to produce an optical path difference (OPD) that is defined by:

$$OPD(\rho, \theta) = \frac{\rho^2}{2\left[F + \Delta F\left(\frac{\rho}{R}\right)^b\right]}$$

wherein, $\rho$ is the radial coordinate ($\rho = \sqrt{x^2+y^2}$) of the phase function; parameter F (mm) stands for the combined focal length of the integral base spectacle lens and the regional optical element, parameter $\Delta F$ (mm) stands for the range of regional extended depth of focus obtained with the regional optical element; wherein $\Delta F$ is between 0.25 to 1.5 mm in width; R is the semi-diameter of the regional optical element, and b is a constant that determines an intensity distribution of a central peak.

11. A spectacle lens of claim 1, wherein the regional optical element is configured by the residual sag profile utilizing at least in part one peacock-eye element or one double peacock-eye element to produce an optical path difference (OPD) that is defined by:

$$OPD(x, y) = \frac{[F-(\Delta F/2)]d^2}{\Delta F^2}\ln\left(\frac{\Delta F}{d}x + (F)\right) - \frac{d}{\Delta F}x - \frac{y^2}{2\left(\frac{\Delta F}{d}x + (F)\right)}$$

wherein, x and y are cartesian coordinates of an optical phase function of the regional optical element; parameter F (mm) stands for the combined focal length of the integral base spectacle lens and the regional optical element, parameter $\Delta F$ (mm) stands for the range of regional extended depth of focus obtained with the regional optical element; and d is the diameter of the regional optical element;

wherein ΔF is defined about the retina and is between 0.25 to 1.5 mm in width.

12. A spectacle lens of claim 1, wherein the extension of regional depth of focus is gauged using through focus optical transfer function which comprises a positive end and a negative end, and wherein the extension of regional depth of focus is configured such that the negative end is positioned in front of, and the positive end is positioned behind, the at least one portion of the retina of the myopic eye; and wherein the extension of regional depth of focus is between +0.5 D and +2 D and the through focus optical transfer function is not bimodal.

13. A spectacle lens of claim 1, wherein the extension of regional depth of focus is configured over at least 10% of the viewing angles for the myopic eye.

14. A spectacle lens of claim 1, wherein the extension of regional depth of focus is achieved for a pupil diameter between 2.5 mm and 6 mm.

15. A spectacle lens of claim 1, wherein a plurality of regional optical elements are configured in an arrangement on the integral base spectacle lens, wherein the arrangement is circular, non-circular, semi-circular, annular, oval, rectangular, octagonal, hexagonal, random, or square in shape.

16. A spectacle lens of claim 1, wherein the plurality of regional optical elements includes a combination of axicons, axilenses, lensacons, light sword elements, modified light sword elements and peacock-eye elements.

17. A spectacle lens of claim 1, wherein the integral base spectacle lens comprises a distinct distance zone and a distinct near zone, wherein the plurality of regional optical elements are configured or arranged substantially differently between the distinct distance and distinct near zones.

18. A pair of spectacle lenses of claim 1, wherein the pair of spectacle lenses are configured for a right myopic eye and a left myopic eye; wherein the plurality of regional optical elements are configured or arranged differently for the right myopic eye and the left myopic eye.

19. A method of spectacle lens of claim 1, to reduce progression of the myopic eye comprising: measurement of refraction of the myopic eye; identifying a distance prescription based at least in part on the refraction measurement of the myopic eye, choosing a spectacle lens for the myopic eye, wherein the spectacle lens is configured with the distance base prescription matching the refraction measurement of the myopic eye; and wherein the method includes wearing the spectacle lens for extended periods during the day.

20. A method of spectacle lens of claim 1, wherein the process for manufacturing the spectacle lens includes: (a) molding and/or cutting a material to form at least one regional optical element comprising an interface adjoining the front or back surface of the integral base spectacle lens; and (b) desired steps taken to configure the interface to substantially eliminate any surface discontinuity and minimize formation of a ledge, a ridge, or an edge on the spectacle lens.

* * * * *